US00RE50969E

(19) United States
(12) Reissued Patent
Kishigami et al.

(10) Patent Number: US RE50,969 E
(45) **Date of Reissued Patent: *Jul. 28, 2026**

(54) RADAR DEVICE

(71) Applicant: PANASONIC HOLDINGS CORPORATION, Osaka (JP)

(72) Inventors: Takaaki Kishigami, Tokyo (JP); Junji Sato, Tokyo (JP)

(73) Assignee: Panasonic Automotive Systems Co., Ltd., Kanagawa (JP)

( * ) Notice: This patent is subject to a terminal disclaimer.

(21) Appl. No.: 18/217,419

(22) Filed: Jun. 30, 2023

Related U.S. Patent Documents

Reissue of:
(64) Patent No.: 10,371,796
Issued: Aug. 6, 2019
Appl. No.: 15/256,509
Filed: Sep. 2, 2016

U.S. Applications:
(63) Continuation of application No. 17/394,286, filed on Aug. 4, 2021, now Pat. No. Re. 49,619, which is an application for the reissue of Pat. No. 10,371,796.

(30) Foreign Application Priority Data

Sep. 17, 2015 (JP) ..... 2015-184055
May 23, 2016 (JP) ..... 2016-102475

(51) Int. Cl.
*H01Q 21/06* (2006.01)
*G01S 7/28* (2006.01)
(Continued)

(52) U.S. Cl.
CPC ..... *G01S 7/28* (2013.01); *G01S 13/325* (2013.01); *H01Q 21/061* (2013.01); *H01Q 25/00* (2013.01); *G01S 2013/0254* (2013.01)

(58) Field of Classification Search
CPC .. G01S 7/28; G01S 13/325; G01S 2013/0254; H01Q 21/061; H01Q 25/00
See application file for complete search history.

(56) References Cited

U.S. PATENT DOCUMENTS 5,774,690 A * 6/1998 O'Neill ..... G01V 1/20 367/13
6,351,243 B1 * 2/2002 Derneryd ..... H01Q 1/246 343/700 MS
(Continued)

FOREIGN PATENT DOCUMENTS

JP 2013-504764 2/2013
JP 2013-504764 A 2/2013
(Continued)

OTHER PUBLICATIONS

English Machine Translation of The First Notice of the Opinion on Examination, dated Feb. 24, 2025, for Chinese Patent Application No. 202111293083.4. (7 pages).
(Continued)

*Primary Examiner* — Mark Sager
(74) *Attorney, Agent, or Firm* — Seed Intellectual Property Law Group LLP

(57) ABSTRACT

A plurality of transmission antennas include Nt1 transmission antennas arranged in a first direction and Nt2 transmission antennas arranged in a second direction orthogonal to the first direction, a plurality of reception antennas include Na1 reception antennas arranged in the first direction and Na2 reception antennas arranged in the second direction. In the first direction, an inter-element space between any two of the Nt1 transmission antennas and an inter-element space between any two of the Na1 reception antennas are each a value which is a product of a first space and an integer and are all values different from each other, and in the second direction, an inter-element space between any two of the Nt2
(Continued)

transmission antennas and an inter-element space between any two of the Na2 reception antennas are each a value which is a product of a second space and an integer and are all values different from each other.

15 Claims, 40 Drawing Sheets

(51) Int. Cl.
*G01S 13/32* (2006.01)
*H01Q 25/00* (2006.01)
*G01S 13/02* (2006.01)

(56) References Cited

U.S. PATENT DOCUMENTS 7,064,710 B1 * 6/2006 Ksienski ..... H01Q 3/26 342/372
7,609,198 B2 * 10/2009 Chang ..... G01S 13/89 342/179
8,248,298 B2 * 8/2012 Lalezari ..... H01Q 21/24 342/120
8,289,203 B2 * 10/2012 Culkin ..... H01Q 21/061 342/117
8,427,360 B2 * 4/2013 Longstaff ..... G01S 13/882 340/945
8,717,224 B2 * 5/2014 Jeong ..... G01S 13/4463 342/70
9,041,587 B2 * 5/2015 Longstaff ..... G01S 13/882 342/179
9,121,943 B2 * 9/2015 Stirling-Gallacher ..... G01S 13/89
9,203,160 B2 * 12/2015 Blech ..... H01Q 21/08
9,310,478 B2 * 4/2016 Gross ..... G01S 13/931
9,488,720 B2 * 11/2016 Cornic ..... G01S 3/46
9,638,795 B2 * 5/2017 Ahmed ..... G01S 13/89
RE49,619 E * 8/2023 Kishigami et al.
2006/0214832 A1 * 9/2006 Lee ..... G01S 13/89 342/22
2007/0013575 A1 * 1/2007 Lee ..... G01S 7/2813 342/52
2007/0285315 A1 * 12/2007 Davis ..... G01S 3/74 342/377
2008/0258964 A1 * 10/2008 Schoeberl ..... G01S 7/032 342/189
2008/0291077 A1 * 11/2008 Chang ..... G01S 13/89 342/59
2008/0303711 A1 * 12/2008 Matsuoka ..... G01S 3/32 342/196
2009/0033556 A1 * 2/2009 Stickley ..... G01S 13/003 342/374
2010/0328157 A1 * 12/2010 Culkin ..... H01Q 21/061 342/372
2011/0074620 A1 * 3/2011 Wintermantel ..... G01S 7/032 342/70
2011/0298676 A1 * 12/2011 Yanagihara ..... H01Q 21/06 343/711
2012/0223852 A1 * 9/2012 Gross ..... G01S 13/931 342/70
2012/0274499 A1 * 11/2012 Chang ..... G01S 7/42 342/107
2012/0299773 A1 * 11/2012 Stirling-Gallacher ..... G01S 13/89 342/368
2013/0154899 A1 * 6/2013 Lewis, III ..... H01Q 21/22 343/893
2013/0162475 A1 * 6/2013 Blech ..... H01Q 21/08 342/368
2014/0091965 A1 * 4/2014 Sheen ..... G01S 13/90 342/25 A
2014/0104097 A1 * 4/2014 Binzer ..... G01S 13/931 342/74
2014/0125511 A1 * 5/2014 Longstaff ..... G01S 13/882 342/33
2014/0167784 A1 * 6/2014 Ahmed ..... G01S 13/89 324/642
2014/0306840 A1 * 10/2014 Koerber ..... G01S 7/032 342/107
2015/0198709 A1 * 7/2015 Inoue ..... G01S 13/28 342/147
2015/0198713 A1 * 7/2015 Boufounos ..... G01S 13/887 342/22
2015/0253419 A1 * 9/2015 Alland ..... G01S 7/02 342/385
2015/0253420 A1 * 9/2015 Alland ..... G01S 13/4454 342/156
2016/0033632 A1 * 2/2016 Searcy ..... G01S 7/03 342/153
2016/0131738 A1 * 5/2016 Prechtel ..... G01S 13/94 342/175
2018/0301818 A1 * 10/2018 Welle ..... G01F 23/284

FOREIGN PATENT DOCUMENTS

JP 2014-085317 5/2014
JP 2014-85317 A 5/2014

OTHER PUBLICATIONS

Jian Li, el al., "MIMO Radar with Colocated Antennas" Signal Processing Magazine, IEEE vol. 24, Issue: 5, pp. 106-114, Sep. 2007.

* cited by examiner

RADAR DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS REFERENCE TO CO-PENDING REISSUE APPLICATION*

*More than one reissue application has been filed for the reissue of U.S. Pat. No. 10,371,796, issued Aug. 6, 2019: application Ser. No. 17/394,286, filed Aug. 4, 2021, which is an application for reissue of U.S. Pat. No. 10,371,796; and this application, application Ser. No. 18/217,419, filed Jun. 30, 2023, which is a continuation reissue of application Ser. No. 17/394,286.*

BACKGROUND

1. Technical Field

The present disclosure relates to a radar device.

2. Description of the Related Art

In recent years, studies are being made of a radar device using radar transmission signals with short wavelengths including microwaves and millimeter waves by which high resolution can be obtained. Moreover, there is a demand for development of a radar device (wide-angle radar device) which detects objects (targets) including not only vehicles but also pedestrians in a wide angular range to improve safety outdoors.

For example, a pulse radar device which repeatedly transmits pulse waves is known as the radar device. A reception signal of a wide-angle pulse radar which detects vehicles and pedestrians in a wide angular range is a signal in which multiple reflected waves from a target (for example, a vehicle) existing in a close distance and a target (for example, a pedestrian) existing in a far distance are mixed. Accordingly, the radar device requires (1) a radar transmitter having a configuration which transmits pulse waves or pulse modulated waves having autocorrelation characteristics achieving low range side lobes (hereafter, referred to as low range side lobe characteristics) and (2) a radar receiver having a configuration with a wide reception dynamic range.

The following two configurations can be given as examples of the configuration of the wide-range radar device.

The first configuration is a configuration in which radar waves being pulse waves or modulated waves are transmitted by performing mechanical or electronic scanning using a directional beam with a narrow angle (with a beam width of about several degrees), and reflected waves are received by using the directional beam with the narrow-angle. In this configuration, scanning needs to be performed many times to obtain high resolution. Accordingly, a tracking performance for a target moving at high speed is poor.

The second configuration is a configuration in which reflected waves are received by an array antenna formed of multiple antennas (antenna elements) and which uses a method of estimating an arrival angle of each reflected wave by using a signal processing algorithm based on a reception phase difference corresponding to a space between the antennas (direction of arrival (DOA) estimation). In this configuration, estimation of the arrival angle in a reception branch can be performed even when some of scan intervals of transmission beams are omitted in a transmission branch. Accordingly, the scanning time is reduced and the tracking performance is improved compared to the first configuration. Examples of the direction-of-arrival estimation method include: Fourier conversion based on matrix operations; a Capon method and a linear prediction (LP) method based on inverted matrix operations; and multiple signal classification (MUSIC) and estimation of signal parameters via rotational invariance techniques (ESPRIT) based on unique value operations.

Moreover, there is proposed a configuration (hereafter, referred also to as MIMO radar) of the radar device which includes multiple antennas (array antennas) in the transmission branch in addition to the reception branch and performs the beam scanning by performing signal processing using transmission and reception array antennas (for example, see Jian Li, Petre Stoica, "MIMO Radar with Colocated Antennas," Signal Processing Magazine, IEEE Vol. 24, Issue: 5, pp. 106-114, 2007).

In the MIMO radar, by arranging the antenna elements in the transmission and reception array antennas in a certain way, virtual reception array antennas (hereafter, referred to as virtual reception array) can be formed as many as the product of the number of the transmission antenna elements and the number of the reception antenna elements at maximum. This has an effect of increasing an effective aperture length of the array antennas with few elements.

Moreover, the MIMO radar can be applied not only to one-dimensional scanning in a vertical or horizontal direction but also to two-dimensional beam scanning in the vertical and horizontal directions.

However, when the number of antennas in the transmission and reception branch is restricted to achieve cost and size reduction of the MIMO radar (for example, when the number of transmission antennas is about four and the number of reception antennas is about four), the aperture lengths in the vertical and horizontal directions are restricted in the planar virtual reception array formed by the MIMO radar.

SUMMARY

One non-limiting and exemplary embodiment provides a radar device which can increase the aperture length in the virtual reception array as much as possible.

In one general aspect, the techniques disclosed here feature a radar device including: a radar transmitter which, in operation, transmits a plurality of radar signals at predetermined transmission cycles from a plurality of transmission antennas; and a radar receiver which, in operation, receives a plurality of reflected wave signals being the plurality of radar signals reflected on a target, by using a plurality of reception antennas, wherein the plurality of transmission antennas include Nt1 transmission antennas arranged in a first direction and Nt2 transmission antennas arranged in a second direction orthogonal to the first direction, the plurality of reception antennas include Na1 reception antennas arranged in the first direction and Na2 reception antennas arranged in the second direction, in the first direction, an inter-element space between any two of the Nt1 transmission antennas and an inter-element space between any two of the Na1 reception antennas equal to a product of the first space and an integer and are different from each other, and in the second direction, an inter-element space between any two of the Nt2 transmission antennas and an inter-element space between any two of the Na2 reception antennas equal to a product of a second space and an integer and are different from each other.

In the one aspect of the present disclosure, the aperture length in the virtual reception array can be increased as much as possible.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

Figure 1A:
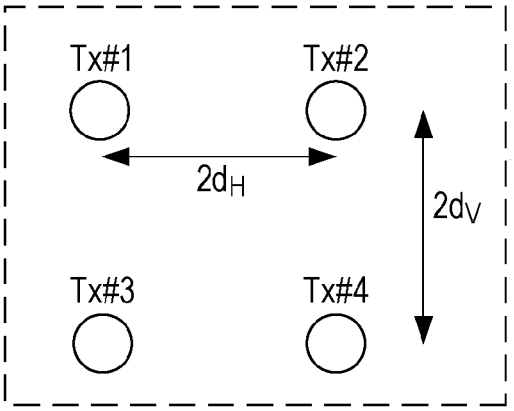
FIG. 1A is a view illustrating an arrangement example of transmission antennas.
Figure 1B:
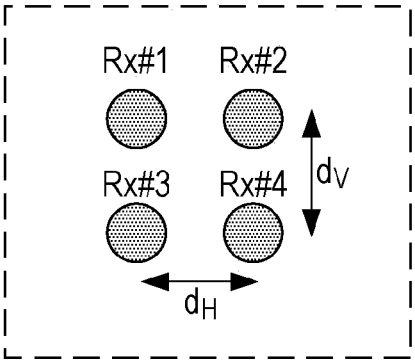
FIG. 1B is a view illustrating an arrangement example of reception antennas.

FIG. 1A illustrates an antenna arrangement of a transmission array antenna including four transmission antennas (Tx#1 to Tx#4), and FIG. 1B illustrates a reception array antenna including four reception antennas (Rx#1 to Rx#4).

In FIGS. 1A and 1B, $d_H$ denotes an inter-element space between the reception antennas in a horizontal direction, and $d_V$ denotes an inter-element space between the reception antennas in a vertical direction. Meanwhile, in FIG. 1A, inter-element spaces among the transmission antennas in the horizontal direction and the vertical direction are $2d_H$ and $2d_V$, respectively.

Figure 1C:
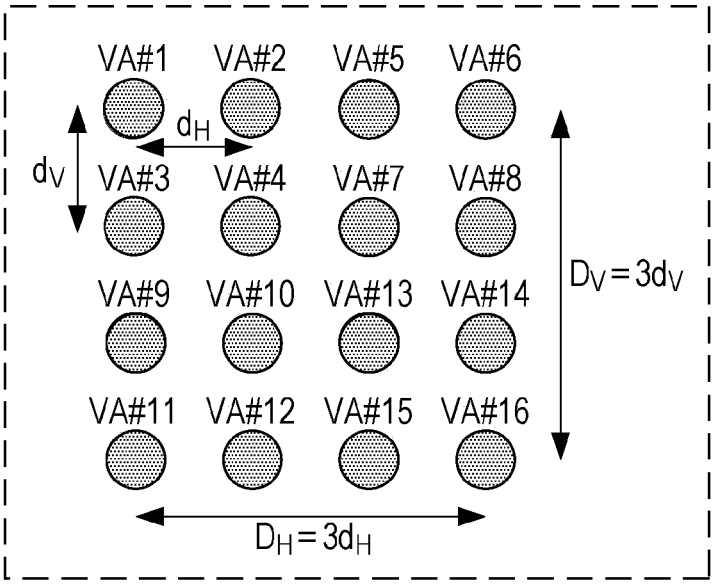
FIG. 1C is a view illustrating an arrangement example of a virtual reception array.

FIG. 1C illustrates a virtual reception array including the transmission and reception array antennas in the antenna arrangements illustrated in FIGS. 1A and 1B.

As illustrated in FIG. 1C, the virtual reception array includes 16 virtual reception antennas (VA#1 to VA#16) which are planarly arranged in a pattern of four antennas in the horizontal direction and four antennas in the vertical direction.

In FIG. 1C, inter-element spaces among the virtual reception antennas in the horizontal direction and the vertical direction are $d_H$ and $d_V$, respectively. In other words, the aperture lengths $D_H$ and $D_V$ of the virtual reception array in the horizontal direction and the vertical direction are $3d_H$ and $3d_V$, respectively.

For example, the beam width (Fourier beam width) BW of a Fourier beam which has an equal amplitude weight and which is formed by using a virtual reception array with inter-element spaces of $d=d_H=d_V$ and an aperture length of $D=D_H=D_V$ is expressed by the following formula:

$$BW \approx 0.7\lambda/D \text{ [rad]}$$

where $\lambda$ is a wavelength of a carrier frequency of a radio signal (RF signal) transmitted from a transmission branch.

In the virtual reception array (D=3d) illustrated in FIG. 1C, Fourier beam width $BW \approx 0.7\lambda/3d$ [rad].

For example, in the case of $d=0.5\lambda$, Fourier beam width $BW \approx 0.7/1.5$ [rad]$\approx 30°$. Meanwhile, in the case of $d=0.7\lambda$, Fourier beam width $BW \approx 0.7/2.1$ [rad]$\approx 19°$.

Further increasing the inter-element space d can reduce the Fourier beam width BW. However, increasing the inter-element space d generates grating lobes at angles relatively close to a main beam and erroneous detection increases.

Figure 2A:
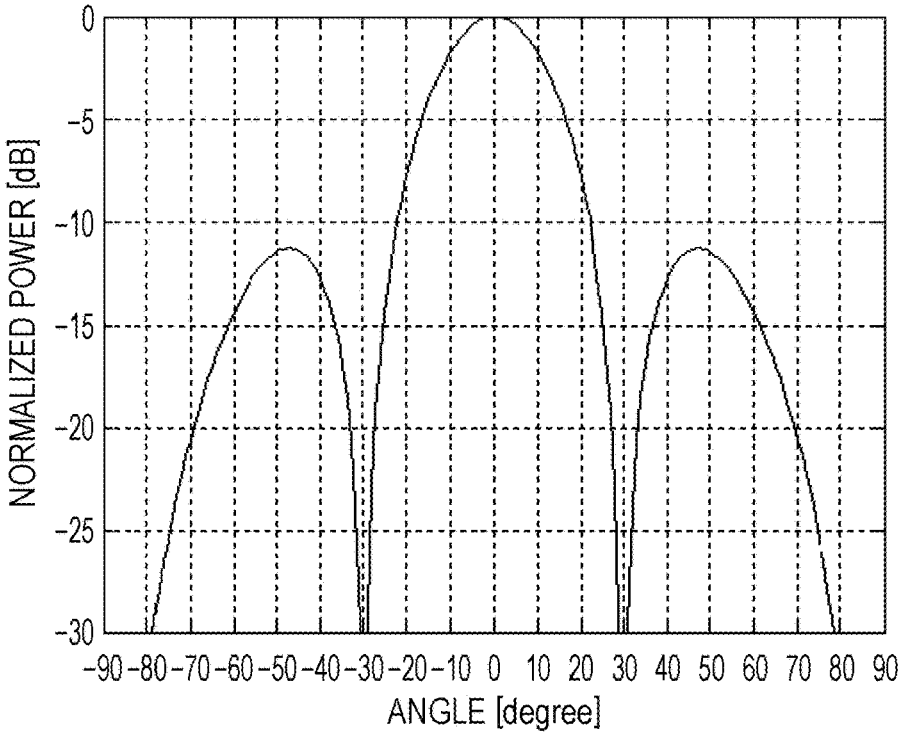
FIG. 2A is a graph depicting a directional pattern of the virtual reception array ($d=0.5\lambda$)
Figure 2B:
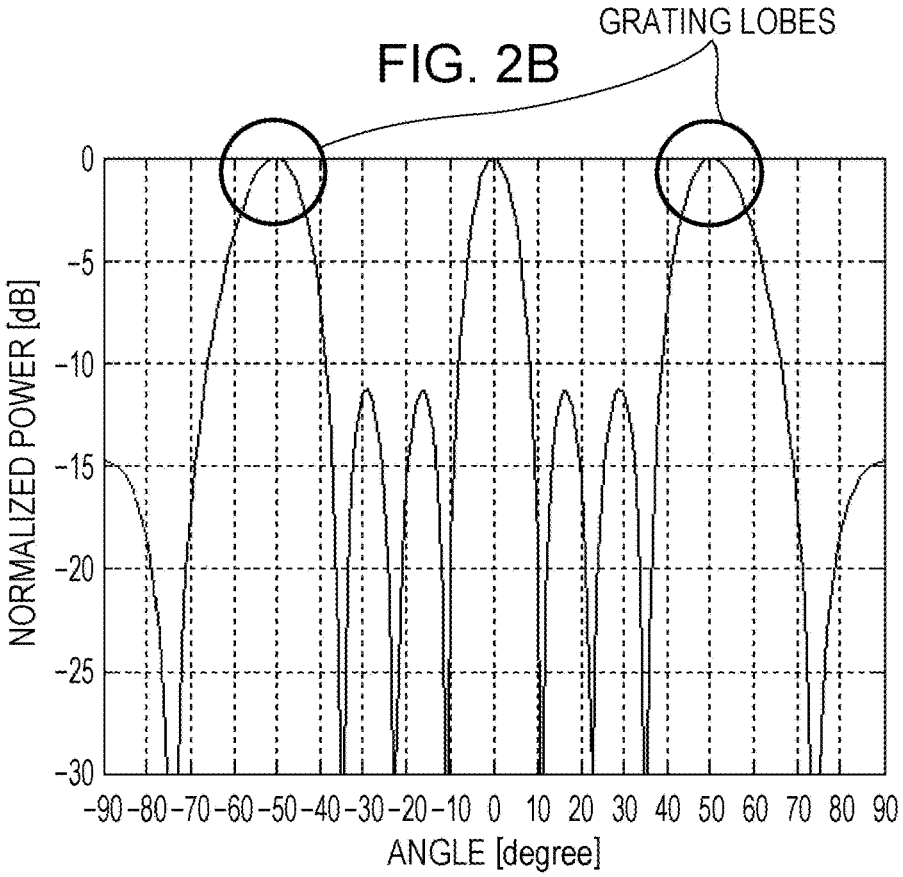
FIG. 2B is a graph depicting a directional pattern of the virtual reception array ($d=1.3\lambda$)

For example, FIG. 2A illustrates a directional pattern in the case of inter-element space $d=0.5\lambda$, and FIG. 2B illustrates a directional pattern in the case of inter-element space $d=1.3\lambda$. Note that, in FIGS. 2A and 2B, the main beam is formed in the 0° direction.

As illustrated in FIG. 2A, in the case of inter-element space $d=0.5\lambda$, the Fourier beam width BW of the main beam is about 30° and is relatively large. Moreover, in FIG. 2A, no grating lobes are generated in a range of −90° to +90°.

Meanwhile, as illustrated in FIG. 2B, in the case of inter-element space $d=1.3\lambda$, the Fourier beam width BW of the main beam is about 10° and is relatively small. However, grating lobes are generated at angles away from the main beam (0° direction) by −50° and +50°.

For example, in FIG. 2B, when the detection angle of a wide-angle radar is equal to or larger than a range of about −25° to +25°, the grating lobes are generated in the angular detection range and the erroneous detection thereby increases.

As described above, in the reduction of the Fourier beam width BW, there is a restriction that the inter-element space d can be increased only to a certain degree. Instead of increasing the inter-element space d, the aperture length D can be increased by increasing the number of antenna element. However, in consideration of cost reduction, there are restrictions on the aperture length D of the virtual reception array.

When, for example, the MUSIC, the Capon method, or the like is used as the DOA estimation algorithm to achieve angular resolution of about 10° under the restrictions described above, a computation amount for performing eigenvalue decomposition or an inverse matrix operation increases. Moreover, when the DOA estimation algorithm achieving high resolution is applied, it is difficult to obtain high angular separation performance unless the signal to noise ratio (SNR) is sufficiently high.

In one aspect of the present disclosure, when beam scanning is performed two-dimensionally in the vertical direction and the horizontal direction by using a MIMO radar, the aperture lengths of the virtual reception array in the vertical direction and the horizontal direction are increased as much as possible. Using such a virtual reception array can improve the angular resolution with few antenna elements, and the size and cost of the radar device are reduced.

An embodiment of one aspect of the present disclosure is described below in detail with reference to the drawings. Note that, in the embodiment, the same configuration elements are denoted by the same reference numerals and description thereof is omitted to avoid overlapping description.

Description is given below of a radar device configured such that different transmission signals subjected to code division multiplexing are transmitted from multiple transmission antennas in a transmission branch and reception processing is performed by separating the transmission signals in a reception branch. However, the configuration of the radar device is not limited to this and can be such that different transmission signals subjected to frequency division multiplexing are transmitted from multiple transmission antennas in the transmission branch and reception processing is performed by separating the transmission signals in the reception branch. Moreover, similarly, the configuration of the radar device can be such that transmission signals subjected to time division multiplexing are transmitted from multiple transmission antennas in the transmission branch and reception processing is performed by separating the transmission signals in the reception branch.

Embodiment 1

Configuration of Radar Device

Figure 3:
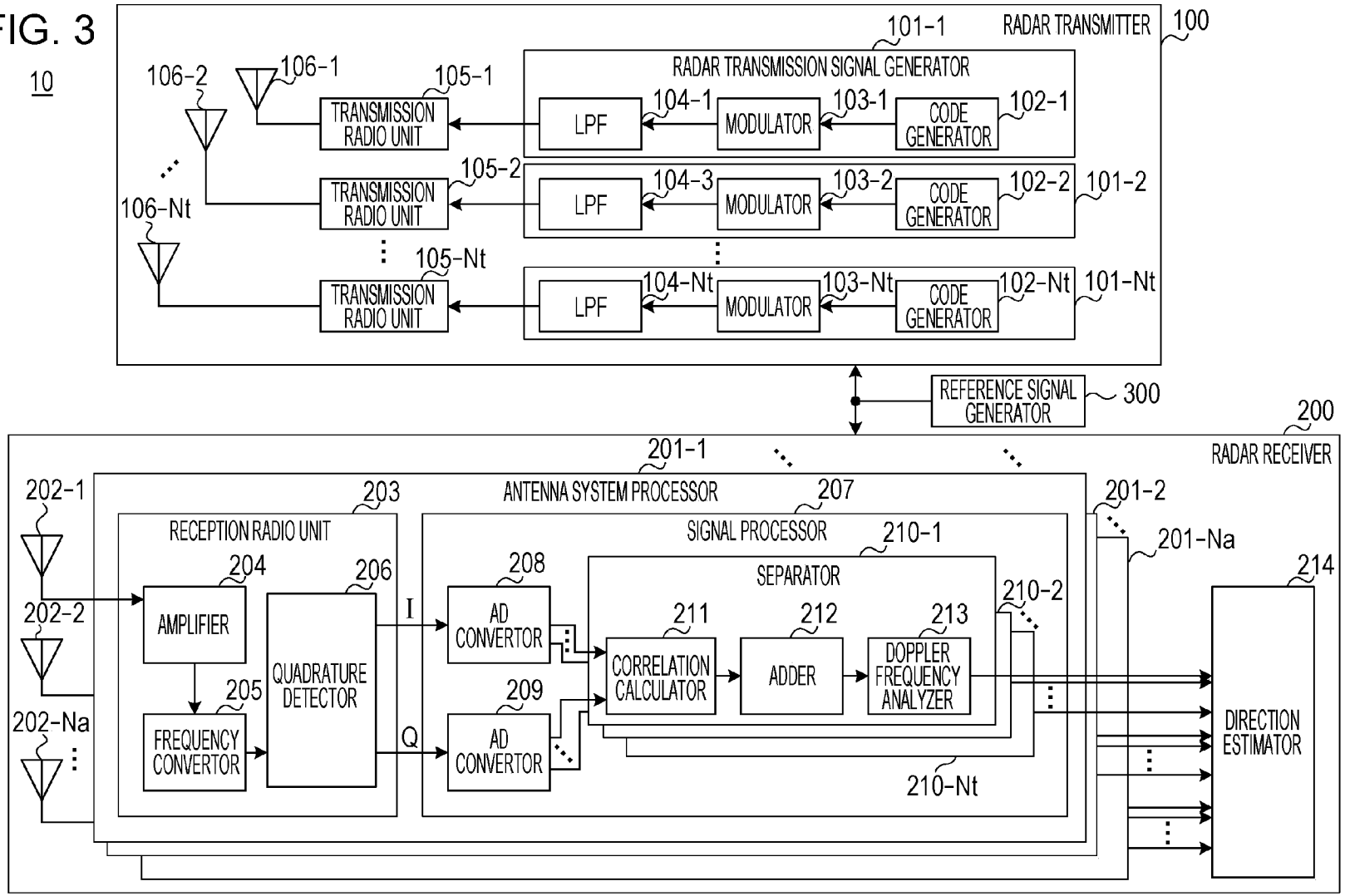
FIG. 3 is a block diagram illustrating a configuration of a radar device in Embodiment 1 of the present disclosure.

FIG. 3 is a block diagram illustrating a configuration of a radar device 10 in the embodiment.

The radar device 10 includes a radar transmitter (transmission branch) 100, a radar receiver (reception branch) 200, and a reference signal generator 300.

The radar transmitter 100 generates high-frequency (radio frequency) radar signals (radar transmission signals), based on a reference signal received from the reference signal generator 300. Then, the radar transmitter 100 transmits the radar transmission signals at certain transmission cycles by using a transmission array antenna including multiple transmission antennas 106-1 to 106-Nt.

The radar receiver 200 receives reflected wave signals which are the radar transmission signals reflected on a target (not illustrated), by using a reception array antenna including multiple reception antennas 202-1 to 202-Na. The radar receiver 200 performs the following processing operations in synchronization with the radar transmitter by using the reference signal received from the reference signal generator 300. Specifically, the radar receiver 200 performs signal processing on the reflected wave signals received by the reception antennas 202 and performs at least detection of presence or absence of a target and estimation of a direction of the target. Note that the target is an object to be detected by the radar device 10 and includes, for example, vehicles (including four-wheel and two-wheel vehicles) and humans.

The reference signal generator 300 is connected to the radar transmitter 100 and the radar receiver 200. The reference signal generator 300 provides the radar transmitter 100 and the radar receiver 200 with the reference signal serving as a signal for reference, to synchronize the processing of the radar transmitter 100 and the processing of the radar receiver 200.

[Configuration of Radar Transmitter 100]

The radar transmitter 100 includes radar transmission signal generators 101-1 to 101-Nt, transmission radio units 105-1 to 105-Nt, and the transmission antennas 106-1 to 106-Nt. Specifically, the radar transmitter 100 includes Nt transmission antennas 106, and each of the transmission antennas 106 are connected to a corresponding one of the radar transmission signal generators 101 and a corresponding one of the transmission radio units 105.

Each of the radar transmission signal generators 101 generates timing clocks by multiplying the reference signal received from the reference signal generator 300 by a certain number, and generates the radar transmission signals based on the generated timing clocks. Then, the radar transmission signal generator 101 repeatedly outputs the radar transmission signals at certain radar transmission cycles (Tr). The radar transmission signals are expressed by $r_z(k, M)=I_z(k, M)+j\,Q_z(k, M)$. In this formula, z is the number corresponding to each of the transmission antennas 106 and z=1, . . . , Nt. Moreover, j is an imaginary unit, k is a discrete time, and M is an ordinal number of the radar transmission cycle.

Each of the radar transmission signal generators 101 includes a code generator 102, a modulator 103, and a low pass filter (LPF) 104. Description is given below of components of the radar transmission signal generator 101-z corresponding to the z-th (z=1, . . . , Nt) transmission antenna 106.

Specifically, the code generator 102 generates a code $a(z)_n$(n=1, . . . , L) (pulse code) of a code sequence with a code length L, every radar transmission cycle Tr. Codes with low correlation or no correlation are used as the codes $a(z)_n$ (z=1, . . . , Nt) generated in the respective code generators 102-1 to 102-Nt. Examples of the code sequence include a Walsh-Hadamard code, an M-sequence code, a Gold code, and the like.

The modulator 103 performs pulse modulation (amplitude modulation, amplitude shift keying (ASK), or pulse shift keying) or phase modulation (phase shift keying) on each code $a(z)_n$ received from the code generator 102, and outputs the modulated signal to the LPF 104.

The LPF 104 outputs a signal component in the modulated signal received from the modulator 103 which is equal to or lower than a certain limit band, as a baseband radar transmission signal to the transmission radio unit 105.

The z-th (z=1, . . . , Nt) transmission radio unit 105 generates a radar transmission signal of a carrier frequency (radio frequency: RF) band by performing frequency conversion on the baseband radar transmission signal outputted from the z-th radar transmission signal generator 101, amplifies the generated radar transmission signal to certain transmission power P [dB] by using a transmission amplifier, and outputs the amplified radar transmission signal to the z-th transmission antenna 106.

The z-th (z=1, . . . , Nt) transmission antenna 106 emits the radar transmission signal outputted from the z-th transmission radio unit 105, to a space.

Figure 4:
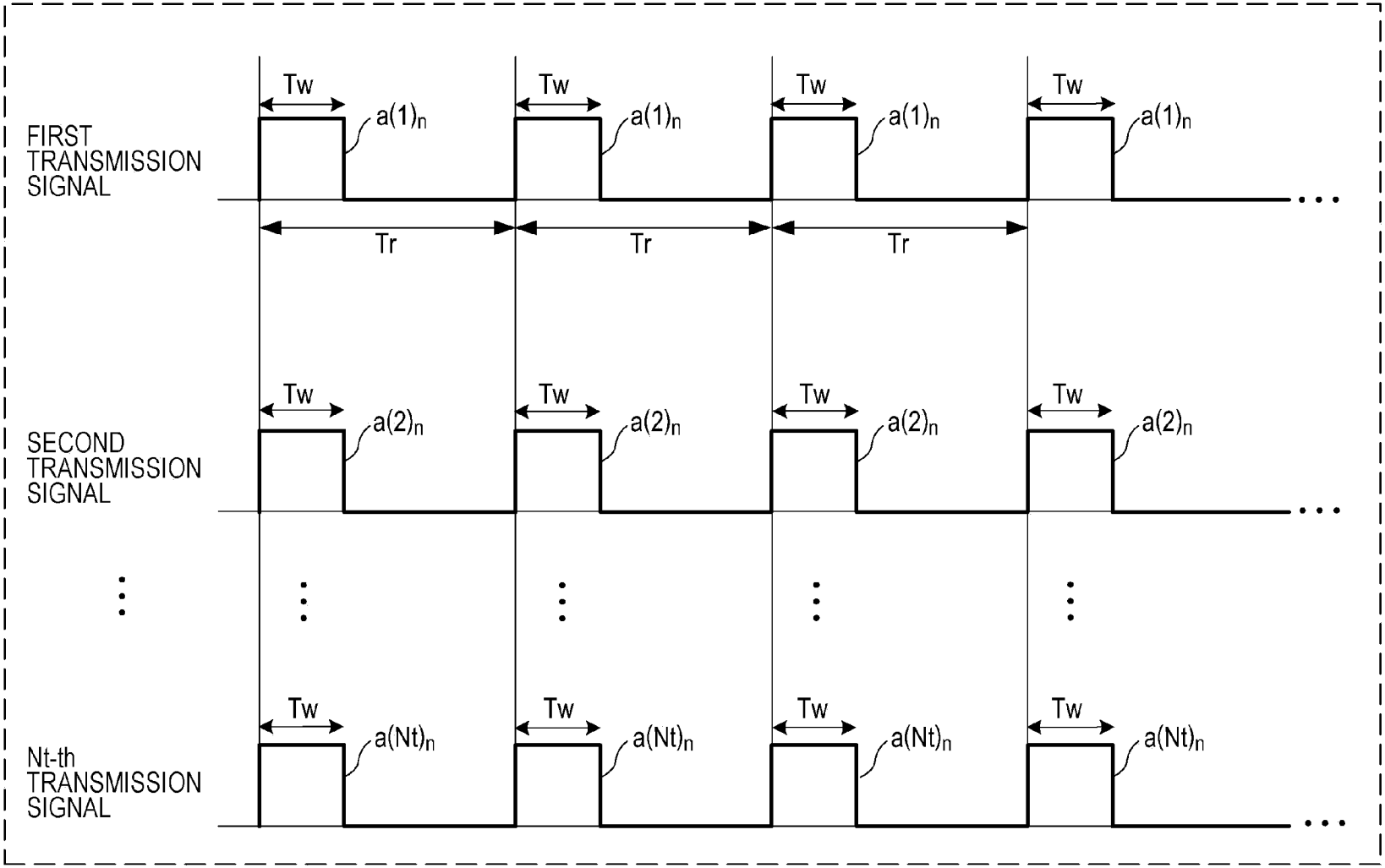
FIG. 4 is a view illustrating examples of radar transmission signals in Embodiment 1 of the present disclosure.

FIG. 4 illustrates the radar transmission signals transmitted from the Nt transmission antennas 106 in the radar transmitter 100. The pulse code sequence of the code length L is included in a code transmission duration Tw. In each radar transmission cycle Tr, the pulse code sequence is transmitted within the code transmission duration Tw, and the remaining duration (Tr−Tw) is a no-signal duration. Pulse modulation using No samples is performed for each pulse code ($a(z)_n$), and Nr (=No×L) sample signals are thereby included in each code transmission duration Tw. In other words, the sampling rate in the modulator 103 is (No×L)/Tw. Meanwhile, Nu samples are included in the no-signal duration (Tr−Tw).

Figure 5:
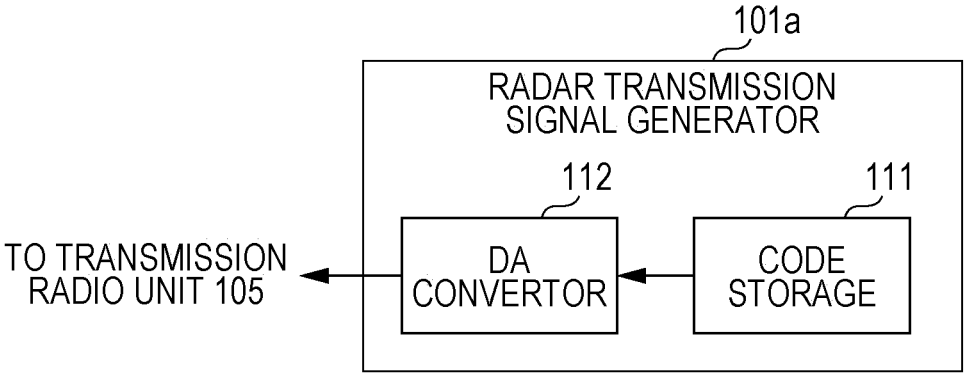
FIG. 5 is a block diagram illustrating another configuration of a radar transmission signal generator in Embodiment 1 of the present disclosure.

The radar transmitter 100 may include a radar transmission signal generator 101a illustrated in FIG. 5 instead of the radar transmission signal generator 101. The radar transmission signal generator 101a does not include the code generator 102, the modulator 103, and the LPF 104 which are illustrated in FIG. 3, and includes instead a code storage 111 and a DA convertor 112. The code storage 111 stores in advance the code sequences generated in the code generator 102 (FIG. 3) and the stored code sequences are read one by one in cycle. The DA convertor 112 converts the code sequences (digital signals) outputted from the code storage 111 to analog signals.

[Configuration of Radar Receiver 200]

In FIG. 3, the radar receiver 200 includes Na reception antennas 202 and forms the array antenna. Moreover, the radar receiver 200 includes Na antenna system processors 201-1 to 201-Na and a direction estimator 214.

Each of the reception antennas 202 receives the reflected wave signal which is the radar transmission signal reflected on the target (object), and outputs the received reflected wave signal as a reception signal to a corresponding one of the antenna system processors 201.

Each of the antenna system processors 201 includes a reception radio unit 203 and a signal processor 207.

The reception radio unit 203 includes an amplifier 204, a frequency convertor 205, and a quadrature detector 206. The reception radio unit 203 generates timing clocks by multiplying the reference signal received from the reference signal generator 300 by a certain number, and operates based on the generated timing clocks. Specifically, the amplifier 204 amplifies the reception signal received from the reception antenna 202 to a certain level, the frequency convertor 205 performs frequency conversion to a baseband on a high-frequency band reception signal, and the quadrature detector 206 converts the base-band reception signal to baseband reception signals including an I signal and a Q signal.

The signal processor 207 includes AD convertors 208 and 209 and separators 210-1 to 210-Nt.

The I signal is inputted into the AD convertor 208 from the quadrature detector 206, and the Q signal is inputted into the AD convertor 209 from the quadrature detector 206. The AD convertor 208 performs sampling at discrete time on the base-band signal including the I signal to convert the I signal into digital data. The AD convertor 209 performs sampling at discrete time on the baseband signal including the Q signal to convert the Q signal into digital data.

In the sampling by the AD convertors 208 and 209, Ns discrete samples are obtained per time Tp (=Tw/L) of one sub-pulse in the radar transmission signal. In other words, the number of over samples per one sub-pulse is Ns.

In the following description, by using an I signal Ir(k, M) and a Q signal Qr(k, M), a baseband reception signal which is the outputs of the AD convertors 208 and 209 at the discrete time k in the M-th radar transmission cycle Tr [M] is expressed as complex number signal x(k, M)=Ir(k, M)+j Qr(k, M). Moreover, in the following description, the discrete time k is based (k=1) on a timing at which the radar transmission cycle (Tr) starts, and the signal processor 207 periodically operates up to k=(Nr+Nu)Ns/No which is a sampling point before the end of the radar transmission cycle Tr. In other words, k=1, (Nr+Nu)Ns/No. In this case, j is an imaginary unit.

The signal processor 207 includes Nt separators 210 whose number is equal to the number of the systems for the respective transmission antennas 106. Each of the separators 210 includes a correlation calculator 211, an adder 212, and a Doppler frequency analyzer 213. Description is given below of a configuration of the z-th (z=1, . . . , Nt) separator 210.

The correlation calculator 211 calculates a correlation between discrete sample values x(k, M) including discrete sample values Ir (k, M) and Qr (k, M) which are sent from the AD convertors 208 and 209 every radar transmission cycle Tr and the pulse codes $a(z)_n$ (where z=1, . . . , Nt, and n=1, . . . , L) with the code length of L which are transmitted from the radar transmitter 100. For example, the correlation calculator 211 performs sliding correlation calculation of the discrete sample values x(k, M) and the pulse codes $a(z)_n$. For example, a correlation calculation value $AC_{(z)}(k, M)$ of the sliding correlation calculation at the discrete time k in the M-th radar transmission cycle Tr [M] is calculated based on the following formula:

$$AC_{(z)}(k, M) = \sum_{n=1}^{L} x(k + N_s(n-1), M)a(z)_n^*. \tag{1}$$

In the above formula, the asterisk (*) represents a complex conjugate operator.

For example, the correlation calculator 211 performs the correlation calculation during a period of k=1, (Nr+Nu)Ns/No, according to the formula (1).

Figure 6:
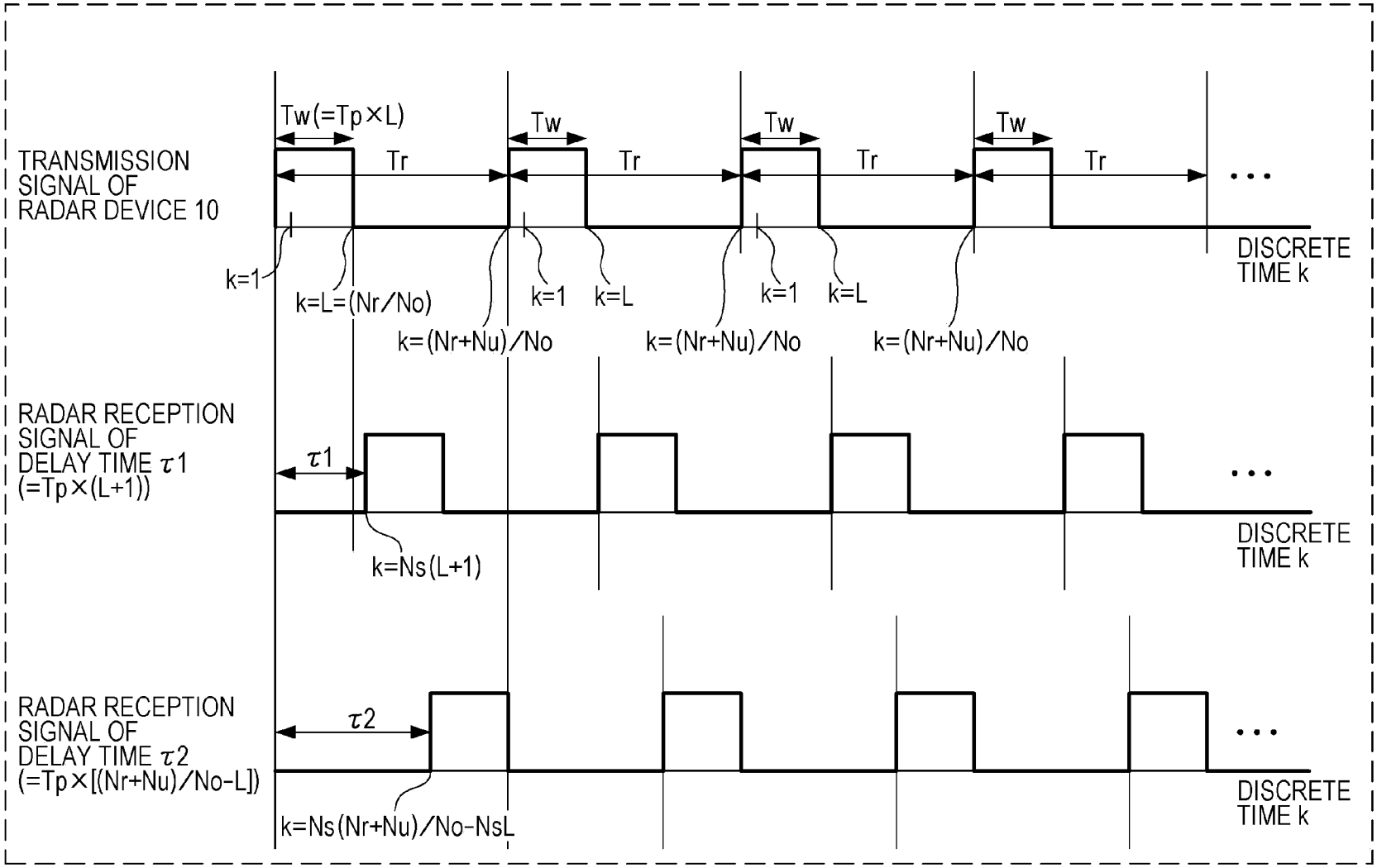
FIG. 6 is a view illustrating examples of transmission timings of the radar transmission signals and measurement ranges in Embodiment 1 of the present disclosure.

Note that the correlation calculator 211 is not limited to one performing the correlation calculation in the period of k=1, . . . , (Nr+Nu)Ns/No. A measurement range (that is, the range of k) can be limited depending on a range in which the target to be measured by the radar device 10 exists. This can reduce the computation processing amount of the correlation calculator 211 in the radar device 10. For example, in the correlation calculator 211, the measurement range can be limited to k=Ns(L+1), . . . , (Nr+Nu)Ns/No−NsL. In this case, as illustrated in FIG. 6, the radar device 10 does not perform measurement in a time duration corresponding to the code transmission duration Tw.

Thus, when direct loop-back of a radar transmission signal to the radar receiver 200 occurs, since no processing by the correlation calculator 211 is performed in a period of the loop-back of the radar transmission signal (at least in a period less than τ1), the radar device 10 can perform measurement with effects of the loop-back being eliminated. Moreover, in the case of limiting the measurement range (range of k), processing in which the measurement range (range of k) is similarly limited is applied as processing by the adder 212, the Doppler frequency analyzer 213, and the direction estimator 214 to be described later. This can reduce the processing amount in each component and reduce the power consumption of the radar receiver 200.

The adder 212 uses correlation calculation values $AC_{(z)}(k, M)$ received from the correlation calculator 211 every discrete time k in the M-th radar transmission cycle Tr, and adds up (performs coherent integration of) the correlation calculation values $AC_{(z)}(k, M)$ during a period (Tr×Np) which is equal to a certain number (Np) of the radar transmission cycles Tr. The addition (coherent integration) processing performed Np times (addition number) during the period (Tr×Np) is expressed by the following formula:

$$CI_{(z)}(k, m) = \sum_{g=1}^{N_p} AC_{(z)}(k, N_p(m-1)+g). \tag{2}$$

In this formula, $Cl_{(z)}(k, m)$ is the added value of the correlation calculation values (hereafter referred to as correlation added value), Np is an integer of 1 or more, and m is an integer of 1 or more which indicates the ordinal number of the addition number when the addition number Np in the adder 212 is set as a unit. Moreover, z=1, . . . , Nt.

The adder 212 performs addition Np times, in a unit of outputs of the correlation calculator 211 obtained in each radar transmission cycle Tr. Specifically, the adder 212 calculates the correlation value $Cl_{(z)}(k, m)$ every discrete time k, by adding up the correlation calculation values $AC_{(z)}(k, Np(m-1)+1)$ to $AC_{(z)}(k, Np\times m)$ as an unit with the timing of the discrete time k being aligned. The adder 212 can thereby improve the SNR of the reflected wave signal in a range where the reflected wave signal from the target has a high correlation, by using the effect of addition of the correlation calculation values performed Np times. Accordingly, the radar receiver 200 can improve a measurement performance relating to estimation of an arrival distance of the target.

In order to obtain an ideal addition gain, a condition under which phase components of the correlation calculation values are aligned to some extent needs to be satisfied in the addition duration in which the addition of the correlation calculation values is performed Np times. In other words, the addition number Np is preferably set based on an assumed maximum movement speed of the target to be measured. In this case, as the assumed maximum movement speed of the target increases, the variation of the Doppler frequency included in the reflection wave from the target increases and the time period with a high correlation thus becomes shorter. Accordingly, the addition number Np takes a small value, and the effect of the gain improvement by the addition in the adder 212 becomes small.

The Doppler frequency analyzer 213 performs coherent integration, in a unit of $Cl_{(z)}(k, Nc(w-1)+1)$ to $Cl_{(z)}(k, Nc\times w)$ being Nc outputs of the adder 212 obtained every discrete time k, with the timings of the discrete time k being aligned. For example, as depicted in the following formula, the Doppler frequency analyzer 213 corrects phase fluctuation $\phi(fs)=2\pi fs(Tr\times Np)\Delta\phi$ corresponding to 2Nf different Doppler frequencies $fs\Delta\phi$, and then performs the coherent integration:

$$\begin{aligned} FT_CI_{(z)}^{Nant}(k, fs, w) &= \sum_{q=0}^{N_c-1} CI_{(z)}(k, N_c(w-1)+q+1)\exp[-j\phi(f_s)q] \\ &= \sum_{q=0}^{N_c-1} CI_{(z)}(k, N_c(w-1)+q+1) \\ &\quad \exp[-j2\pi f_s T_r N_p q\Delta\phi]. \end{aligned} \tag{3}$$

In this formula, $FT_Cl_{(z)}^{Nant}(k, fs, w)$ is the w-th output of the Doppler frequency analyzer 213, and indicates a coherent integration result of the Doppler frequency $fs\Delta\phi$ at the discrete time k in the Nant-th antenna system processor 201. Note that Nant=1 to Na, fs=Nf+1, . . . , 0, . . . , Nf, k=1, . . . , (Nr+Nu)Ns/No, w is an integer of 1 or more, and $\Delta\phi$ is a phase rotation unit.

Each of the antenna system processors 201 thereby obtains $FT_Cl_{(z)}^{Nant}(k, -Nf+1, w)$, . . . , $FT_Cl_{(z)}^{Nant}(k, Nf-1, w)$ which are the coherent integration results corresponding to the 2Nf Doppler frequency components at every discrete time k, every period (Tr×Np×Nc) which is Np×Nc radar transmission cycles Tr. Note that j is an imaginary unit, and z=1, . . . , Nt.

In the case of $\Delta\phi=1/Nc$, the aforementioned processing of the Doppler frequency analyzer 213 is equivalent to performing discrete Fourier transform (DFT) processing on the outputs of the adder 212 at a sampling interval of Tm=(Tr×Np) and a sampling frequency of fm=1/Tm.

Moreover, fast Fourier transform (FFT) processing can be used in the Doppler frequency analyzer 213 by setting Nf to an exponent of two. This can reduce the computation processing amount. Note that, in the case of Nf>Nc, the FFT processing can be similarly used by performing zero padding processing of $Cl_{(z)}(k, Nc(w-1)+q)=0$ in a region of q>Nc, to reduce the computation processing amount.

Furthermore, in the Doppler frequency analyzer 213, processing of performing a multiply-add operation depicted in the formula (3) can be performed as needed instead of the FFT processing. Specifically, the Doppler frequency analyzer 213 can generate a coefficient $\exp[-j2\pi f_s T_r N_p q\Delta\varphi]$ corresponding to fs=−Nf+1, . . . , 0, Nf−1 for $Cl_{(z)}(k, Nc(w-1)+q+1)$ which are Nc outputs of the adder 212 obtained every discrete time k, and perform the multiply-add operation processing as necessary. In this case, q=0 to Nc−1.

In the following description, the w-th outputs $FT_Cl_{(z)}^{1}(k, fs, w)$, $FT_Cl_{(z)}^{2}(k, fs, w)$, . . . , $FT_Cl_{(z)}^{Na}(k, fs, w)$ obtained by performing similar processing respectively in the Na antenna system processors 201 are described as an virtual reception array correlation vector h(k, fs, w) as in the following formula. The virtual reception array correlation vector h(k, fs, w) includes Nt×Na elements, Nt×Na being a product of the number Nt of the transmission antennas and the number Na of the reception antennas. The virtual reception array correlation vector h(k, fs, w) is used to describe processing in which direction estimation is performed based on the phase differences among the reflected wave signals from the target which are received by the respective reception antennas 202 to be described later. In this case, z=1, . . . , Nt and b=1, . . . , Na:

$$h(k, fs, w) = \begin{bmatrix} FT_CI_{(1)}^{1}(k, fs, w) \\ FT_CI_{(2)}^{1}(k, fs, w) \\ \vdots \\ FT_CI_{(N_t)}^{1}(k, fs, w) \\ FT_CI_{(1)}^{2}(k, fs, w) \\ FT_CI_{(2)}^{2}(k, fs, w) \\ \vdots \\ FT_CI_{(N_t)}^{2}(k, fs, w) \\ \vdots \\ FT_CI_{(1)}^{Na}(k, fs, w) \\ FT_CI_{(2)}^{Na}(k, fs, w) \\ \vdots \\ FT_CI_{(N_t)}^{Na}(k, fs, w) \end{bmatrix} = \begin{bmatrix} h^1(k, fs, w) \\ h^2(k, fs, w) \\ \vdots \\ h^{Na}(k, fs, w) \end{bmatrix} \tag{4}$$

$$h^b(k, fs, w) = \begin{bmatrix} FT_CI_{(1)}^{b}(k, fs, w) \\ FT_CI_{(2)}^{b}(k, fs, w) \\ \vdots \\ FT_CI_{(N_t)}^{b}(k, fs, w) \end{bmatrix} \tag{5}$$

Processing in the components of the signal processor 207 has been described.

The direction estimator 214 calculates a virtual reception array correlation vector $h_{after_cal}(k, fs, w)$ which is obtained by correcting a phase deviation and an amplitude deviation among the antenna system processors 201 by using an array correction value $h_cal_{[y]}$, for the w-th virtual reception array correlation vector h(k, fs, w) of the Doppler frequency analyzers 213 outputted from the antenna system processors 201-1 to 201-Na. The virtual reception array correlation vector $h_{after_cal}(k, fs, w)$ is expressed by the following formula. Note that y=1, . . . , (Nt×Na):

$$h_{after_cal}(k, fs, w) = CAh(k, fs, w) \tag{6}$$

$$CA = \begin{bmatrix} h_cal_{[1]} & 0 & \dots & 0 \\ 0 & h_cal_{[2]} & \ddots & \dots \\ \vdots & \ddots & \ddots & 0 \\ 0 & \dots & 0 & h_cal_{[Nt\times Na]} \end{bmatrix}.$$

The virtual reception array correlation vector $h_{after_cal}(k, fs, w)$ in which the deviations among the antennas are corrected is a column vector including Na×Nr elements. In the following description, the elements of the virtual reception array correlation vector $h_{after_cal}(k, fs, w)$ are described as $h_1(k, fs, w), \dots, h_{Na\times Nr}(k, fs, w)$ and are used in the description of the direction estimation processing.

[Antenna Arrangement in Radar Device 10]

Description is given of an arrangement of the Nt transmission antennas 106 and the Na reception antennas 202 in the radar device 10 having the configuration described above.

The Nt transmission antennas 106 and the Na reception antennas 202 are arranged with uneven spaces in the horizontal direction and the vertical direction.

Specifically, inter-element spaces among $N_{TH}$ (also expressed as Nt1 in some cases) transmission antennas 106 arranged on a straight line in the horizontal direction and inter-element spaces among $N_{RH}$ (also expressed as Na1 in some cases) reception antennas 202 arranged on a straight line in the horizontal direction each satisfy a relationship of being a product of a predetermined value $d_H$ and an integer (corresponding to a first predetermined value), and are all values different from one another.

Similarly, inter-element spaces among $N_{TV}$ (also expressed as Nt2 in some cases) transmission antennas 106 arranged on a straight line in the vertical direction and inter-element spaces among $N_{RV}$ (also expressed as Na2 in some cases) reception antennas 202 arranged on a straight line in the vertical direction each satisfy a relationship of being a product of a predetermined value $d_V$ and an integer (corresponding to a second predetermined value), and are all values different from one another.

Moreover, the arrangement of the transmission antennas 106 and the reception antennas 202 in the embodiment is assumed to satisfy the following restriction conditions.

The number of the transmission antennas 106 arranged on a straight line in the horizontal direction is $N_{TH}$ and the inter-element spaces among these antennas are $\alpha_1\times d_H$, $\alpha_2\times d_H$, . . . , $\alpha_{NTH-1}\times d_H$, respectively. Meanwhile, the number of the reception antennas 202 arranged on a straight line in the horizontal direction is $N_{RH}$ and the inter-element spaces among these antennas are $\beta_1\times d_H$, $\beta_2\times d_H$, . . . , $\beta_{NRH-1}\lambda d_H$, respectively.

Moreover, the number of the transmission antennas 106 arranged on a straight line in the vertical direction is $N_{TV}$ and the inter-element spaces among these antennas are $\gamma_1\times d_V$, $\gamma_2\times d_V$, . . . , $\gamma_{NTV-1}\times d_V$, respectively. Meanwhile, the number of the reception antennas 202 arranged on a straight line in the vertical direction is $N_{RV}$ and the inter-element spaces among these antennas are $\eta_1\times d_V$, $\eta_2\times d_V$, . . . , $\eta_{NRV-1}\times d_V$, respectively.

<Condition A-1>

The sum (aperture length of the reception antennas 202 in the horizontal direction) of the inter-element spaces among the reception antennas 202 arranged on a straight line in the horizontal direction is smaller than the smallest value of the inter-element spaces among the transmission antennas 106 arranged on a straight line in the horizontal direction:

$$\min(\alpha_1,\alpha_2, \dots)>(\beta_1+\beta_2+ \dots).$$

Alternatively, the sum (aperture length of the transmission antennas 106 in the horizontal direction) of the inter-element spaces among the transmission antennas 106 arranged on a straight line in the horizontal direction is smaller than the smallest value of the inter-element spaces among the reception antennas 202 arranged on a straight line in the horizontal direction:

$$\min(\beta_1,\beta_2, \dots>(\alpha_1+\alpha_2+ \dots).$$

In other words, in the horizontal direction, the sum of the inter-element spaces among the transmission antennas 106 or the sum of the inter-element spaces among the reception antennas 202 is smaller than the smallest value of the inter-element spaces among the other antennas.

When the condition A-1 is satisfied, $N_{TH}\times N_{RH}$ horizontal linear array elements are included in the virtual reception array. For example, in the case of $N_{TH}=N_{RH}=3$, the horizontal linear array elements are formed of elements arranged at the following positions:

$\{0, \beta_1, \beta_1+\beta_2,$
$\alpha_1, \alpha_1+\beta_1, \alpha_1+\beta_1+\beta_2,$
$\alpha_2, \alpha_2+\beta_1, \alpha_2+\beta_1+\beta_2\}\times d_H$ <Condition A-2>

The inter-element spaces $\alpha_{nth}$ and $\beta_{nrh}$ are set such that inter-element spaces each between any two of the $N_{TH}\times N_{RH}$ horizontal linear array elements arranged on a straight line in the horizontal direction out of the Nt×Na elements in virtual reception array increase in increments of $d_H$, from $1\times d_H$ to $n\times d_H$ (n is an integer of 2 or more). In this case, the certain number described above is the largest natural number satisfying the following formula:

$$\sum_{nth=1}^{N_{TH}-1} \alpha_{nth} + \sum_{nrth=1}^{N_{RH}-1} \beta_{nrh}$$

<Condition B-1>

The sum (aperture length of the reception antennas 202 in the vertical direction) of the inter-element spaces among the reception antennas 202 arranged on a straight line in the vertical direction is smaller than the smallest value of the inter-element spaces among the transmission antennas 106 arranged on a straight line in the vertical direction:

$$\min(\gamma_1,\gamma_2, \dots)>(\eta_1+\eta_2+ \dots)$$

Alternatively, the sum (aperture length of the transmission antennas 106 in the vertical direction) of the inter-element spaces among the transmission antennas 106 arranged on a straight line in the vertical direction is smaller than the smallest value of the inter-element spaces among the reception antennas 202 arranged on a straight line in the vertical direction:

$$\min(\eta_1,\eta_2, \dots)>(\gamma_1+\gamma_2+ \dots)$$

In other words, in the vertical direction, the sum of the inter-element spaces among the transmission antennas 106 or the sum of the inter-element spaces among the reception antennas 202 is smaller than the smallest value of the inter-element spaces among the other antennas.

When the condition B-1 is satisfied, $N_{TV}\times N_{RV}$ vertical linear array elements are included in the virtual reception array. For example, in the case of $N_{TV}=N_{RV}=3$, the vertical linear array elements are formed of elements arranged at the following positions:

$\{0, \eta_1, \eta_1+n_2,$
$\gamma_1, \gamma_1+\eta_1, \gamma_1+\eta_1+\eta_2,$
$\gamma_2, \gamma_2+\eta_1, \gamma_2+\eta_1+\eta_2\}\times d_V$ <Condition B-2>

The inter-element spaces $\gamma_{ntv}$ and $\eta_{nrv}$ are set such that an inter-element spaces each between any two of the $N_{TV}\times N_{RV}$ vertical linear array elements arranged on a straight line in the vertical direction out of the Nt×Na elements in the virtual reception array increase in increments of $d_V$, from $1\times d_V$ to $n\times d_V$ (n is an integer of 2 or more). In this case, the certain number described above is the largest natural number satisfying the following formula:

$$\sum_{ntv=1}^{N_{TV}-1} \gamma_{nth} + \sum_{nrtv=1}^{N_{RV}-1} \eta_{nrh}$$

The conditions A-1, A-2, B-1, and B-2 have been described above.

The virtual reception array satisfying the conditions A-1, A-2, B-1, and B-2 achieves an array arrangement which minimizes redundancy of the inter-element spaces each between any two array elements in the non-uniform linear array longest in the horizontal direction and in the non-uniform linear array longest in the vertical direction (Minimum Redundancy Array. See, for example, A. Moffet, "Minimum-redundancy linear arrays", Antennas and Propagation, IEEE Transactions on, vol. 16, no. 2, (1968), pp. 172-175). This can increase an array aperture of the radar device and thereby improve the angular resolution thereof. Moreover, since spatial sampling by the array elements can be performed in basic units (for example, $d_H$, $d_V$: about 0.5λ) in which no grating lobes are generated within the detection range, it is possible to suppress grating lobes and side lobes.

Figure 7A:
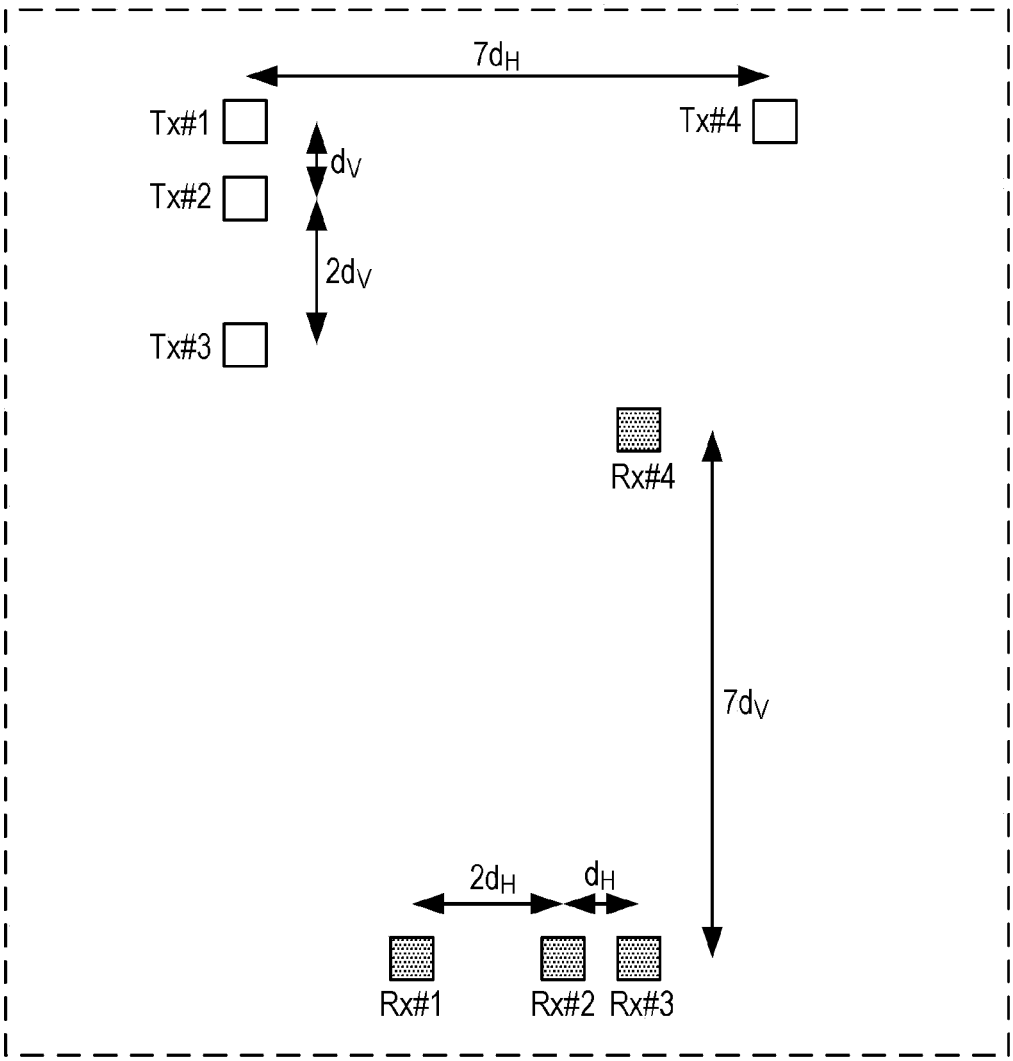
FIG. 7A is a view illustrating an arrangement example of the transmission antennas and the reception antennas in Embodiment 1 of the present disclosure.
Figure 7B:
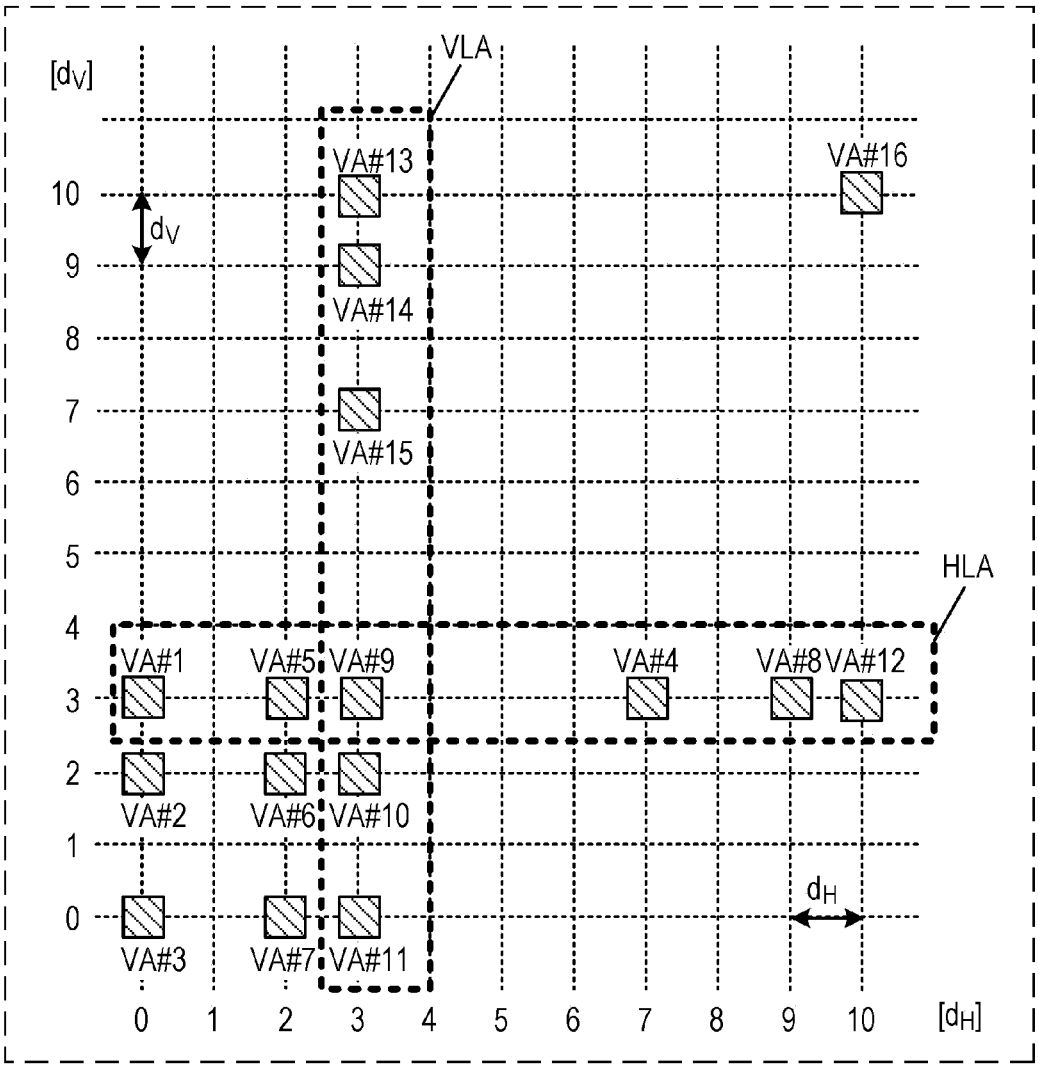
FIG. 7B is a view illustrating an arrangement example of a virtual reception array in Embodiment 1 of the present disclosure.

Next, FIG. 7A illustrates an antenna arrangement example of the transmission antennas 106 and the reception antennas 202. FIG. 7B illustrates elements arrangement of a virtual reception array obtained from the antenna arrangement illustrated in FIG. 7A.

In this example, the number Nt of the transmission antennas 106 is four and the number Na of the reception antennas 202 is four. Moreover, the four transmission antennas 106 are denoted respectively by Tx#1 to Tx#4, and the four reception antennas 202 are denoted respectively by Rx#1 to Rx#4.

In FIG. 7A, the transmission antennas Tx#1 to Tx#4 are arranged such that one antenna is arranged on the right side of the transmission antenna Tx#1 in the horizontal direction (L shape turned +90°), the transmission antenna Tx#1 being a base point and being the top antenna out of three antennas arranged in the vertical direction. Meanwhile, the reception antennas Rx#1 to Rx#4 are arranged such that one antenna is arranged above the reception antenna Rx#3 in the vertical direction (L shape turned −90°), the reception antenna Rx#3 being a base point and being the rightmost antenna out of three antennas arranged in the horizontal direction.

Moreover, in FIGS. 7A and 7B, $d_H$ denotes a basic unit of the inter-element spaces in the horizontal direction and $d_V$ denotes a basic unit of the inter-element spaces in the vertical direction. In FIG. 7A, the inter-element space between the transmission antennas 106 in the horizontal direction is $7d_H$ and the inter-element spaces among the transmission antennas 106 in the vertical direction are $d_V$ and $2d_V$. Moreover, in FIG. 7A, the inter-element spaces among the reception antennas 202 in the horizontal direction are $2d_H$ and $d_H$ and the inter-element space between the reception antennas 202 in the vertical direction is $7d_V$.

In FIG. 7A, the sum ($3d_H$) of the inter-element spaces among the reception antennas 202 in the horizontal direction is smaller than the smallest value ($7d_H$) of the inter-element space between the transmission antennas 106 in the horizontal direction. Moreover, in FIG. 7A, the sum ($3d_V$) of the inter-element spaces among the transmission antennas 106 in the vertical direction is smaller than the smallest value ($7d_V$) of the inter-element space between the reception antennas 202 in the vertical direction. In other words, the antenna arrangement of FIG. 7A satisfies the conditions A-1 and B-1 described above.

Furthermore, in FIG. 7A, the largest value ($7d_H$) of the inter-element space between the transmission antennas 106 which are the antennas fewer in number out of the $N_{TH}$ transmission antennas 106 and the $N_{RH}$ reception antennas 202 arranged in the horizontal direction is greater than the largest value ($2d_H$) of the inter-element spaces among the reception antennas 202 which are the antennas more in number. Similarly, in FIG. 7A, the largest value ($7d_V$) of the inter-element space between the reception antennas 202 which are the antennas fewer in number out of the $N_{TV}$ transmission antennas 106 and the $N_{RV}$ reception antennas 202 arranged in the vertical direction is greater than the largest value ($2d_V$) of the inter-element spaces among the transmission antennas 106 which are the antennas more in number.

Moreover, it is preferable that the Nt transmission antennas 106 are arranged such that $N_{TH}\times N_{TV}$ takes the largest value and the Na reception antennas 202 are arranged such that $N_{RH}\times N_{RV}$ takes the largest value. For example, in FIG. 7A, the Nt (=four) transmission antennas 106 are arranged such that $(N_{TH}\times N_{TV})=(2\times 3)$, and the Na (=four) reception antennas 202 are arranged such that $(N_{RH}\times N_{RV})=(3\times 2)$. This can maximize the aperture surface of the virtual reception array formed by the Nt transmission antennas 106 and the Na reception antennas 202.

The elements arrangement of the virtual reception array illustrated in FIG. 7B and provided by the antenna arrangement illustrated in FIG. 7A described above has the following characteristics.

(1) Horizontal Direction

Due to horizontal positional relationships among the two transmission antennas Tx#1 and Tx#4 arranged with an inter-element space $7d_H$ in the horizontal direction and the three reception antennas Rx#1, Rx#2, and Rx#3 arranged with inter-element spaces $2d_H$ and $d_H$ in the horizontal direction in FIG. 7A, the virtual reception array illustrated in FIG. 7B includes a virtual horizontal linear array antenna HLA including six elements arranged on a straight line with inter-element spaces $2d_H$, $d_H$, $4d_H$, $2d_H$, and $d_H$ in the horizontal direction (VA#1, VA#5, VA#9, VA#4, VA#8, and VA#12 surrounded by the broken line illustrated in FIG. 7B).

When the horizontal position of VA#1 is a reference, the horizontal coordinates ($x_1$, $x_2$, $x_3$, $x_4$, $x_5$, $x_6$) of the six elements (VA#1, VA#5, VA#9, VA#4, VA#8, VA#12) forming the virtual horizontal linear array antenna HLA are such that $(x_1, x_2, x_3, x_4, x_5, x_6)=[0, 2d_H, 3d_H, 7d_H, 9d_H, 10d_H]$.

The inter-element spaces $|x_A-x_B|$ (where A and B are each one of integers from one to six, and A≠B) each between any two different elements included in the virtual horizontal linear array antenna HLA are $\{1, 2, 3, 4, 5, 6, 7, 8, 9, 10\}\times d_H$. By using the virtual horizontal linear array antenna HLA including six elements, it is possible to perform direction-of-arrival estimation in which an uniform linear array including 11 elements arranged with inter-element spaces of the basic unit $d_H$ in the horizontal direction are virtually assumed to be used.

For example, by setting $d_H$ to 0.5λ, the radar device 10 can perform the direction-of-arrival estimation with the generation of grating lobes being suppressed in a wide range from −90° to +90° in the horizontal direction. Moreover, since the array aperture length of the radar device 10 is $10d_H=5\lambda$, the beam width BW thereof is about 8° and the radar device 10 can achieve high angular resolution of BW=10° or less.

The specific direction estimation processing in the horizontal direction in the direction estimator 214 is performed as follows.

First, each of the inter-element spaces between two elements which is $\{1, 2, 3, 4, 5, 6, 7, 8, 9, 10\}\times d_H$ described above in FIG. 7B can be obtained, for example, from one of the following combinations of the virtual antenna elements (VA) elements of the virtual reception array in the horizontal direction:

Inter-element Space of $1\times d_H$: Combination of VA#5 and VA#9

Inter-element Space of $2\times d_H$: Combination of VA#4 and VA#8

Inter-element Space of $3\times d_H$: Combination of VA#1 and VA#9

Inter-element Space of $4\times d_H$: Combination of VA#9 and VA#4

Inter-element Space of $5\times d_H$: Combination of VA#5 and VA#4

Inter-element Space of $6\times d_H$: Combination of VA#9 and VA#8

Inter-element Space of $7\times d_H$: Combination of VA#1 and VA#4

Inter-element Space of $8\times d_H$: Combination of VA#5 and VA#12

Inter-element Space of $9\times d_H$: Combination of VA#1 and VA#8

Inter-element Space of $10\times d_H$: Combination of VA#1 and VA#12.

Specifically, each of the inter-element spaces between any two of the $N_{TH}\times N_{RH}$ virtual antenna elements (VA) arranged on a straight line in the horizontal direction is a product of $d_H$ and an integer of 1 or more, the any two virtual antenna elements are elements the inter-element space between which is a product of the space $d_H$ and an integer, and the inter-element spaces are values including products of $d_H$ and all integers from 1 to a predetermined value. In other words, the antenna arrangement of FIG. 7A satisfies the condition A-2 described above.

When there are multiple combinations of elements the inter-element spaces among which are the same, it is possible to select one of the combinations or perform averaging processing for the multiple combinations (an example in which one combination is selected is described herein).

The element numbers (numbers of VA#) of the virtual reception array correspond to the element numbers of the column vector of the virtual reception array correlation vector $h_{_after_cal}(k, fs, w)$ which is illustrated in the formula (6) and in which the deviations among the antennas are corrected. For example, VA#1 corresponds to the first element $h_1(k, fs, w)$ out of the column vector elements of $h_{_after_cal}(k, fs, w)$. The same applies to the other elements VA#2 to VA#16.

The direction estimator 214 generates a correlation vector $h_{VAH}(k, fs, w)$ of the uniform linear array including 11 elements arranged with the inter-element spaces of the basic unit $d_H$ in the horizontal direction, based on combinations of the inter-element spaces and the virtual antenna elements (VA) described above. The correlation vector $h_{VAH}(k, fs, w)$ of the uniform linear array is expressed by the following formula. Note that the number of elements in the correlation vector $h_{VAH}(k, fs, w)$ of the uniform linear array in the horizontal direction is expressed as $N_{VAH}$ ($N_{VAH}$=11 in FIG. 7B):

$$h_{VAH}(k, fs, w) = \begin{pmatrix} h_5(k, fs, w)h_9^*(k, fs, w) \\ h_4(k, fs, w)h_8^*(k, fs, w) \\ h_1(k, fs, w)h_9^*(k, fs, w) \\ h_9(k, fs, w)h_4^*(k, fs, w) \\ h_5(k, fs, w)h_4^*(k, fs, w) \\ h_9(k, fs, w)h_8^*(k, fs, w) \\ h_1(k, fs, w)h_4^*(k, fs, w) \\ h_5(k, fs, w)h_{12}^*(k, fs, w) \\ h_1(k, fs, w)h_8^*(k, fs, w) \\ h_1(k, fs, w)h_{12}^*(k, fs, w) \end{pmatrix}. \tag{7}$$

In horizontal direction-of-arrival estimation, the direction estimator 214 calculates a spatial profile with an azimuth direction θ in a direction estimation evaluation function value $P_H(\theta, k, fs, w)$ being variable within a certain angular range, extracts a certain number of maximum peaks in the calculated spatial profile in the descending order, and outputs the azimuth directions of the maximum peaks as direction-of-arrival estimation values.

Note that the evaluation function value $P_H(\theta, k, fs, w)$ can be calculated by various methods by using a direction-of-arrival estimation algorithm. For example, an estimation method using an array antenna which is disclosed in Direction-of-arrival estimation using signal subspace modeling Cadzow, J. A.; Aerospace and Electronic Systems, IEEE Transactions on Volume: 28, Issue: 1 Publication Year: 1992, Page(s): 64-79 can be used. Moreover, in the case where multiple waves with a high correlation arrive, it is possible to apply a spatial smoothing method for correlation suppression after applying various direction-of-arrival estimation algorithms. This can be similarly applied also to the direction-of-arrival estimation processing to be described below.

For example a beamformer method can be expressed by the following formulae. Alternatively, other methods such as the Capon and the MUSIC can be similarly applied:

$$P_H(\theta_u, k, fs, w) = \left|a_H(\theta_u)^H h_{VAH}(k, fs, w)\right|^2 \tag{8}$$

$$a_H(\theta_u) = \begin{bmatrix} 1 \\ \exp\{-j2\pi d_H \sin\theta_u / \lambda\} \\ \vdots \\ \exp\{-j2\pi(N_{VAH}-1)d_H \sin\theta_u / \lambda\} \end{bmatrix} \tag{9}$$

In these formulae, subscript H is the Hermitian transpose operator. Moreover, $a_H(\theta_u)$ is a direction vector of the virtual reception array for a wave arriving from the azimuth direction $\theta_u$.

Furthermore, the azimuth direction $\theta_u$ is a vector changed at certain direction intervals $\beta_1$ within an azimuth range in which the direction-of-arrival estimation is performed. For example, $\theta_u$ is set as follows:

$$\theta_u=\theta\ \min+u\beta_1, u=0, \ldots, NU$$

$$NU=\text{floor}[(\theta\ \max-\theta\ \min)/\beta_1]+1$$

where, floor(x) is a function which returns the largest integer not exceeding a real number x.

Figure 8:
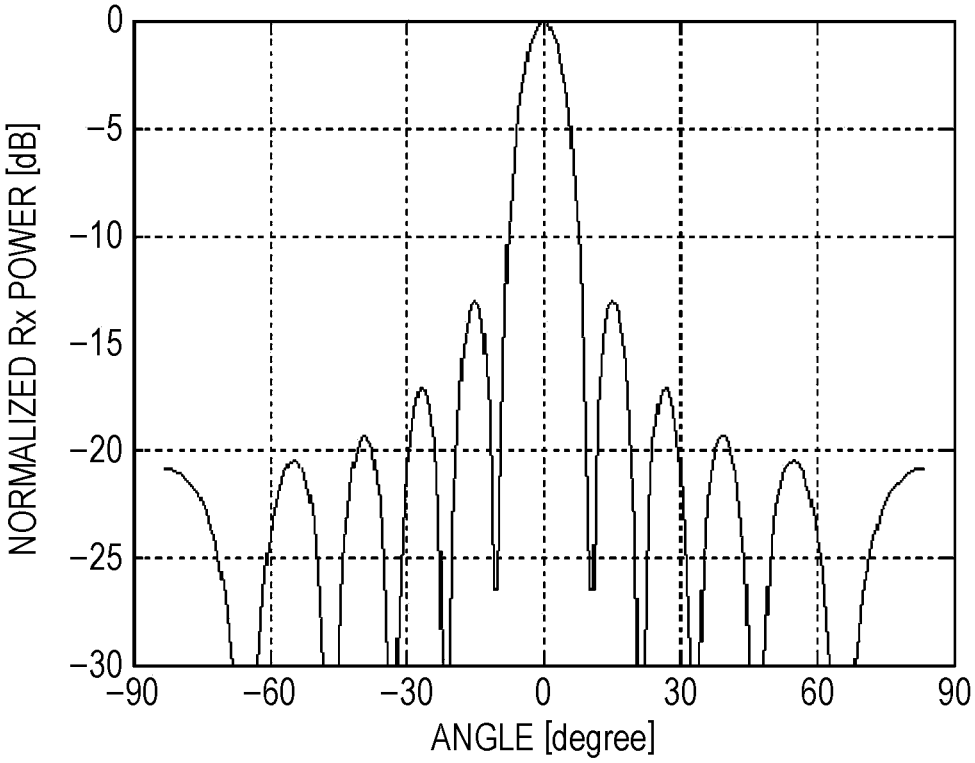
FIG. 8 is a graph depicting a directional pattern of the virtual reception array in Embodiment 1 of the present disclosure.

FIG. 8 illustrates a direction estimation result (calculator simulation result) obtained by using the configuration described above. In FIG. 8, simulation conditions are such that the beamformer method is used and a target direction is set to 0°. Moreover, the direction estimation result illustrated in FIG. 8 is a result of the direction-of-arrival estimation performed while virtually assuming that the radar device 10 has the uniform linear array including 11 elements arranged with the inter-element spaces of the basic unit $d_H$ in the horizontal direction.

As illustrated in FIG. 8, it is found that the beam width BW of the beam in the target direction 0° is about 8°, the side lobe level of 13 dB or lower is obtained, and the no grating lobes are generated.

(2) Vertical Direction

Due to vertical positional relationships among the three transmission antennas Tx#1, Tx#2, and Tx#3 arranged with inter-element spaces $d_V$ and $2d_V$ in the vertical direction and the two reception antennas Rx#3 and Rx#4 arranged with an inter-element space $7d_V$ in the vertical direction in FIG. 7A, the virtual reception array illustrated in FIG. 7B form a virtual vertical linear array antenna VLA including six elements arranged on a straight line with inter-element spaces $2d_V$, $d_V$, $4d_V$, $2d_V$, and $d_V$ in the vertical direction (VA#11, VA#10, VA#9, VA#15, VA#14, and VA#13 surrounded by the broken line illustrated in FIG. 7B).

When the vertical position of VA#11 is a reference, the vertical coordinates $(y_1, y_2, y_3, y_4, y_5, y_6)$ of the six elements (VA#11, VA#10, VA#9, VA#15, VA#14, VA#13) forming the virtual vertical linear array antenna VLA are such that $(y_1, y_2, y_3, y_4, y_5, y_6)=[0, 2d_V, 3d_V, 7d_V, 9d_V, 10d_V]$.

The inter-element spaces $|y_A-y_B|$ (where A and B are each one of integers from one to six, and A≠B) each between any two different elements included in the virtual vertical linear array antenna VLA are $\{1, 2, 3, 4, 5, 6, 7, 8, 9, 10\}\times d_V$. By using the virtual vertical linear array antenna VLA including six elements, the radar device 10 can be virtually assumed to have a uniform linear array including 11 elements arranged with inter-element spaces of the basic unit $d_V$ in the vertical direction, and perform the direction-of-arrival estimation with high angular resolution.

For example, in the case of $d_V=0.5\lambda$, the radar device 10 can perform the direction-of-arrival estimation with the generation of grating lobes being suppressed in a wide range from −90° to +90° in the vertical direction. Moreover, since the array aperture length of the radar device 10 is $10d_V=5\lambda$, the beam width BW thereof is about 8° and the radar device 10 can achieve high angular resolution of BW=10° or less.

The specific direction estimation processing in the vertical direction in the direction estimator 214 is performed as follows.

First, each of the inter-element spaces between two elements which is $\{1, 2, 3, 4, 5, 6, 7, 8, 9, 10\}\times d_V$ described above in FIG. 7B can be obtained, for example, from one of the following combinations of the virtual reception array of virtual antenna elements (VA) in the vertical direction:

Inter-element Space of $1\times d_V$: Combination of VA#10 and VA#9

Inter-element Space of $2\times d_V$: Combination of VA#11 and VA#10

Inter-element Space of $3\times d_V$: Combination of VA#11 and VA#9

Inter-element Space of $4\times d_V$: Combination of VA#9 and VA#15

Inter-element Space of $5\times d_V$: Combination of VA#10 and VA#15

Inter-element Space of $6\times d_V$: Combination of VA#9 and VA#14

Inter-element Space of $7\times d_V$: Combination of VA#10 and VA#14

Inter-element Space of $8\times d_V$: Combination of VA#10 and VA#13

Inter-element Space of $9\times d_V$: Combination of VA#11 and VA#14

Inter-element Space of $10\times d_V$: Combination of VA#11 and VA#13.

Specifically, each of the inter-element spaces between any two of the $N_{TV}\times N_{RV}$ virtual antenna elements (VA) arranged on a straight line in the vertical direction is a product of $d_V$ and an integer of 1 or more, the any two virtual antenna elements are elements the inter-element space between which is a product of the space $d_V$ and an integer, and the inter-element spaces are values including products of $d_V$ and all integers from 1 to a predetermined value. In other words, the antenna arrangement of FIG. 7A satisfies the condition B-2 described above.

When there are multiple combinations of elements the inter-element spaces among which are the same, it is possible to select one of the combinations or perform averaging processing for the multiple combinations (an example in which one combination is selected is described herein).

The element numbers (numbers of VA#) of the virtual antenna elements (VA) correspond to the element numbers of the column vector of the virtual reception array correlation vector $h_{_after_cal}(k, fs, w)$ which is illustrated in the formula (6) and in which the deviations among the antennas are corrected. For example, VA#1 corresponds to the first element $h_1(k, fs, w)$ out of the column vector elements of $h_{_after_cal}(k, fs, w)$. The same applies to the other elements VA#2 to VA#16.

The direction estimator 214 generates a correlation vector $h_{VAV}(k, fs, w)$ of the uniform linear array including 11 elements arranged with the inter-element spaces of the basic unit $d_V$ in the vertical direction, based on combinations of the inter-element spaces and the virtual antenna elements (VA) described above. The correlation vector $h_{VAV}(k, fs, w)$ of the uniform linear array is expressed by the following formula. Note that the number of elements in the correlation vector $h_{VAV}(k, fs, w)$ of the uniform linear array in the vertical direction is expressed as $$N_{VAV}(N_{VAV} = 11 \text{ in FIG. 7B}): \tag{10}$$

$$h_{VAV}(k, fs, w) = \begin{pmatrix} h_{10}(k, fs, w)h_9^*(k, fs, w) \\ h_{11}(k, fs, w)h_{10}^*(k, fs, w) \\ h_{11}(k, fs, w)h_9^*(k, fs, w) \\ h_9(k, fs, w)h_{15}^*(k, fs, w) \\ h_{10}(k, fs, w)h_{15}^*(k, fs, w) \\ h_9(k, fs, w)h_{14}^*(k, fs, w) \\ h_{10}(k, fs, w)h_4^*(k, fs, w) \\ h_{10}(k, fs, w)h_{13}^*(k, fs, w) \\ h_{11}(k, fs, w)h_{14}^*(k, fs, w) \\ h_{11}(k, fs, w)h_{13}^*(k, fs, w) \end{pmatrix}$$

In vertical direction-of-arrival estimation, the direction estimator 214 calculates a spatial profile with an elevation direction $\varphi$ in a direction estimation evaluation function value $P_V(\varphi, k, fs, w)$ being variable within a certain angular range, extracts a certain number of maximum peaks in the calculated spatial profile in the descending order, and outputs the elevation directions of the maximum peaks as direction-of-arrival estimation values.

Note that the evaluation function value $P_V(\varphi, k, fs, w)$ can be calculated by various methods by using a direction-of-arrival estimation algorithm. For example, an estimation method using an array antenna which is disclosed in Direction-of-arrival estimation using signal subspace modeling Cadzow, J. A.; Aerospace and Electronic Systems, IEEE Transactions on Volume: 28, Issue: 1 Publication Year: 1992, Page(s): 64-79 can be used. Moreover, in the case where multiple waves with a high correlation arrive, it is possible to apply a spatial smoothing method for correlation suppression after applying various direction-of-arrival estimation algorithms. This can be similarly applied also to the direction-of-arrival estimation processing to be described below.

For example a beamformer method can be expressed by the following formulae. Alternatively, other methods such as the Capon and the MUSIC can be similarly applied:

$$P_V(\phi_v, k, fs, w) = \left|a_V(\phi_v)^H h_{VAV}(k, fs, w)\right|^2 \tag{11}$$

$$a_V(\phi_v) = \begin{bmatrix} 1 \\ \exp\{-j2\pi d_V \sin\phi_v / \lambda\} \\ \vdots \\ \exp\{-j2\pi(N_{VAV}-1)d_H \sin\phi_v / \lambda\} \end{bmatrix} \tag{12}$$

In these formulae, subscript H is the Hermitian transpose operator. Moreover, $a_V(\varphi_v)$ is a direction vector of the virtual reception array for a wave arriving from the elevation direction $\varphi_v$.

Furthermore, $\varphi_v$ is a vector changed at certain direction intervals $\beta_2$ within an elevation range in which the direction-of-arrival estimation is performed. For example, $\varphi_v$ is set as follows:

$$\varphi_v = \varphi\ \min + v\beta_2, v = 0, \ldots, NV$$

$$NV = \text{floor}[(\varphi\ \max - \varphi\ \min)/\beta_2] + 1$$

The characteristics of the virtual antenna elements arrangement of the virtual reception array illustrated in FIG. 7B have been described.

Note that, in the embodiment, the direction vector of the virtual reception array is assumed to be calculated in advance based on the virtual antenna elements arrangement VA#1, . . . , VA#(Nt×Na) of the virtual reception array to be described later.

Moreover, the time information k described above can be converted to distance information and then outputted. In the case of converting the time information k to distance information R(k), the following formula can be used:

$$R(k) = k\frac{T_w C_0}{2L}, \tag{13}$$

where $T_w$ is the code transmission duration, L is the pulse code length, and $C_0$ is a light speed Moreover, Doppler frequency information ($fs\Delta\phi$) may be converted to a relative speed component and then outputted. The Doppler frequency information $fs\Delta\phi$ can be converted to the relative speed component $v_d(f_s)$ by using the following formula:

$$v_d(f_2) = \frac{\lambda}{2} f_s \Delta\theta, \tag{14}$$

where $\lambda$ is the wavelength of the carrier frequency of the RF signal outputted from the transmission radio unit 105.

As described above, in the radar device with relatively few antenna elements of four transmission antennas and four reception antennas, the aperture surface formed of the virtual reception array illustrated in FIG. 7B can be maximized in the horizontal direction and the vertical direction by using the antennas arrangement illustrated in FIG. 7A.

In other words, in the embodiment, in the radar device 10, when the beam scanning is two-dimensionally performed in the vertical direction and the horizontal direction by using the MIMO radar, the aperture lengths of the virtual reception array in the vertical direction and the horizontal direction can be increased as much as possible.

Moreover, in the radar device 10, it is possible to set the inter-element spaces ($d_H$, $d_V$) among the reception antennas 202 in both of the horizontal direction and the vertical direction to, for example, 0.5λ, and achieve high resolution of Fourier beam width BW=about 8° in Fourier beam scanning with equal amplitude weight. In other words, the radar device 10 can achieve high resolution in the horizontal direction and the vertical direction without using a direction-of-arrival estimation algorithm capable of achieving high resolution, which leads to a low computation amount.

As described above, in the embodiment, it is possible to improve the angular resolution with few antennas by using the virtual reception array described above and thereby reduce the size and cost of the radar device 10.

Note that a space between the set of transmission antennas Tx#1 to Tx#4 and the set of reception antennas Rx#1 to Rx#4 in FIG. 7A does not affect the virtual antenna elements arrangement of the virtual reception array. However, arranging the set transmission antennas Tx#1 to Tx#4 and the set of reception antennas Rx#1 to Rx#4 close to each other increases the degree of coupling among the transmission and reception antennas. Accordingly, the set of transmission antennas Tx#1 to Tx#4 and the set of reception antennas Rx#1 to Rx#4 are preferably arranged away from each other as much as possible within an allowable antenna size. The same applies to the other antenna arrangements to be described below.

Moreover, FIG. 7A illustrates an example of the antenna arrangement for four transmission antennas and four reception antennas. However, a configuration similar to the virtual antenna elements arrangement of the virtual reception array illustrated in FIG. 7B is obtained also when the reception antennas are arranged in the transmission antenna arrangement of FIG. 7A and the transmission antennas are arranged in the reception antenna arrangement of FIG. 7A, and similar effects can be obtained also in this case. The same applies to the other antenna arrangements to be described below.

(Variation 1 of Embodiment 1)

Figure 9A:
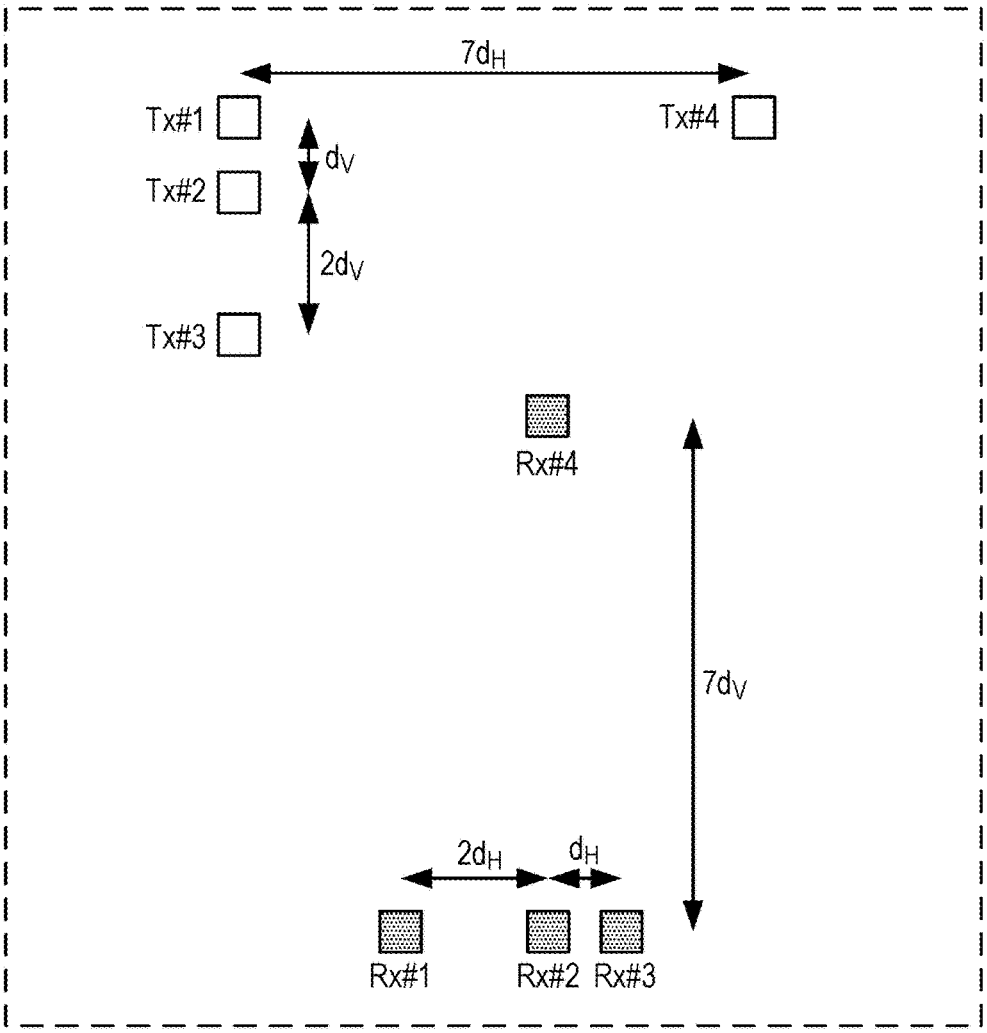
FIG. 9A is a view illustrating an arrangement example of the transmission antennas and the reception antennas in Variation 1 of Embodiment 1 of the present disclosure.
Figure 9B:
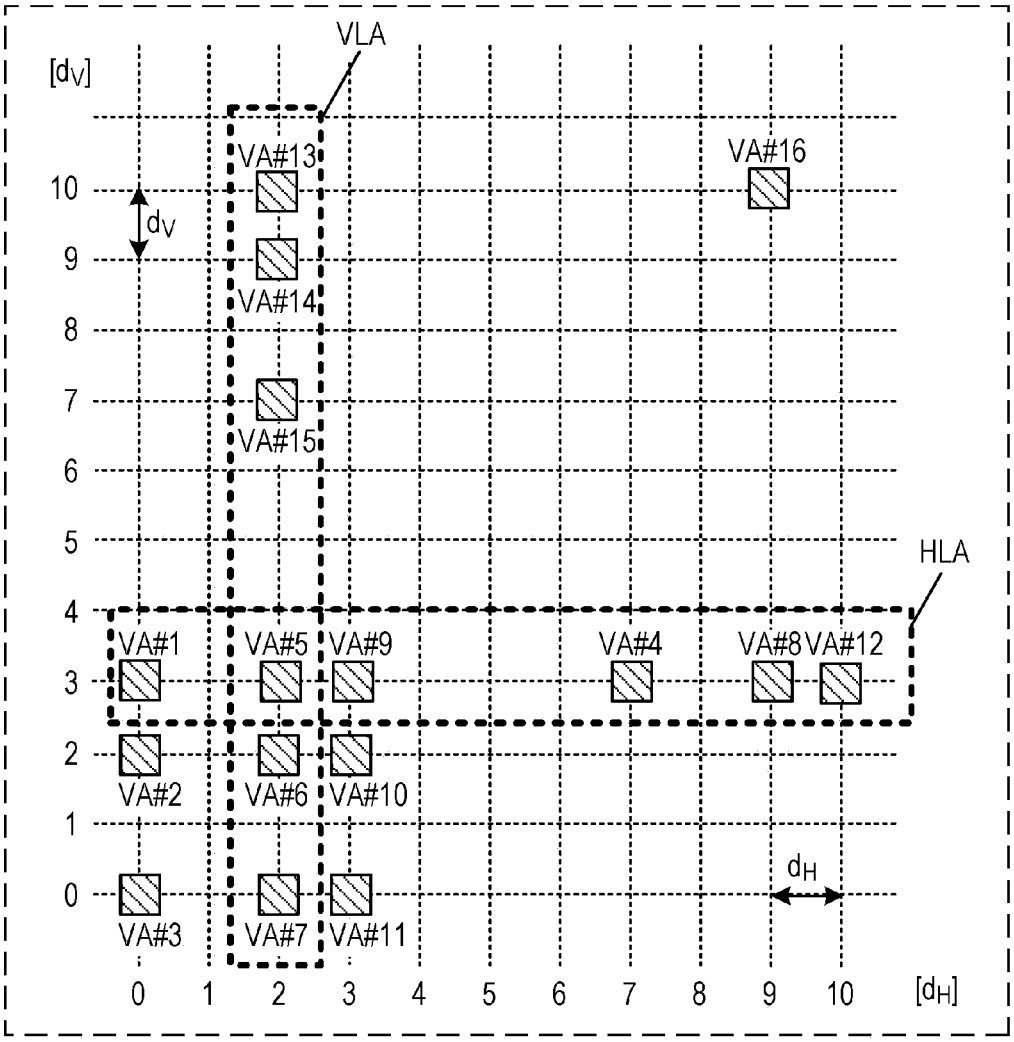
FIG. 9B is a view illustrating an arrangement example of the virtual reception array in Variation 1 of Embodiment 1 of the present disclosure.

The antenna arrangement for the four transmission antennas 106 and the four reception antennas 202 is not limited to the antenna arrangement illustrated in FIG. 7A. For example, FIG. 9A illustrates another antenna arrangement example for the four transmission antennas 106 and the four reception antennas 202. FIG. 9B illustrates a virtual antenna elements arrangement of virtual reception array obtained from the antenna arrangement illustrated in FIG. 9A.

FIG. 9A illustrates an arrangement pattern of the transmission antennas Tx#1 to Tx#4 in which one antenna is arranged on the right side of the transmission antenna Tx#1 in the horizontal direction as in FIG. 7A, the transmission antenna Tx#1 being a base point and being the top antenna out of three antennas arranged in the vertical direction. Meanwhile, in FIG. 9A, the reception antennas Rx#1 to Rx#4 are arranged such that one antenna is arranged above the reception antenna Rx#2 in the vertical direction (T-shape turned 180°), the reception antenna Rx#2 being a base point and being the middle antenna out of three antennas arranged in the horizontal direction.

The virtual antenna elements arrangement of the virtual reception array illustrated in FIG. 9B which is provided by the antenna arrangement illustrated in FIG. 9A has the characteristics (1) and (2) described above as in FIG. 7B. The characteristics are specifically described below by using FIGS. 9A to 9B.

(1) Horizontal Direction

Due to horizontal positional relationships among the two transmission antennas Tx#1 and Tx#4 arranged with an inter-element space $7d_H$ in the horizontal direction and the three reception antennas Rx#1, Rx#2, and Rx#3 arranged with the inter-element spaces $2d_H$ and $d_H$ in the horizontal direction in FIG. 9A, the virtual reception array illustrated in FIG. 9B includes a virtual horizontal linear array antenna HLA including six elements arranged on a straight line with inter-element spaces $2d_H$, $d_H$, $4d_H$, $2d_H$, and $d_H$ in the horizontal direction (VA#1, VA#5, VA#9, VA#4, VA#8, and VA#12 surrounded by the broken line illustrated in FIG. 9B).

When the horizontal position of VA#1 is a reference, the horizontal coordinates $(x_1, x_2, x_3, x_4, x_5, x_6)$ of the six elements (VA#1, VA#5, VA#9, VA#4, VA#8, VA#12) forming the virtual horizontal linear array antenna HLA are such that $(x_1, x_2, x_3, x_4, x_5, x_6)=[0, 2d_H, 3d_H, 7d_H, 9d_H, 10d_H]$.

The inter-element spaces $|x_A-x_B|$ (where A and B are each one of integers from one to six, and A≠B) each between any two different elements included in the virtual horizontal linear array antenna HLA are $\{1, 2, 3, 4, 5, 6, 7, 8, 9, 10\}\times d_H$. By using the virtual horizontal linear array antenna HLA including six elements, the radar device 10 can be virtually assumed to have an uniform linear array including 11 elements arranged with inter-element spaces of the basic unit $d_H$ in the horizontal direction, and perform the direction-of-arrival estimation with high angular resolution.

For example, in the case of $d_H=0.5\lambda$, the radar device 10 can perform the direction-of-arrival estimation with the generation of grating lobes being suppressed in a wide range from −90° to +90° in the horizontal direction. Moreover, since the array aperture length of the radar device 10 is $10d_H=5\lambda$, the beam width BW thereof is about 8° and the radar device 10 can achieve high angular resolution of BW=10° or less.

(2) Vertical Direction

Due to vertical positional relationships among the three transmission antennas Tx#1, Tx#2, and Tx#3 arranged with inter-element spaces $d_V$ and $2d_V$ in the vertical direction and the two reception antennas Rx#2 and Rx#4 arranged with an inter-element space $7d_V$ in the vertical direction in FIG. 9A, the virtual reception array illustrated in FIG. 9B includes a virtual vertical linear array antenna VLA including six elements arranged on a straight line with inter-element spaces $2d_V$, $d_V$, $4d_V$, $2d_V$, and $d_V$ in the vertical direction (VA#7, VA#6, VA#5, VA#15, VA#14, and VA#13 surrounded by the broken line illustrated in FIG. 9B).

When the vertical position of VA#7 is a reference, the vertical coordinates $(y_1, y_2, y_3, y_4, y_5, y_6)$ of the six elements (VA#7, VA#6, VA#5, VA#15, VA#14, VA#13) forming the virtual vertical linear array antenna VLA are such that $(y_1, y_2, y_3, y_4, y_5, y_6)=[0, 2d_V, 3d_V, 7d_V, 9d_V, 10d_V]$.

The inter-element spaces $|y_A-y_d|$ (where A and B are each one of integers from one to six, and A≠B) each between any two different elements included in the virtual vertical linear array antenna VLA are $\{1, 2, 3, 4, 5, 6, 7, 8, 9, 10\}\times d_V$. By using the virtual vertical linear array antenna VLA including six elements, the radar device 10 can be virtually assumed to have a uniform linear array including 11 elements arranged with inter-element spaces of the basic unit $d_V$ in the vertical direction, and perform the direction-of-arrival estimation with high angular resolution.

For example, in the case of $d_V=0.5\lambda$, the radar device 10 can perform the direction-of-arrival estimation with the generation of grating lobes being suppressed in a wide range from −90° to +90° in the vertical direction. Moreover, since the array aperture length of the radar device 10 is $10d_V=5\lambda$, the beam width BW thereof is about 8° and the radar device 10 can achieve high angular resolution of BW=10° or less.

(Variation 2 of Embodiment 1)

In Embodiment 1, when high angular resolution of about 10° is unnecessary in Embodiment 1 as the angular resolution in the horizontal direction or the vertical direction, the radar device 10 may include only three transmission antennas 106 or three reception antennas 202.

Description is given below of an example in which no high angular resolution is required as the angular resolution in the vertical direction and the radar device 10 includes three transmission antennas 106 and four reception antennas 202.

Figure 10A:
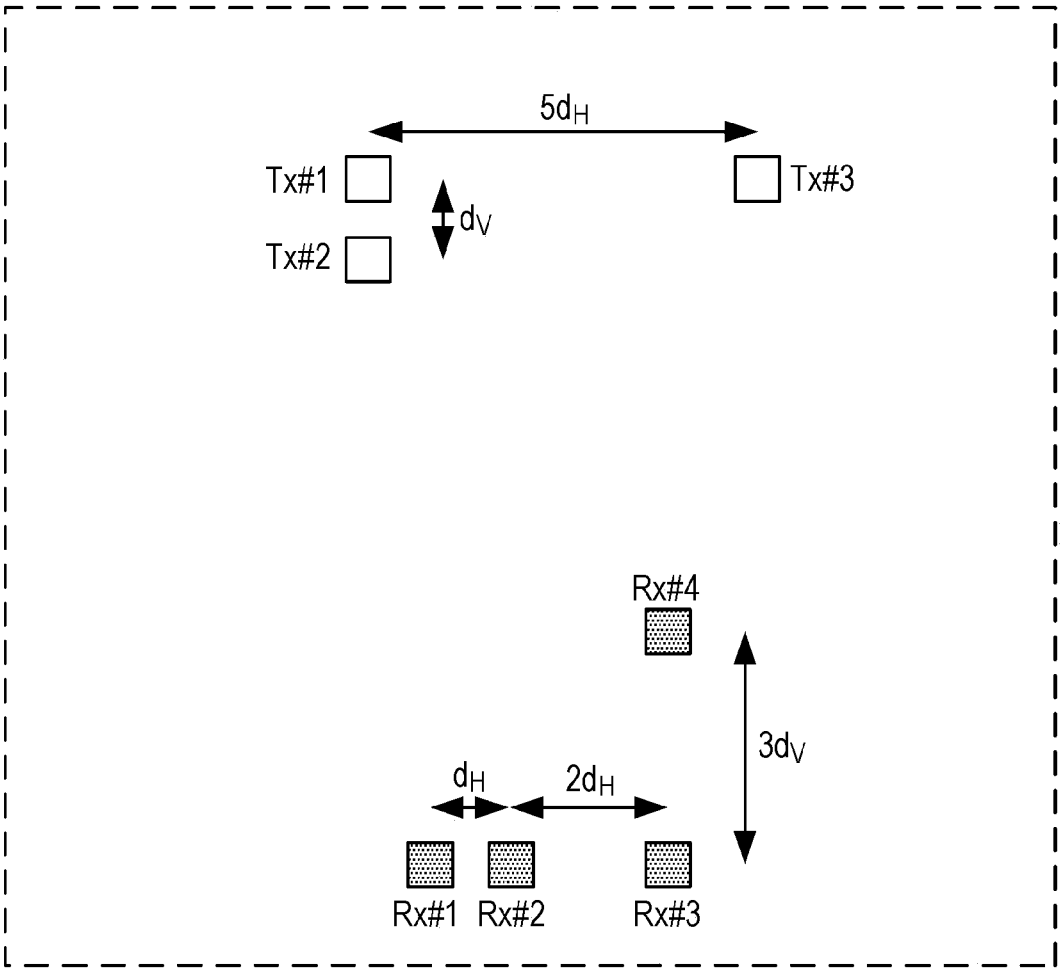
FIG. 10A is a view illustrating an arrangement example of the transmission antennas and the reception antennas in Variation 2 of Embodiment 1 of the present disclosure.
Figure 10B:
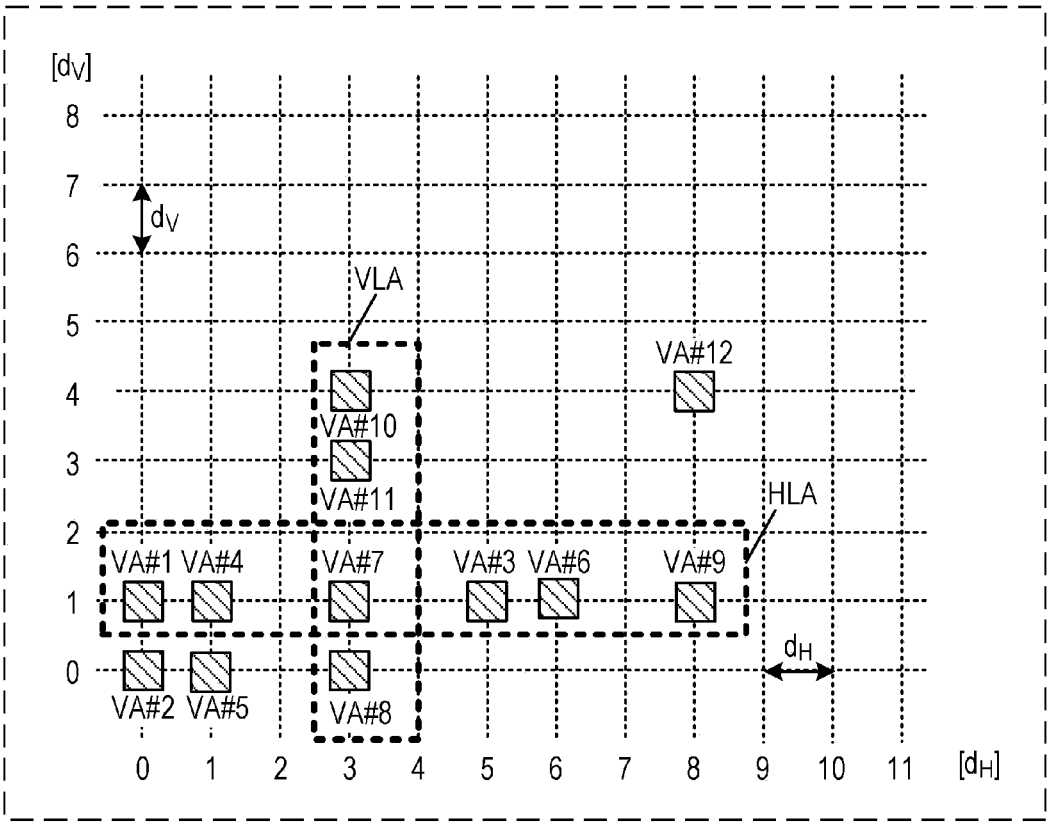
FIG. 10B is a view illustrating an arrangement example of the virtual reception array in Variation 2 of Embodiment 1 of the present disclosure.

FIG. 10A illustrates antennas arrangement example of the transmission antennas 106 and the reception antennas 202. FIG. 10B illustrates virtual antenna elements arrangement of virtual reception array obtained from the antenna arrangement illustrated in FIG. 10A.

In FIG. 10A, the three transmission antennas 106 are denoted respectively by Tx#1 to Tx#3, and the four reception antennas 202 are denoted respectively by Rx#1 to Rx#4. In FIG. 10A, the transmission antennas Tx#1 to Tx#3 are arranged such that one antenna is arranged on the right side of the transmission antenna Tx#1 in the horizontal direction with an inter-element space smaller than an inter-element space in the vertical direction (L shape turned +90°), the transmission antenna Tx#1 being a base point and being the top antenna out of two antennas arranged in the vertical direction. Meanwhile, the reception antennas Rx#1 to Rx#4 are arranged such that one antenna is arranged above the reception antenna Rx#3 in the vertical direction with an inter-element space smaller than an inter-element space in the horizontal direction (L shape turned −90°), the reception antenna Rx#3 being a base point and being the rightmost antenna out of three antennas arranged in the horizontal direction.

Moreover, the arrangement of the transmission antennas 106 and the reception antennas 202 in this variation is assumed to satisfy the restriction conditions A-1, A-2, B-1, and B-2 described in Embodiment 1.

The virtual antenna elements arrangement of the virtual reception array illustrated in FIG. 10B and provided by the antenna arrangement illustrated in FIG. 10A has the following characteristics.

(1) Horizontal Direction

Due to horizontal positional relationships among the two transmission antennas Tx#1 and Tx#3 arranged with an inter-element space $5d_H$ in the horizontal direction and the three reception antennas Rx#1, Rx#2, and Rx#3 arranged with inter-element spaces $d_H$ and $2d_H$ in the horizontal direction in FIG. 10A, the virtual reception array illustrated in FIG. 10B includes a virtual horizontal linear array antenna HLA including six elements arranged on a straight line with inter-element spaces $d_H$, $2d_H$, $2d_H$, $d_H$, and $2d_H$ in the horizontal direction (VA#1, VA#4, VA#7, VA#3, VA#6, and VA#9 surrounded by the broken line illustrated in FIG. 10B).

When the horizontal position of VA#1 is a reference, the horizontal coordinates ($x_1$, $x_2$, $x_3$, $x_4$, $x_5$, $x_6$) of the six elements (VA#1, VA#4, VA#7, VA#3, VA#6, VA#9) forming the virtual horizontal linear array antenna HLA are such that $(x_1, x_2, x_3, x_4, x_5, x_6)=[0, d_H, 3d_H, 5d_H, 6d_H, 8d_H]$.

The inter-element spaces $|x_A-x_B|$ (where A and B are each one of integers from one to six, and A≠B) each between any two different elements included in the virtual horizontal linear array antenna HLA are $\{1, 2, 3, 4, 5, 6, 7, 8\}\times d_H$. By using the virtual horizontal linear array antenna HLA including six elements, the radar device 10 can be virtually assumed to have an uniform linear array including nine elements arranged with inter-element spaces of the basic unit $d_H$ in the horizontal direction, and perform the direction-of-arrival estimation with high angular resolution.

For example, by setting $d_H$ to 0.5λ, the radar device 10 can perform the direction-of-arrival estimation with the generation of grating lobes being suppressed in a wide range from −90° to +90° in the horizontal direction. Moreover, since the array aperture length of the radar device 10 is $8d_H=4\lambda$, the beam width BW thereof is about 10° and the radar device 10 can achieve high angular resolution of BW=10° or less.

(2) Vertical Direction

Due to vertical positional relationships among the two transmission antennas Tx#1 and Tx#2 arranged with an inter-element space $d_V$ in the vertical direction and the two reception antennas Rx#3 and Rx#4 arranged with an inter-element space $3d_V$ in the vertical direction in FIG. 10A, the virtual reception array illustrated in FIG. 10B includes a virtual vertical linear array antenna VLA including four elements arranged on a straight line with inter-element spaces $d_V$, $2d_V$, and $d_V$ in the vertical direction (VA#8, VA#7, VA#11, and VA#10 surrounded by the broken line illustrated in FIG. 10B).

When the vertical position of VA#8 is a reference, the vertical coordinates ($y_1$, $y_2$, $y_3$, $y_4$) of the four elements (VA#8, VA#7, VA#11, VA#10) forming the virtual vertical linear array antenna VLA are such that $(y_1, y_2, y_3, y_4)=[0, d_V, 3d_V, 4d_V]$.

The inter-element spaces $|y_A-y_B|$ (where A and B are each one of integers from one to four, and A≠B) each between any two different elements included in the virtual vertical linear array antenna VLA are $\{1, 2, 3, 4\}\times d_V$. By using the virtual vertical linear array antenna VLA including four elements, the radar device 10 can be virtually assumed to have a uniform linear array including five elements arranged with inter-element spaces of the basic unit $d_V$ in the vertical direction, and perform the direction-of-arrival estimation with high angular resolution.

For example, in the case of $d_V=0.5\lambda$, the radar device 10 can perform the direction-of-arrival estimation with the generation of grating lobes being suppressed in a wide range from −90° to +90° in the vertical direction. Meanwhile, since the array aperture length of the radar device 10 is $4d_V=2\lambda$, the beam width BW thereof is about 20°.

(Variation 3 of Embodiment 1)

In Embodiment 1, the radar device 10 using five or more reception antennas 202 may include three transmission antennas 106. Alternatively, the radar device 10 using five or more transmission antennas 106 may include three reception antennas 202.

Description is given below of an example of the radar device 10 which includes three transmission antennas 106 and five reception antennas 202.

Figure 11A:
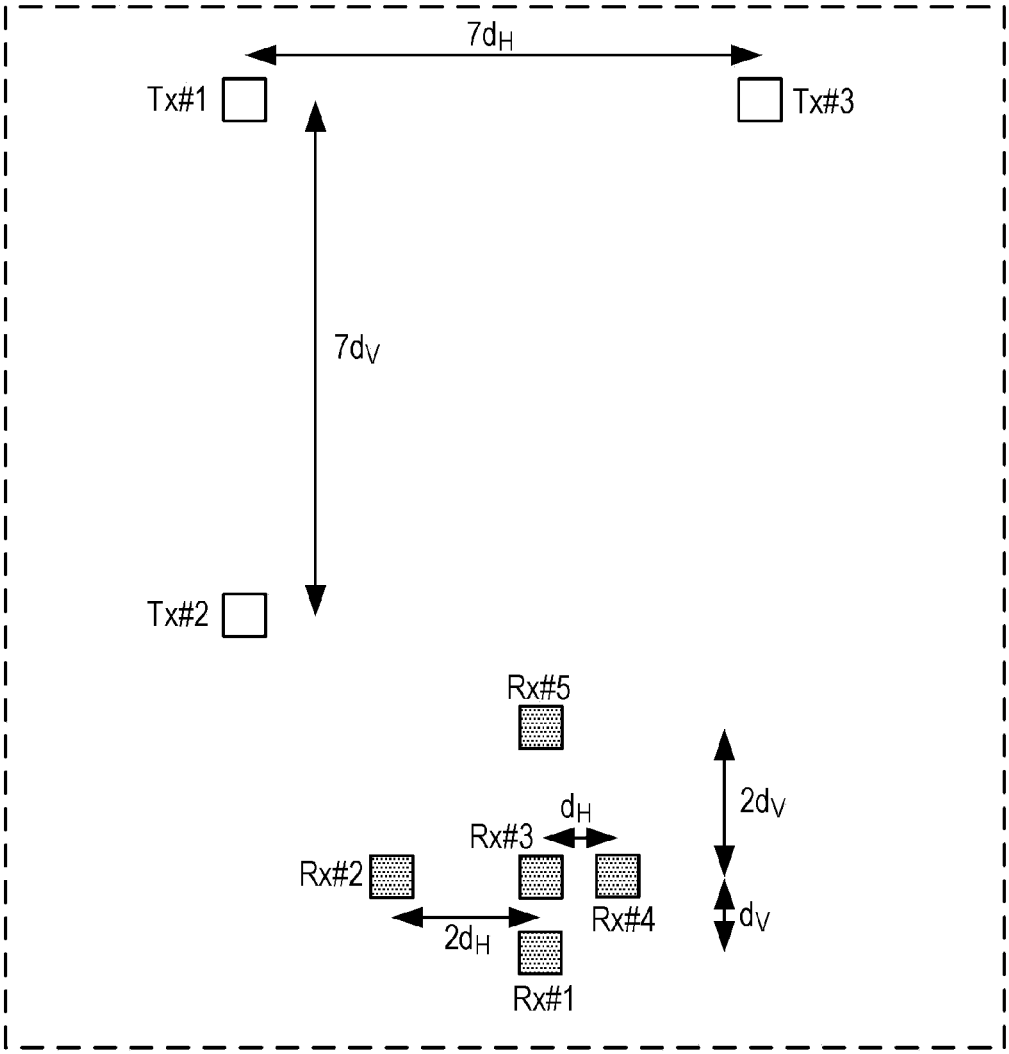
FIG. 11A is a view illustrating an arrangement example of the transmission antennas and the reception antennas in Variation 3 of Embodiment 1 of the present disclosure.
Figure 11B:
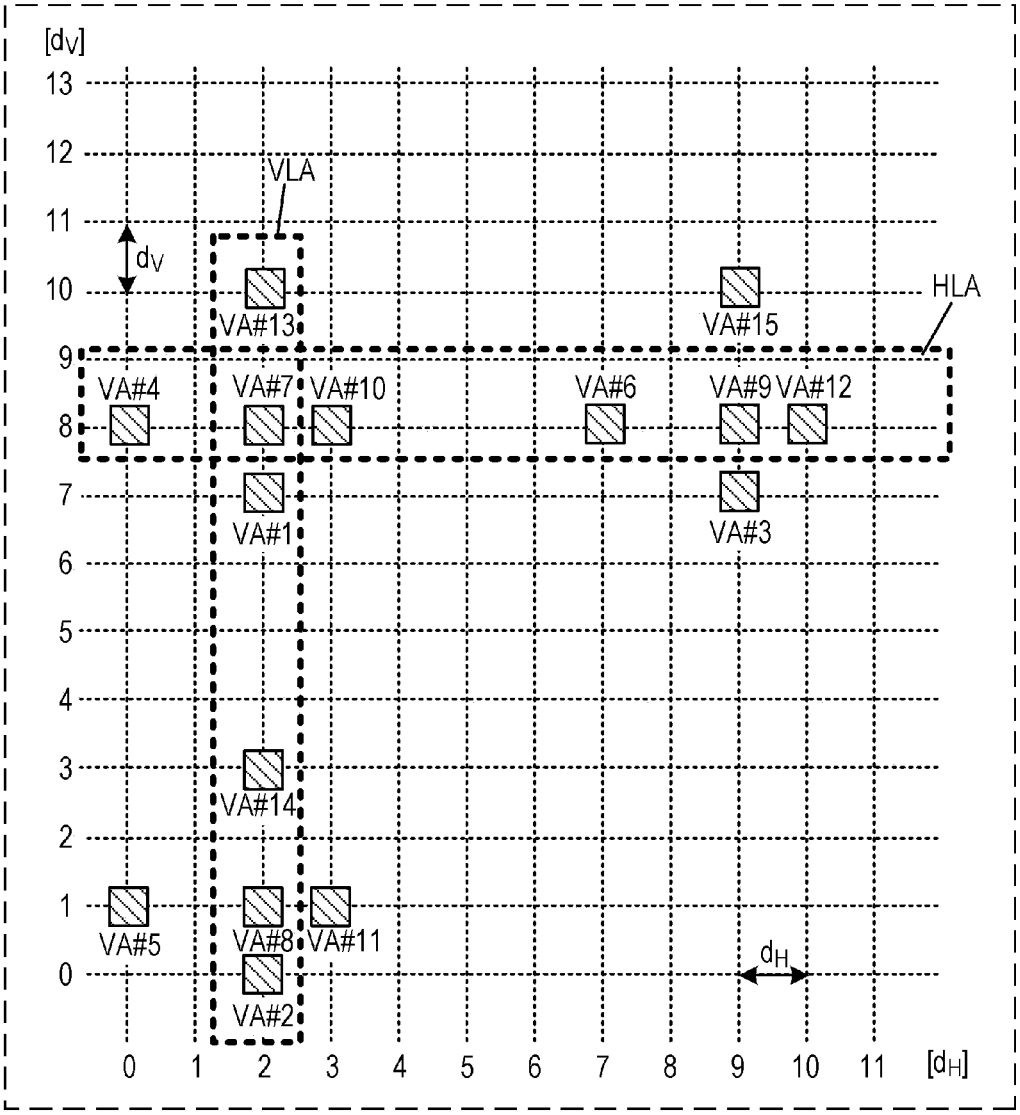
FIG. 11B is a view illustrating an arrangement example of the virtual reception array in Variation 3 of Embodiment 1 of the present disclosure.

FIG. 11A illustrates an arrangement example of the transmission antennas 106 and the reception antennas 202. FIG. 11B illustrates an arrangement of virtual reception array obtained from the antenna arrangement illustrated in FIG. 11A.

In FIG. 11A, the three transmission antennas 106 are denoted respectively by Tx#1 to Tx#3, and the five reception antennas 202 are denoted respectively by Rx#1 to Rx#5. In FIG. 11A, the transmission antennas Tx#1 to Tx#3 are arranged such that one antenna is arranged on the right side of the transmission antenna Tx#1 in the horizontal direction (L shape turned +90°), the transmission antenna Tx#1 being a base point and being the top antenna out of two antennas arranged in the vertical direction. Meanwhile, the reception antennas Rx#1 to Rx#5 are arranged such that one antenna is arranged on each of the upper and lower sides of the reception antenna Rx#3 in the vertical direction, the reception antenna Rx#3 being a base point and being the middle antenna out of three antennas arranged in the horizontal direction (cross shape). Note that the arrangement of the reception antennas Rx#1 to Rx#5 are not limited to the cross-shaped arrangement, and may be a L-shaped arrangement or a T-shaped arrangement (see, for example, FIGS. 24A to 24F to be described later).

Moreover, the arrangement of the transmission antennas 106 and the reception antennas 202 in this variation is an arrangement satisfying the restriction conditions A-1, A-2, B-1, and B-2 described in Embodiment 1.

The virtual antenna elements arrangement of the virtual reception array illustrated in FIG. 11B and provided by the antenna arrangement illustrated in FIG. 11A has the following characteristics.

(1) Horizontal Direction

Due to horizontal positional relationships among the two transmission antennas Tx#1 and Tx#3 arranged with an inter-element space $7d_H$ in the horizontal direction and the three reception antennas Rx#2, Rx#3, and Rx#4 arranged with inter-element spaces $2d_H$ and $d_H$ in the horizontal direction in FIG. 11A, the virtual reception array illustrated in FIG. 11B includes a virtual horizontal linear array antenna HLA including six elements arranged on a straight line with inter-element spaces $2d_H$, $d_H$, $4d_H$, $2d_H$, and $d_H$ in the horizontal direction (VA#4, VA#7, VA#10, VA#6, VA#9, and VA#12 surrounded by the broken line illustrated in FIG. 11B).

When the horizontal position of VA#4 is a reference, the horizontal coordinates ($x_1$, $x_2$, $x_3$, $x_4$, $x_5$, $x_6$) of the six elements (VA#4, VA#7, VA#10, VA#6, VA#9, VA#12) forming the virtual horizontal linear array antenna HLA are such that $(x_1, x_2, x_3, x_4, x_5, x_6)=[0, 2d_H, 3d_H, 7d_H, 9d_H, 10d_H]$.

The inter-element spaces $|x_A-x_B|$ (where A and B are each one of integers from one to six, and A≠B) each between any two different elements included in the virtual horizontal linear array antenna HLA are $\{1, 2, 3, 4, 5, 6, 7, 8, 9, 10\}\times d_H$. By using the virtual horizontal linear array antenna HLA including six elements, the radar device 10 can be virtually assumed to have an uniform linear array including 11 elements arranged with inter-element spaces of the basic unit $d_H$ in the horizontal direction, and perform the direction-of-arrival estimation with high angular resolution.

For example, in the case of $d_H$=0.5λ, the radar device 10 can perform the direction-of-arrival estimation with the generation of grating lobes being suppressed in a wide range from −90° to +90° in the horizontal direction. Moreover, since the array aperture length of the radar device 10 is $10d_H$=5λ, the beam width BW thereof is about 8° and the radar device 10 can achieve high angular resolution of BW=10° or less.

(2) Vertical Direction

Due to vertical positional relationships among the two transmission antennas Tx#1 and Tx#2 arranged with an inter-element space $7d_V$ in the vertical direction and the three reception antennas Rx#1, Rx#3, and Rx#5 arranged with inter-element spaces $d_V$ and $2d_V$ in the vertical direction in FIG. 11A, the virtual reception array illustrated in FIG. 11B includes a virtual vertical linear array antenna VLA including six elements arranged on a straight line with inter-element spaces $d_V$, $2d_V$, $4d_V$, $d_V$, and $2d_V$ in the vertical direction (VA#2, VA#8, VA#14, VA#1, VA#7, and VA#13 surrounded by the broken line illustrated in FIG. 11B).

When the vertical position of VA#2 is a reference, the vertical coordinates ($y_1$, $y_2$, $y_3$, $y_4$, $y_5$, $y_6$) of the six elements (VA#2, VA#8, VA#14, VA#1, VA#7, VA#13) forming the virtual vertical linear array antenna VLA are such that ($y_1$, $y_2$, $y_3$, $y_4$, $y_5$, $y_6$)=[0, $d_V$, $3d_V$, $7d_V$, $8d_V$, $10d_V$].

The inter-element spaces $|y_A-y_B|$ (where A and B are each one of integers from one to six, and A≠B) each between any two different elements included in the virtual vertical linear array antenna VLA are {1, 2, 3, 4, 5, 6, 7, 8, 9, 10}×$d_V$. By using the virtual vertical linear array antenna VLA including six elements, the radar device 10 can be virtually assumed to have a uniform linear array including 11 elements arranged with inter-element spaces of the basic unit $d_V$ in the vertical direction, and perform the direction-of-arrival estimation with high angular resolution. Note that the uniform linear array includes no inter-element spaces other than the inter-element spaces of the basic unit $d_V$.

For example, in the case of $d_V$=0.5λ, the radar device 10 can perform the direction-of-arrival estimation with the generation of grating lobes being suppressed in a wide range from −90° to +90° in the vertical direction. Moreover, since the array aperture length of the radar device 10 is $10d_V$=5λ, the beam width BW thereof is about 8° and the radar device 10 can achieve high angular resolution of BW=10° or less.

Embodiment 2

In some cases, a radar device uses sub-array antennas in which array elements forming an array antenna each include multiple antenna elements (sub-arrayed antenna elements), to improve a directional gain of the array antenna.

Figure 12:
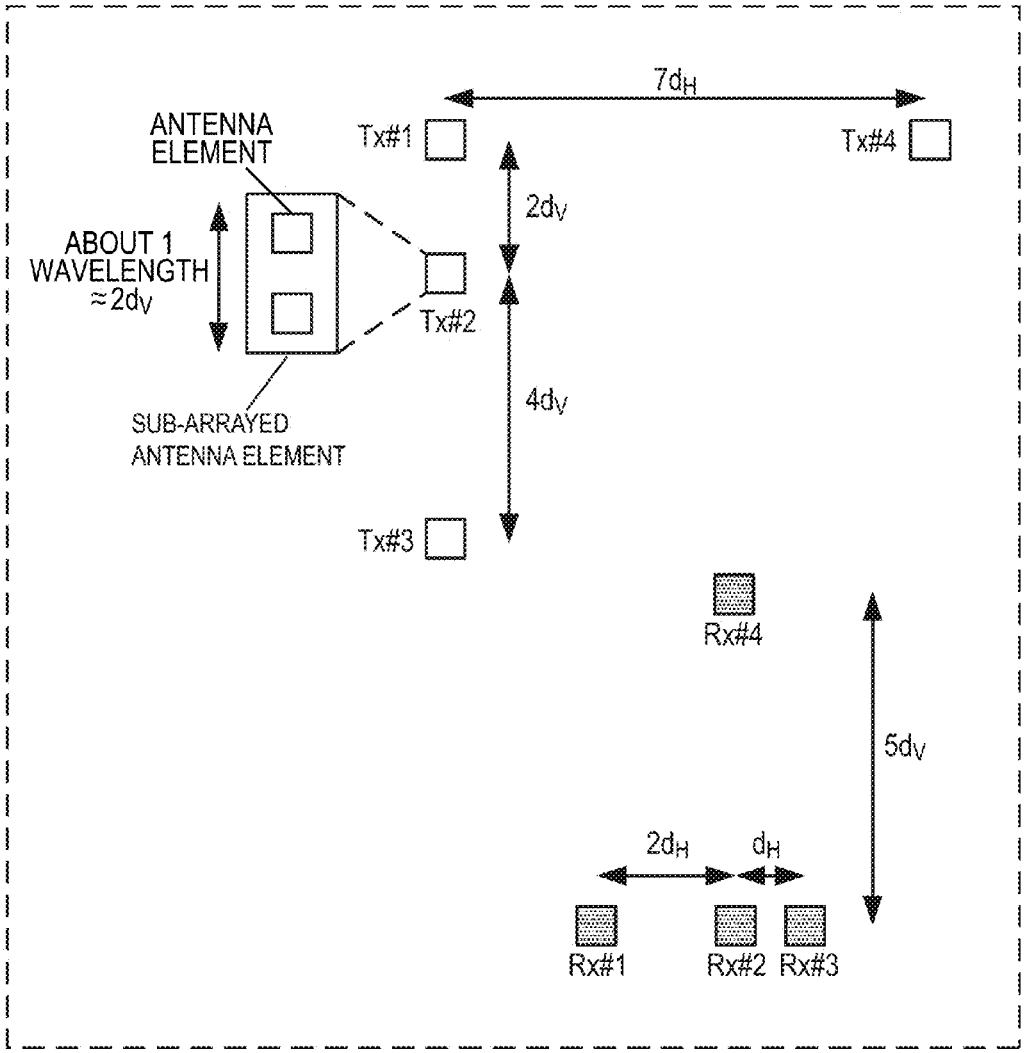
FIG. 12 is a view illustrating an arrangement example of the transmission antennas and the reception antennas which use sub-arrayed antenna elements in Embodiment 2 of the present disclosure.
Figure 13A:
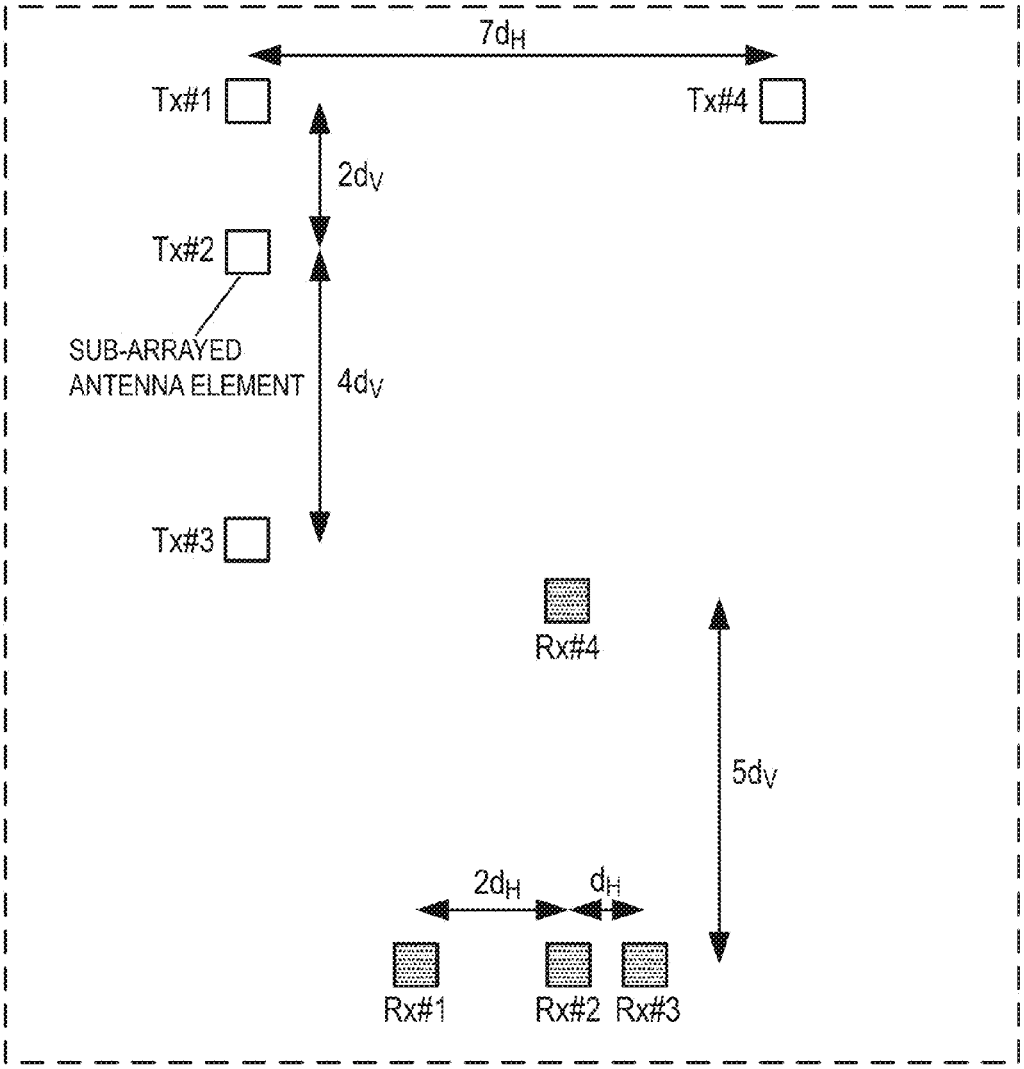
FIG. 13A is a view illustrating an arrangement example of the transmission antennas and the reception antennas in Embodiment 2 of the present disclosure.

For example, FIG. 12 illustrates an example in which sub-arrayed antenna element is applied to the configuration of FIG. 13A when the radar detection range of the radar device can be reduced in the vertical direction and the smallest inter-element space in the vertical direction is $2d_V$. In FIG. 12, using the sub-arrayed antenna elements are formed by stacking two antenna elements in the vertical direction can narrow the directivity in the vertical direction and reduce radiation in an unnecessary direction, thereby improving the array element gain.

Regarding the inter-element spaces of the array antenna, antenna elements are difficult to arrange with inter-element spaces smaller than the size of the antenna elements. For example, stacking the antenna elements of the sub-arrayed antenna elements in the vertical direction increases the size of the sub-arrayed antenna elements to about one wavelength, and this restricts the arrangement of the array antenna in the radar device. Specifically, in the radar device having the sub-array antenna configuration, the smallest inter-element space in the antenna arrangement in the vertical direction is restricted to be equal to or more than a certain value.

As described above, when the sub-array antenna configuration is used in the radar device, the size of each sub-arrayed antenna element is large, and the space between any two of the sub-arrayed antenna elements needs to be increased. As a result, grating lobes may be generated on a directional pattern of the array antenna.

In view of this, in the embodiment, description is given of an antenna arrangement which achieves high resolution in the vertical/horizontal direction and which can perform the direction-of-arrival estimation with the generation of grating lobes suppressed in a wide range when the sub-array antennas are used.

Note that, since the radar device of the embodiment has the same basic configuration as the radar device 10 of Embodiment 1, description is given with reference to FIG. 3.

Moreover, the radar device 10 in which the antenna elements are stacked in the vertical direction to form sub-arrayed antenna elements is described below as an example. Note that the antenna elements are not stacked in the horizontal direction to form sub-arrayed antenna elements and the radar device 10 has the same characteristics as that in Embodiment 1.

As in Embodiment 1, Nt transmission antennas 106 and Na reception antennas 202 are arranged with uneven inter-element spaces in the horizontal direction and the vertical direction.

Moreover, the transmission antennas 106 and the reception antennas 202 in the embodiment are arranged in the vertical direction (direction in which the antenna elements are formed) such that there is one or more combinations of the inter-element spaces among the $N_{TV}$ transmission antennas 106 and the inter-element spaces among the $N_{RV}$ reception antennas 202 in which the difference between the inter-element spaces is the basic unit $d_V$ of the inter-element spaces in the vertical direction. Moreover, the basic unit $d_V$ of the inter-element spaces in the vertical direction is set to be less than 1λ (for example, 0.5λ). Specifically, the transmission antennas 106 and the reception antennas 202 are arranged to include at least one arrangement satisfying the following formula (hereafter referred to as condition B-3).

<Condition B-3>

(inter-element space between transmission antennas 106 in vertical direction)−(inter-element space between reception antennas 202 in vertical direction)|=$d_V$≈0.5λ<1λ.

Moreover, the radar device 10 having the arrangement of the transmission antennas 106 and the reception antennas 202 of the embodiment satisfies the restriction conditions described in Embodiment 1 except for B-1, that is the restriction conditions A-1, A-2, and B-2.

Figure 13B:
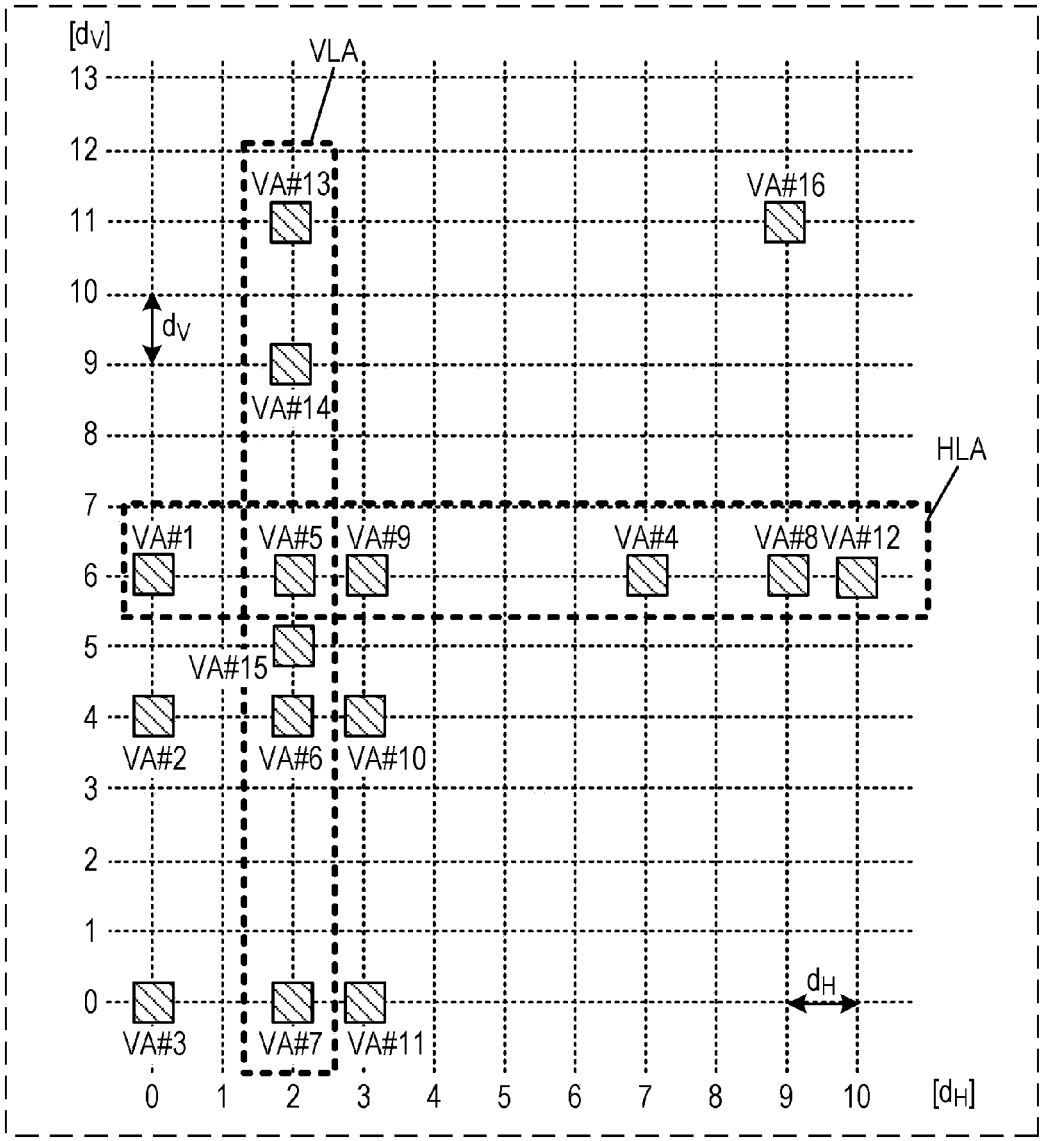
FIG. 13B is a view illustrating an arrangement example of the virtual reception array in Embodiment 2 of the present disclosure.

FIG. 13A illustrates an arrangement example of the transmission antennas 106 and the reception antennas 202. FIG. 13B illustrates a virtual antenna element arrangement of a virtual reception array obtained from the antenna arrangement illustrated in FIG. 13A.

In this example, the number Nt of the transmission antennas 106 is four and the number Na of the reception antennas 202 is four. Moreover, the four transmission antennas 106 are denoted respectively by Tx#1 to Tx#4, and the four reception antennas 202 are denoted respectively by Rx#1 to Rx#4.

In FIG. 13A, the transmission antennas Tx#1 to Tx#4 are arranged in a pattern in which one antenna is arranged on the right side of the transmission antenna Tx#1 in the horizontal direction (L shape turned +90°), the transmission antenna Tx#1 being a base point and being the top antenna out of three antennas arranged in the vertical direction. Meanwhile, the reception antennas Rx#1 to Rx#4 are arranged in a pattern in which one antenna is arranged above the reception antenna Rx#2 in the vertical direction (T-shape turned 180°), the reception antenna Rx#2 being a base point and being the middle antenna out of three antennas arranged in the horizontal direction.

The virtual antenna elements arrangement of the virtual reception array illustrated in FIG. 13B and provided by the antenna arrangement illustrated in FIG. 13A has the following characteristics.

(1) Horizontal Direction

Due to horizontal positional relationships among the two transmission antennas Tx#1 and Tx#4 arranged with an inter-element space $7d_H$ in the horizontal direction and the three reception antennas Rx#1, Rx#2, and Rx#3 arranged with inter-element spaces $2d_H$ and $d_H$ in the horizontal direction in FIG. 13A, the virtual reception array illustrated in FIG. 13B includes a virtual horizontal linear array antenna HLA including six elements arranged on a straight line with inter-element spaces $2d_H$, $d_H$, $4d_H$, $2d_H$, and $d_H$ in the horizontal direction (VA#1, VA#5, VA#9, VA#4, VA#8, and VA#12 surrounded by the broken line illustrated in FIG. 13B).

When the horizontal position of VA#1 is a reference, the horizontal coordinates ($x_1$, $x_2$, $x_3$, $x_4$, $x_5$, $x_6$) of the six elements (VA#1, VA#5, VA#9, VA#4, VA#8, VA#12) forming the virtual horizontal linear array antenna HLA are such that $(x_1, x_2, x_3, x_4, x_5, x_6)=[0, 2d_H, 3d_H, 7d_H, 9d_H, 10d_H]$.

The inter-element spaces $|x_A-x_B|$ (where A and B are each one of integers from one to six, and A≠B) each between any two different elements included in the virtual horizontal linear array antenna HLA are $\{1, 2, 3, 4, 5, 6, 7, 8, 9, 10\}\times d_H$. By using the virtual horizontal linear array antenna HLA including six elements, the radar device 10 can be virtually assumed to have an uniform linear array including 11 elements arranged with inter-element spaces of the basic unit $d_H$ in the horizontal direction, and perform the direction-of-arrival estimation with high angular resolution.

For example, in the case of $d_H=0.5\lambda$, the radar device 10 can perform the direction-of-arrival estimation with the generation of grating lobes being suppressed in a wide range from −90° to +90° in the horizontal direction. Moreover, since the array aperture length of the radar device 10 is $10d_H=5\lambda$, the beam width BW thereof is about 8° and the radar device 10 can achieve high angular resolution of BW=10° or less.

(2) Vertical Direction

Due to vertical positional relationships among the three transmission antennas Tx#1, Tx#2, and Tx#3 arranged with inter-element spaces $2d_V$ and $4d_V$ in the vertical direction and the two reception antennas Rx#2 and Rx#4 arranged with an inter-element space $5d_V$ in the vertical direction in FIG. 13A, the virtual reception array illustrated in FIG. 13B includes a virtual vertical linear array antenna VLA including six elements arranged on a straight line with inter-element spaces $4d_V$, $d_V$, $d_V$, $3d_V$, and $2d_V$ in the vertical direction (VA#7, VA#6, VA#15, VA#5, VA#14, and VA#13 surrounded by the broken line illustrated in FIG. 13B).

When the vertical position of VA#7 is a reference, the vertical coordinates ($y_1$, $y_2$, $y_3$, $y_4$, $y_5$, $y_6$) of the six elements (VA#7, VA#6, VA#15, VA#5, VA#14, VA#13) forming the virtual vertical linear array antenna VLA are such that $(y_1, y_2, y_3, y_4, y_5, y_6)=[0, 4d_V, 5d_V, 6d_V, 9d_V, 11d_V]$.

The inter-element space $|y_A-y_B|$ (where A and B are each one of integers from one to six, and A≠B) each between any two different elements included in the virtual vertical linear array antenna VLA are $\{1, 2, 3, 4, 5, 6, 7, 9, 11\}\times d_V$. By using combinations of elements out of the six elements in the virtual vertical linear array antenna VLA whose inter-element spaces are $\{1, 2, 3, 4, 5, 6, 7\}\times d_V$, the radar device 10 can be virtually assumed to have an uniform linear array including eight elements arranged with inter-element spaces of the basic unit $d_V$ in the vertical direction, and perform the direction-of-arrival estimation with high angular resolution.

Meanwhile, by using combinations whose inter-element spaces are $\{1, 2, 3, 4, 5, 6, 7, 9, 11\}\times d_V$, the radar device 10 can be virtually assumed to have a linear array including 10 elements arranged with inter-element spaces $2d_V$ which are twice the basic unit $d_V$ in the vertical direction, and perform the direction-of-arrival estimation. In this case, in the radar device 10 assumed to have the linear array including 10 elements, the spatial side robe slightly increases but the aperture length is further increased compared to the radar device 10 assumed to have the uniform linear array including eight elements arranged with the inter-element spaces of the basic unit $d_V$. Accordingly, the angular resolution can be improved.

For example, in the case of $d_V=0.5\lambda$, the radar device 10 can perform the direction-of-arrival estimation with the generation of grating lobes being suppressed in a wide range from −90° to +90° in the vertical direction. Moreover, when the radar device 10 performs the direction-of-arrival estimation while being virtually assumed to have the uniform linear array including eight elements arranged with the inter-element spaces of the basic unit $d_V$, the array aperture length of the radar device 10 is $7d_V=3.5\lambda$, and the beam width BW thereof is thus about 11°. Meanwhile, when the radar device 10 performs the direction-of-arrival estimation while being virtually assumed to have the linear array including 10 elements arranged with the inter-element spaces $2d_V$, the array aperture length of the radar device 10 is $11d_V=5.5\lambda$. Accordingly, the beam width BW of the radar device 10 is about 7° and the radar device 10 can achieve high angular resolution of BW=10° or less.

As described above, in the radar device 10, in the case of $d_V=0.5\lambda$, in FIG. 13A, |(inter-element space $4d_V$ between Tx#2 and Tx#3 in vertical direction)−(inter-element space $5d_V$ between Rx#2 and Rx#4 in vertical direction)|$=d_V\approx0.5\lambda<1\lambda$, and the condition B-3 is satisfied. Thus, in FIG. 13B, the arrangement of the virtual reception array in the vertical direction includes one or more inter-element spaces (≈0.5λ) which are 1λ or smaller (inter-element space between VA#6 and VA#15 and inter-element space between VA#15 and VA#5 illustrated in FIG. 13B). The radar device 10 using the arrangement illustrated in FIG. 13A can be virtually assumed to have a uniform linear array including multiple elements arranged with inter-element spaces of the basic unit $d_V$ in the vertical direction and perform the direction-of-arrival estimation with high angular resolution, also in the sub-array antenna configuration.

Figure 14:
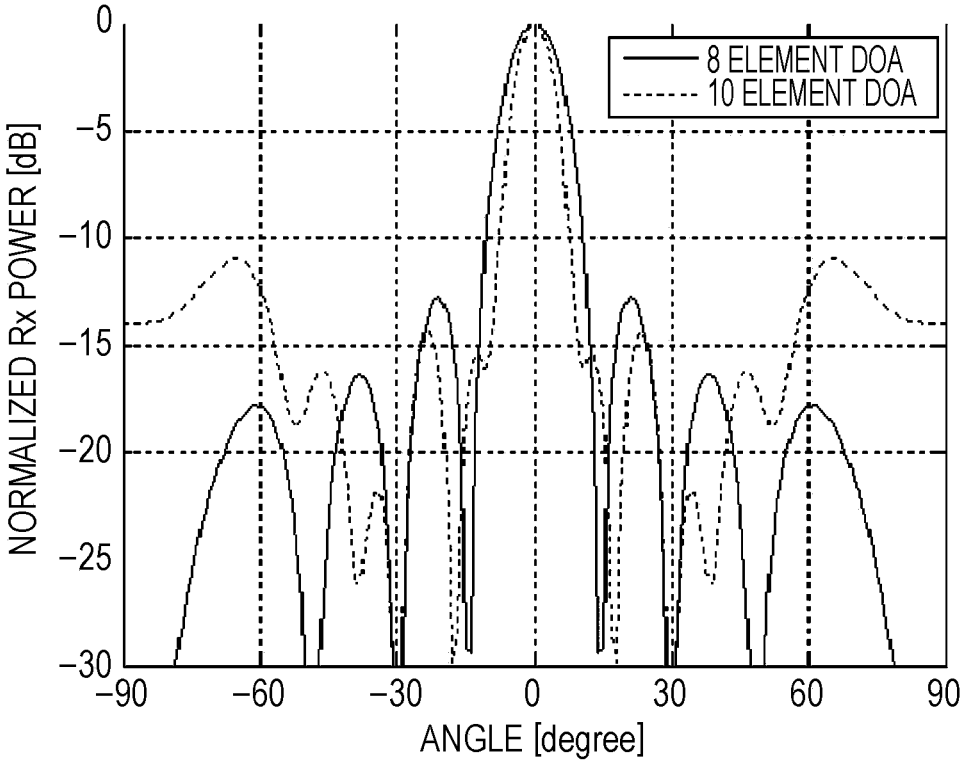
FIG. 14 is a graph depicting a directional pattern of the virtual reception array in Embodiment 2 of the present disclosure.

FIG. 14 illustrates a direction estimation result (calculator simulation result) obtained by using the configuration described above. In FIG. 14, simulation conditions are such that the beamformer method is used and a target direction is set to 0°. Moreover, the direction estimation result (8 element DOA) illustrated by the solid line in FIG. 14 is a result of the direction-of-arrival estimation performed while virtually assuming that the radar device 10 has the uniform linear array including eight elements arranged with the inter-element spaces of the basic unit $d_V$ in the vertical direction. Meanwhile, the direction estimation result (10 element DOA) illustrated by the dotted line in FIG. 14 is a result of the direction-of-arrival estimation performed while virtually assuming that the radar device 10 has the linear array including 10 elements arranged with the inter-element spaces twice the basic unit $d_V$ in the vertical direction.

As illustrated in FIG. 14, it is found that, in the radar device 10 virtually assumed to have the uniform linear array including eight elements, the beam width BW of the beam in the target direction θ° is about 11° and the side lobe level of 13 dB or lower is obtained. Meanwhile, as illustrated in FIG. 14, it is found that, in the radar device 10 virtually assumed to have the linear array including 10 elements, the side lobes increases but the beam width BW of the beam in the target direction 0° decreases compared to those in the radar device 10 virtually assumed to have the uniform linear array including eight elements (solid line). Moreover, as illustrated in FIG. 14, it is found that no grating lobes are generated in both cases.

As described above, in the embodiment, in the radar device 10 which has the sub-array antenna configuration and which performs beam scanning two-dimensionally in the vertical direction and the horizontal direction by using the MIMO radar, the aperture lengths of the virtual reception array in the vertical direction and the horizontal direction can be increased as much as possible. Accordingly, in the embodiment, it is possible to improve the angular resolution of the radar device 10 with few antennas by using this virtual reception array and thereby reduce the size and cost of the radar device 10.

(Variation 1 of Embodiment 2)

The antenna arrangement in the MIMO radar of FIG. 13A described above can be applied as long as the size of a sub-arrayed antenna element which is formed by stacking elements in the vertical direction is smaller than $2d_V$.

In the arrangement of FIG. 13A, the smallest inter-element space in the vertical direction is the inter-element space between Tx#1 and Tx#2 and is $2d_V$. Meanwhile, in the arrangement of FIG. 15A, the smallest inter-element space in the vertical direction is the inter-element space between Rx#2 and Rx#4 and is $3d_V$. Accordingly, a sub-arrayed antenna element which is larger in size in the vertical direction can be used in the arrangement of FIG. 15A. Using the sub-arrayed antenna element which is larger in size in the vertical direction can improve the gain in the vertical direction and also narrow the directivity in the vertical direction.

Figure 15A:
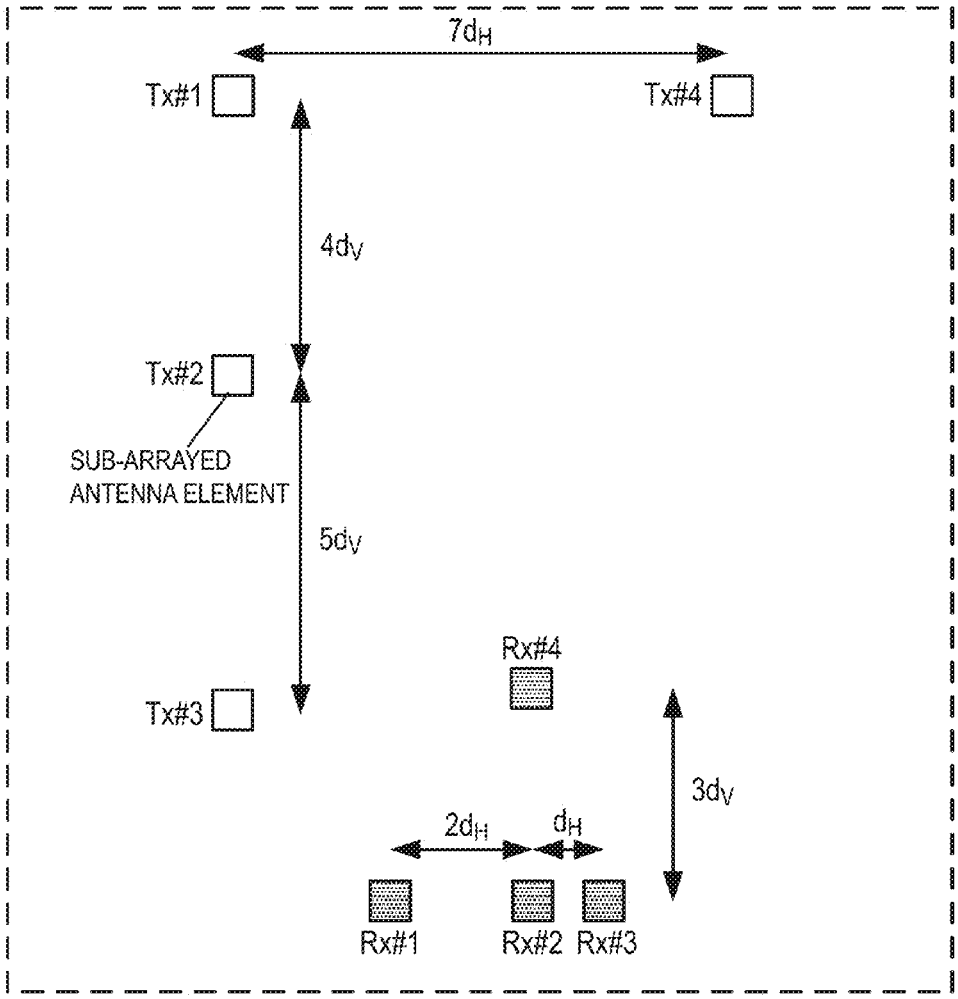
FIG. 15A is a view illustrating an arrangement example of the transmission antennas and the reception antennas in Variation 1 of Embodiment 2 of the present disclosure.
Figure 15B:
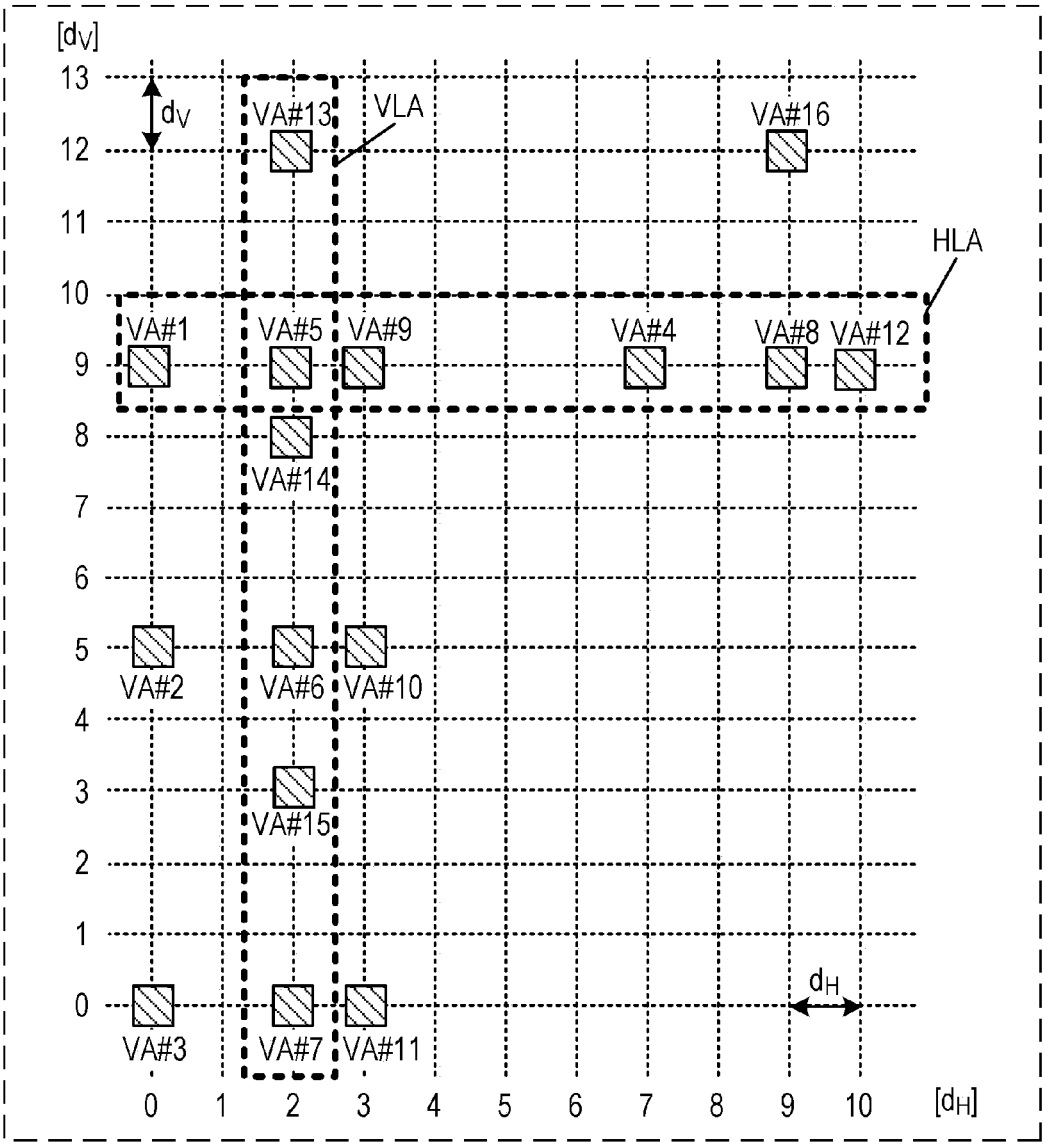
FIG. 15B is a view illustrating an arrangement example of the virtual reception array in Variation 1 of Embodiment 2 of the present disclosure.
Figure 15C:
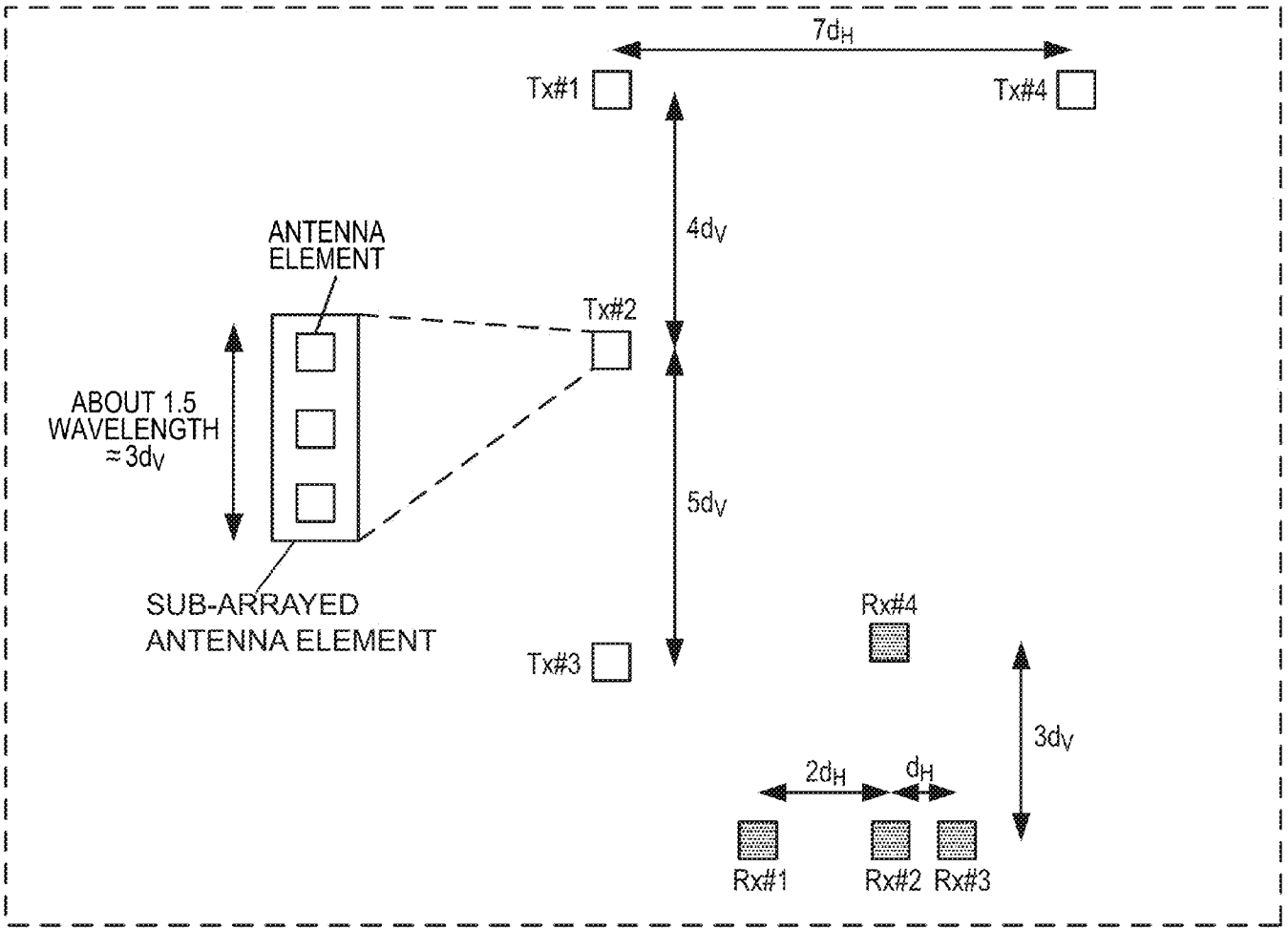
FIG. 15C is a view illustrating an arrangement example of the transmission antennas and the reception antennas in Variation 1 of Embodiment 2 of the present disclosure.

Meanwhile, when the size of a sub-arrayed antenna element which is formed by stacking elements in the vertical direction is larger than $2d_V$ in the vertical direction, for example, when a sub-array antenna element which is formed by stacking three antenna elements in the vertical direction as illustrated in FIG. 15C is used, the antenna arrangement to be described below can be used. Description is given below of an antenna arrangement example applicable as long as the size of a sub-array antenna element which is formed by stacking elements in the vertical direction is $3d_V$ or smaller in the vertical direction.

FIG. 15A illustrates an arrangement example of the transmission antennas 106 and the reception antennas 202. FIG. 15B illustrates an arrangement of a virtual reception array obtained from the antenna arrangement illustrated in FIG. 15A.

In this example, the number Nt of the transmission antennas 106 is four and the number Na of the reception antennas 202 is four. Moreover, the four transmission antennas 106 are denoted respectively by Tx#1 to Tx#4, and the four reception antennas 202 are denoted respectively by Rx#1 to Rx#4.

In FIG. 15A, the transmission antennas Tx#1 to Tx#4 are arranged such that one antenna is arranged on the right side of the transmission antenna Tx#1 in the horizontal direction (L shape turned +90°), the transmission antenna Tx#1 being a base point and being the top antenna out of three antennas arranged in the vertical direction. Meanwhile, the reception antennas Rx#1 to Rx#4 are arranged such that one antenna is arranged above the reception antenna Rx#2 in the vertical direction (T-shape turned 180°), the reception antenna Rx#2 being a base point and being the middle antenna out of three antennas arranged in the horizontal direction.

The arrangement of the virtual reception array illustrated in FIG. 15B and provided by the antenna arrangement illustrated in FIG. 15A has the following characteristics.

(1) Horizontal Direction

Due to horizontal positional relationships among the two transmission antennas Tx#1 and Tx#4 arranged with an inter-element space $7d_H$ in the horizontal direction and the three reception antennas Rx#1, Rx#2, and Rx#3 arranged with inter-element spaces $2d_H$ and $d_H$ in the horizontal direction in FIG. 15A, the virtual reception array illustrated in FIG. 15B includes a virtual horizontal linear array antenna HLA including six elements arranged on a straight line with inter-element spaces $2d_H$, $d_H$, $4d_H$, $2d_H$, and $d_H$ in the horizontal direction (VA#1, VA#5, VA#9, VA#4, VA#8, and VA#12 surrounded by the broken line illustrated in FIG. 15B).

When the horizontal position of VA#1 is a reference, the horizontal coordinates ($x_1$, $x_2$, $x_3$, $x_4$, $x_5$, $x_6$) of the six elements (VA#1, VA#5, VA#9, VA#4, VA#8, VA#12) forming the virtual horizontal linear array antenna HLA are such that $(x_1, x_2, x_3, x_4, x_5, x_6)=[0, 2d_H, 3d_H, 7d_H, 9d_H, 10d_H]$.

The inter-element spaces $|x_A-x_B|$ (where A and B are each one of integers from one to six, and A≠B) each between any two different elements included in the virtual horizontal linear array antenna HLA are $\{1, 2, 3, 4, 5, 6, 7, 8, 9, 10\}\times d_H$. By using the virtual horizontal linear array antenna HLA including six elements, the radar device 10 can be virtually assumed to have an uniform linear array including 11 elements arranged with inter-element spaces of the basic unit $d_H$ in the horizontal direction, and perform the direction-of-arrival estimation with high angular resolution.

For example, in the case of $d_H=0.5\lambda$, the radar device 10 can perform the direction-of-arrival estimation with the generation of grating lobes being suppressed in a wide range from −90° to +90° in the horizontal direction. Moreover, since the array aperture length of the radar device 10 is $10d_H=5\lambda$, the beam width BW thereof is about 8° and the radar device 10 can achieve high angular resolution of BW=10° or less.

(2) Vertical Direction

Due to vertical positional relationships among the three transmission antennas Tx#1, Tx#2, and Tx#3 arranged with inter-element spaces $4d_V$ and $5d_V$ in the vertical direction and the two reception antennas Rx#2 and Rx#4 arranged with an inter-element space $3d_V$ in the vertical direction in FIG. 15A, the virtual reception array illustrated in FIG. 15B includes a virtual vertical linear array antenna VLA including six elements arranged on a straight line with inter-element spaces $3d_V$, $2d_V$, $3d_V$, $1d_V$, and $3d_V$ in the vertical direction (VA#7, VA#15, VA#6, VA#14, VA#5, and VA#13 surrounded by the broken line illustrated in FIG. 15B).

When the vertical position of VA#7 is a reference, the vertical coordinates $(y_1, y_2, y_3, y_4, y_5, y_6)$ of the six elements (VA#7, VA#15, VA#6, VA#14, VA#5, VA#13) forming the virtual vertical linear array antenna VLA are such that $(y_1, y_2, y_3, y_4, y_5, y_6)=[0, 3d_V, 5d_V, 8d_V, 9d_V, 12d_V]$.

The inter-element spaces $|y_A-y_B|$ (where A and B are each one of integers from one to six, and A≠B) each between any two different elements included in the virtual vertical linear array antenna VLA are $\{1, 2, 3, 4, 5, 6, 7, 8, 9, 12\}\times d_V$. By using combinations of elements out of the six elements in the virtual vertical linear array antenna VLA whose inter-element spaces are $\{1, 2, 3, 4, 5, 6, 7, 8, 9\}\times d_V$, the radar device 10 can be virtually assumed to have an uniform linear array including 10 elements arranged with inter-element spaces of the basic unit $d_V$ in the vertical direction, and perform the direction-of-arrival estimation with high angular resolution.

Meanwhile, by using combinations whose inter-element spaces are $\{1, 2, 3, 4, 5, 6, 7, 8, 9, 12\}\times d_V$, the radar device 10 can be virtually assumed to have a linear array including 11 elements arranged with an inter-element space $3d_V$ which is three times the basic unit $d_V$ in the vertical direction, and perform the direction-of-arrival estimation. In this case, in the radar device 10 assumed to have the linear array including 11 elements, the spatial side robe slightly increases but the aperture length is further increased compared to the radar device 10 assumed to have the uniform linear array including 10 elements arranged with the inter-element spaces of the basic unit $d_V$. Accordingly, the angular resolution can be improved.

For example, in the case of $d_V=0.5\lambda$, the radar device 10 can perform the direction-of-arrival estimation with the generation of grating lobes being suppressed in a wide range from −90° to +90° in the vertical direction. Moreover, when the radar device 10 performs the direction-of-arrival estimation while being virtually assumed to have the uniform linear array including 10 elements arranged with the inter-element spaces of the basic unit $d_V$, the array aperture length of the radar device 10 is $9d_V=4.5\lambda$. Accordingly, the beam width BW of the radar device 10 is about 9° and the radar device 10 can achieve high angular resolution of BW=10° or less. Meanwhile, when the radar device 10 performs the direction-of-arrival estimation while being virtually assumed to have the linear array including 11 elements arranged with the inter-element space $3d_V$, the array aperture length of the radar device 10 is $12d_V=6\lambda$. Accordingly, the beam width BW of the radar device 10 is about 7° and the radar device 10 can achieve high angular resolution of BW=10° or less.

(Variation 2 of Embodiment 2)

Figure 16:
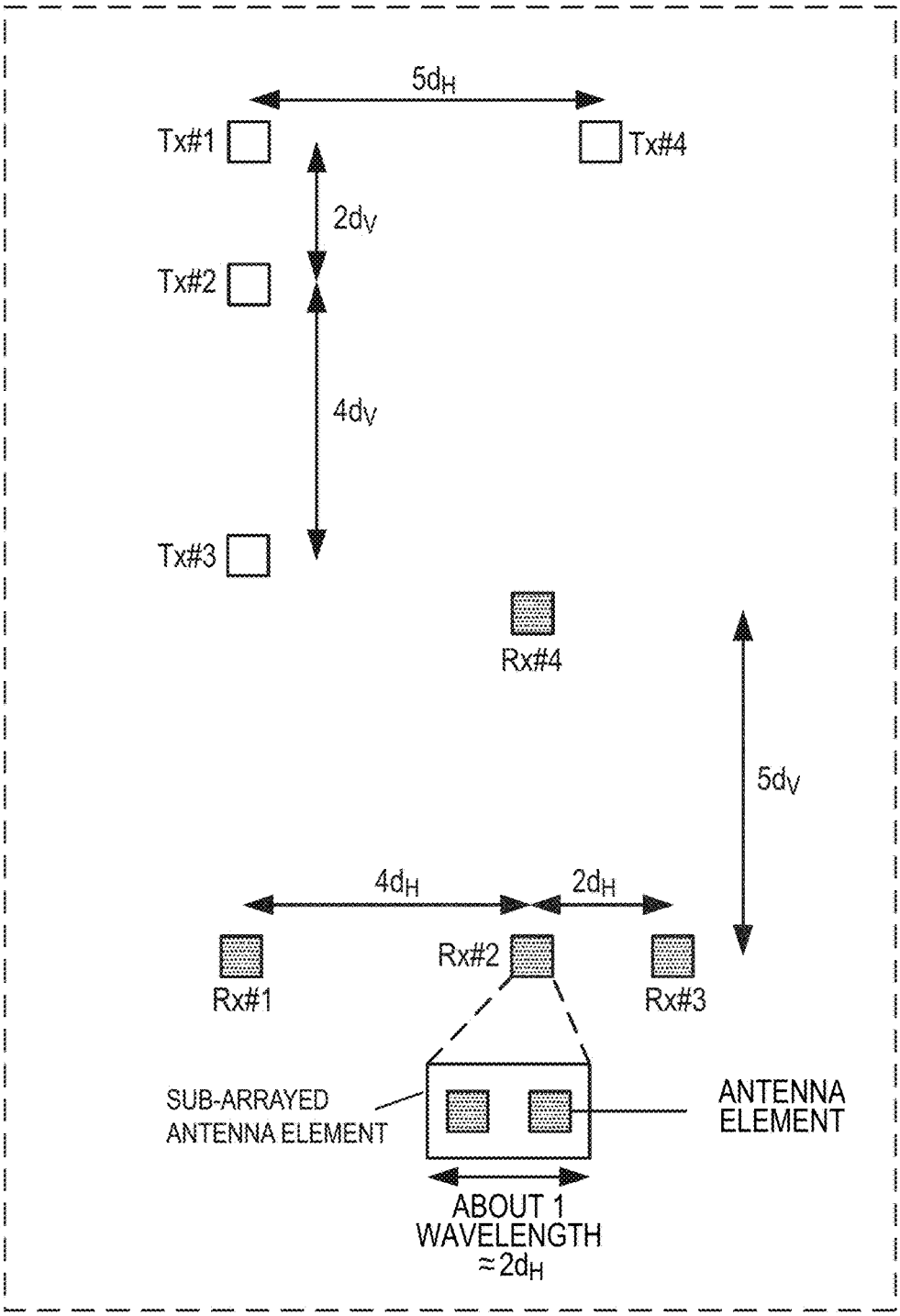
FIG. 16 is a view illustrating an arrangement example of the transmission antennas and the reception antennas using sub-arrayed antenna elements in Variation 2 of Embodiment 2 of the present disclosure.

In the embodiment described above, a case where a sub-arrayed antenna element is formed by arranging antenna elements in the vertical direction is described. However, a sub-arrayed antenna element can be formed by arranging antenna elements in the horizontal direction. Specifically, FIG. 16 illustrates an example in which a sub-arrayed antenna element is applied to FIG. 17A when the radar detection range of the radar device 10 can be reduced in the horizontal direction and the smallest inter-element space in the horizontal direction is $2d_H$. In FIG. 16, forming the sub-arrayed antenna element by stacking two antenna elements in the horizontal direction can narrow the directivity in the horizontal direction and reduce radiation in an unnecessary direction, thereby improving the array element gain.

However, as in the case of stacking in the vertical direction described above, stacking the antenna elements in the horizontal direction increases the size of the sub-arrayed antennas element to about one wavelength, and this restricts the arrangement of the array antenna. Specifically, in the radar device 10 having the sub-array antenna configuration, the smallest inter-element space in the array arrangement horizontal direction is restricted to be equal to or more than a certain value.

In view of this, in this variation, description is given of an antenna arrangement which achieves high resolution in the vertical/horizontal direction and which can perform the direction-of-arrival estimation with the generation of grating lobes suppressed in a wide range when the sub-array antenna is used in the horizontal direction.

As in Embodiment 1, Nt transmission antennas 106 and Na reception antennas 202 are arranged with uneven inter-element spaces in the horizontal direction and the vertical direction.

Moreover, the transmission antennas 106 and the reception antennas 202 in the embodiment are arranged in the horizontal direction (direction in which the sub-array antennas are formed) such that there is one or more combinations of the inter-element spaces among the $N_{TV}$ transmission antennas 106 and the inter-element spaces among the $N_{RV}$ reception antennas 202 in which the difference between the inter-element spaces is the basic unit $d_H$ of the inter-element spaces in the horizontal direction. Moreover, the basic unit $d_H$ of the inter-element spaces in the horizontal direction is set to be less than 1λ (for example, 0.5λ). Specifically, the transmission antennas 106 and the reception antennas 202 are arranged to include at least one arrangement satisfying the following formula (hereafter referred to as condition A-3).

<Condition A-3>

(inter-element space between transmission antennas 106 in horizontal direction)−(inter-element space between reception antennas 202 in horizontal direction)$|=d_H\approx 0.5\lambda<1\lambda$.

Moreover, the arrangement of the transmission antennas 106 and the reception antennas 202 of the variation satisfies the restriction conditions described in Embodiment 1 except for A-1, that is A-2, B-1, and B-2.

As a result, also in the radar device 10 having the sub-array antenna configuration in the horizontal direction, the aperture lengths of the virtual reception array in the vertical direction and the horizontal direction can be increased as much as possible. Accordingly, it is possible to improve the angular resolution of the radar device 10 with few antennas by using this virtual reception array and thereby reduce the size and cost of the radar device 10.

(Variation 3 of Embodiment 2)

In this variation, description is given of the case where a sub-arrayed antenna element is formed by arranging antenna elements in both the vertical direction and the horizontal direction. FIG. 18 illustrates an example in which a sub-arrayed antenna element arranged in a two-by-two matrix pattern is applied to FIG. 17A when the radar detection range can be reduced in both the vertical direction and the horizontal direction and the smallest inter-element spaces in the vertical direction and the horizontal direction are $2d_V$ and $2d_H$, respectively. In FIG. 18, forming the sub-arrayed antenna element by stacking antenna elements in the vertical direction and the horizontal direction can narrow the directivity in the vertical direction and the horizontal direction and reduce radiation in an unnecessary direction, thereby improving the array element gain.

However, stacking the antenna elements in the vertical direction and the horizontal direction increases the size of the sub-arrayed antenna element to one wavelength or more, and this restricts the arrangement of the array antenna in the radar device 10. Specifically, in the radar device 10, the smallest inter-element spaces in the array arrangement vertical direction and horizontal direction are each restricted to be equal to or more than a certain value.

In view of this, in this variation, description is given of an antenna arrangement which achieves high resolution in the vertical/horizontal direction and which can perform the direction-of-arrival estimation with the generation of grating lobes suppressed in a wide range when the sub-array antenna is used in both the vertical direction and the horizontal direction.

As in Embodiment 1, Nt transmission antennas 106 and Na reception antennas 202 are arranged with uneven inter-element spaces in the horizontal direction and the vertical direction.

The transmission antennas 106 and the reception antennas 202 in the embodiment are arranged in the vertical direction such that there is one or more combinations of the inter-element spaces among the $N_{TV}$ transmission antennas 106 and the inter-element spaces among the $N_{RV}$ reception antennas 202 in which the difference between the inter-element spaces is the basic unit $d_V$ of the inter-element spaces in the vertical direction. Moreover, the basic unit $d_V$ of the inter-element spaces in the vertical direction is set to be less than 1λ (for example, 0.5λ). Specifically, the transmission antennas 106 and the reception antennas 202 are arranged in the vertical direction to include at least one arrangement satisfying the following formula (condition B-3).

<Condition B-3>

(inter-element space between transmission antennas 106 in vertical direction)−(inter-element space between reception antennas 202 in vertical direction)|$=d_V \approx 0.5\lambda < 1\lambda$.

Moreover, the transmission antennas 106 and the reception antennas 202 in the embodiment are arranged in the horizontal direction such that there is one or more combinations of the inter-element spaces among the $N_{TV}$ transmission antennas 106 and the inter-element spaces among the $N_{RV}$ reception antennas 202 in which the difference between the inter-element spaces is the basic unit $d_H$ of the inter-element spaces in the horizontal direction. Moreover, the basic unit $d_H$ of the inter-element spaces in the horizontal direction is set to be less than 1λ (for example, 0.5λ). Specifically, the transmission antennas 106 and the reception antennas 202 are arranged in the horizontal direction to include at least one arrangement satisfying the following formula (condition A-3).

<Condition A-3>

(inter-element space between transmission antennas 106 in horizontal direction)−(inter-element space between reception antennas 202 in horizontal direction)|$=d_H 0.5\lambda < 1\lambda$.

Moreover, the arrangement of the transmission antennas 106 and the reception antennas 202 of the variation satisfies the restriction conditions described in Embodiment 1 except for A-1 and B-1, that is A-2 and B-2.

Figure 17A:
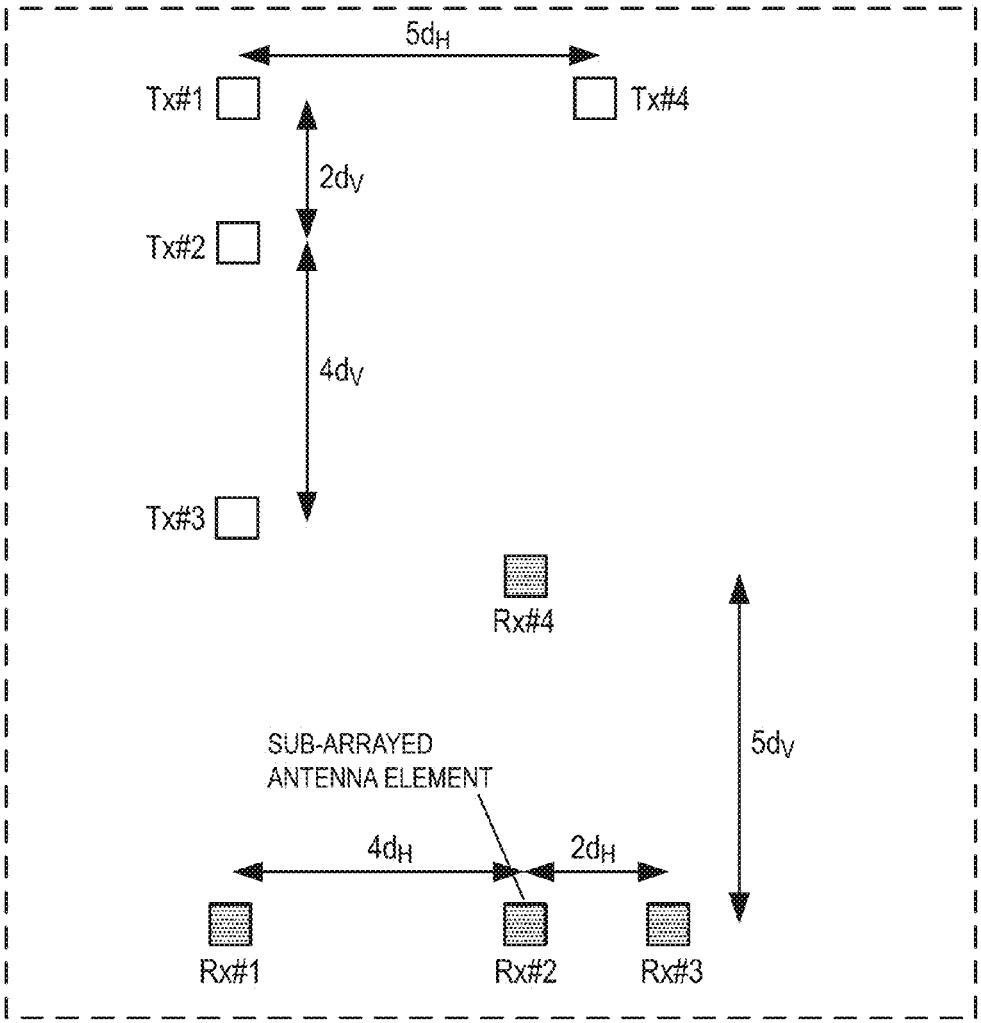
FIG. 17A is a view illustrating an arrangement example of the transmission antennas and the reception antennas in Variation 3 of Embodiment 2 of the present disclosure.
Figure 17B:
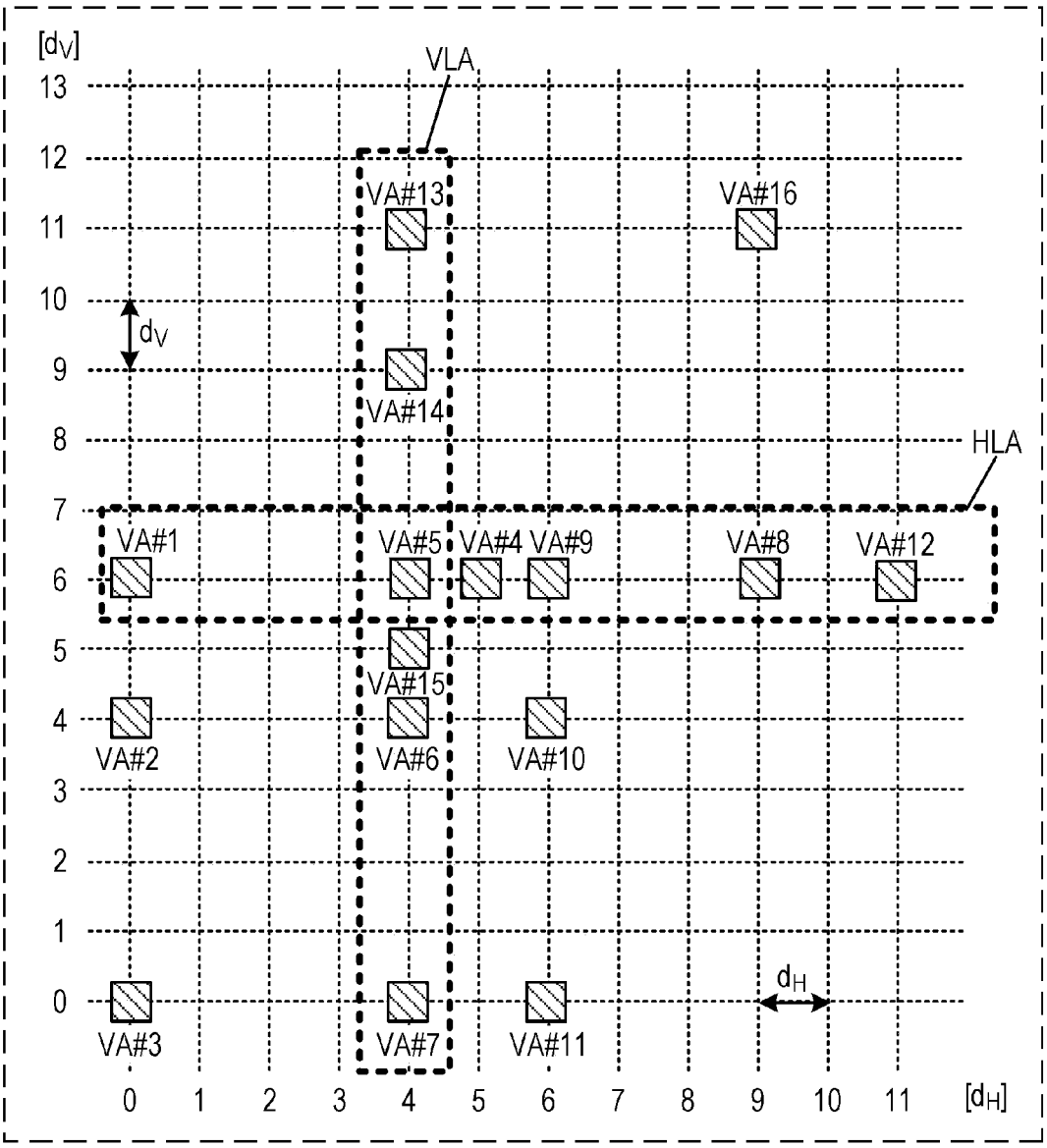
FIG. 17B is a view illustrating an arrangement example of the virtual reception array in Variation 3 of Embodiment 2 of the present disclosure.
Figure 18:
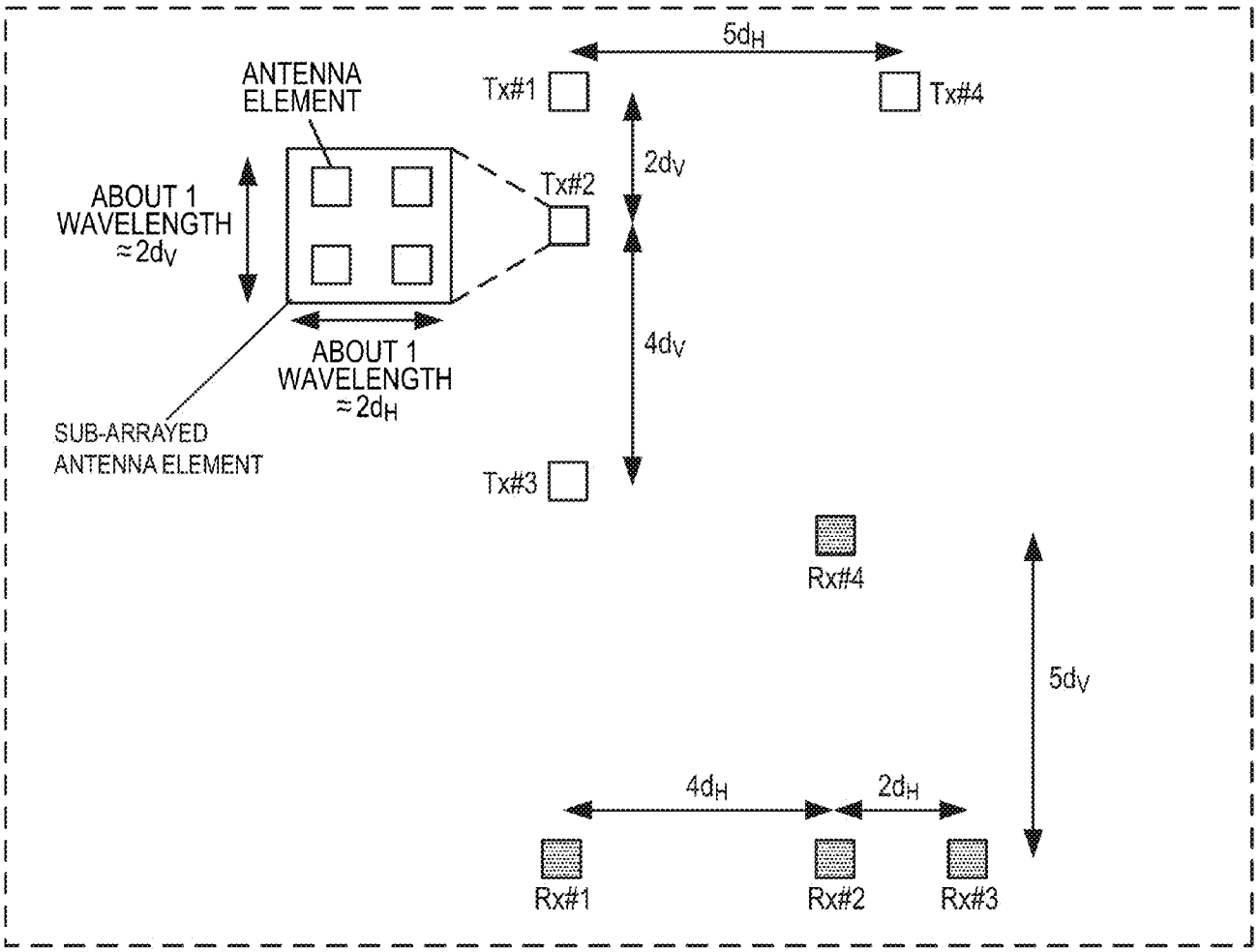
FIG. 18 is a view illustrating an arrangement example of the transmission antennas and the reception antennas which use sub-arrayed antenna elements in Variation 3 of Embodiment 2 of the present disclosure.

FIG. 17A illustrates an arrangement example of the transmission antennas 106 and the reception antennas 202. FIG. 17B illustrates an arrangement of a virtual reception array obtained from the antenna arrangement illustrated in FIG. 17A.

In this example, the number Nt of the transmission antennas 106 is four and the number Na of the reception antennas 202 is four. Moreover, the four transmission antennas 106 are denoted respectively by Tx#1 to Tx#4, and the four reception antennas 202 are denoted respectively by Rx#1 to Rx#4.

In FIG. 17A, the transmission antennas Tx#1 to Tx#4 are arranged such that one antenna is arranged on the right side of the transmission antenna Tx#1 in the horizontal direction (L shape turned +90°), the transmission antenna Tx#1 being a base point and being the top antenna out of three antennas arranged in the vertical direction. Meanwhile, the reception antennas Rx#1 to Rx#4 are arranged such that one antenna is arranged above the reception antenna Rx#2 in the vertical direction, the reception antenna Rx#2 being a base point and being the middle antenna out of three antennas arranged in the horizontal direction.

FIG. 17B illustrates the arrangement of the virtual reception array provided by the antenna arrangement illustrated in FIG. 17A. The arrangement of the virtual reception array illustrated in FIG. 17B has the following characteristics.

(1) Horizontal Direction

Due to horizontal positional relationships among the two transmission antennas Tx#1 and Tx#4 arranged with an inter-element space $5d_H$ in the horizontal direction and the three reception antennas Rx#1, Rx#2, and Rx#3 arranged with inter-element spaces $4d_H$ and $2d_H$ in the horizontal direction in FIG. 17A, the virtual reception array illustrated in FIG. 17B includes a virtual horizontal linear array antenna HLA including six elements arranged on a straight line with inter-element spaces $4d_H$, $d_H$, $d_H$, $3d_H$, and $2d_H$ in the horizontal direction (VA#1, VA#5, VA#4, VA#9, VA#8, and VA#12 surrounded by the broken line illustrated in FIG. 17B).

When the horizontal position of VA#1 is a reference, the horizontal coordinates ($x_1$, $x_2$, $x_3$, $x_4$, $x_5$, $x_6$) of the six elements (VA#1, VA#5, VA#4, VA#9, VA#8, VA#12) forming the virtual horizontal linear array antenna HLA are such that $(x_1, x_2, x_3, x_4, x_5, x_6)=[0, 4d_H, 5d_H, 6d_H, 9d_H, 11d_H]$.

The inter-element spaces $|x_A-x_B|$ (where A and B are each one of integers from one to six, and A≠B) each between any two different elements included in the virtual horizontal linear array antenna HLA are $\{1, 2, 3, 4, 5, 6, 7, 9, 11\}\times d_H$. By using combinations of elements out of the six elements in the virtual horizontal linear array antenna HLA whose inter-element spaces are $\{1, 2, 3, 4, 5, 6, 7\}\times d_H$, the radar device 10 can be virtually assumed to have an uniform linear array including eight elements arranged with inter-element spaces of the basic unit $d_H$ in the horizontal direction, and perform the direction-of-arrival estimation with high angular resolution.

Meanwhile, by using combinations whose inter-element spaces are $\{1, 2, 3, 4, 5, 6, 7, 9, 11\}\times d_H$, the radar device 10 can be virtually assumed to have a linear array including 10 elements arranged with inter-element spaces $2d_H$ which are twice the basic unit $d_H$ in the horizontal direction, and perform the direction-of-arrival estimation. In this case, in the radar device 10 assumed to have the linear array including 10 elements, the spatial side robe slightly increases but the aperture length is further increased compared to the radar device 10 assumed to have the uniform linear array including eight elements arranged with the inter-element spaces of the basic unit $d_H$. Accordingly, the angular resolution can be improved.

For example, in the case of $d_H$=0.5λ, the radar device 10 can perform the direction-of-arrival estimation with the generation of grating lobes being suppressed in a wide range from −90° to +90° in the horizontal direction. Moreover, when the radar device 10 performs the direction-of-arrival estimation while being virtually assumed to have the uniform linear array including eight elements arranged with the inter-element spaces of the basic unit $d_H$, the array aperture length of the radar device 10 is $7d_H=3.5\lambda$, and the beam width BW thereof is thus about 11°. Meanwhile, when the radar device 10 performs the direction-of-arrival estimation while being virtually assumed to have the linear array including 10 elements arranged with the inter-element space $2d_H$, the array aperture length of the radar device 10 is $11d_H=5.5\lambda$. Accordingly, the beam width BW of the radar device 10 is about 7° and the radar device 10 can achieve high angular resolution of BW=10° or less.

As described above, in the case of $d_H=0.5\lambda$, in FIG. 17A, the radar device 10 satisfies the condition A-3 which is |(inter-element space $5d_H$ between Tx#1 and Tx#4 in horizontal direction)−(inter-element space $4d_H$ between Rx#1 and Rx#2 in horizontal direction)|$=d_H\approx0.5\lambda<1\lambda$. Thus, in FIG. 17B, the arrangement of the virtual reception array in the horizontal direction includes one or more inter-element spaces which are 1λ or smaller (≈0.5λ) (inter-element space between VA#5 and VA#4 and inter-element space between VA#4 and VA#9 illustrated in FIG. 17B). The radar device 10 using the arrangement illustrated in FIG. 17A can be virtually assumed to have a linear array including multiple elements arranged with inter-element spaces of the basic unit $d_H$ in the horizontal direction and perform the direction-of-arrival estimation with high angular resolution.

(2) Vertical Direction

Due to vertical positional relationships among the three transmission antennas Tx#1, Tx#2, and Tx#3 arranged with inter-element spaces $2d_V$ and $4d_V$ in the vertical direction and the two reception antennas Rx#2 and Rx#4 arranged with the inter-element space $5d_V$ in the vertical direction in FIG. 17A, the virtual reception array illustrated in FIG. 17B includes a virtual vertical linear array antenna VLA including six elements arranged on a straight line with inter-element spaces $4d_V$, $d_V$, $d_V$, $3d_V$, and $2d_V$ in the vertical direction (VA#7, VA#6, VA#15, VA#5, VA#14, and VA#13 surrounded by the broken line illustrated in FIG. 17B).

When the vertical position of VA#7 is a reference, the vertical coordinates ($y_1$, $y_2$, $y_3$, $y_4$, $y_5$, $y_6$) of the six elements (VA#7, VA#6, VA#15, VA#5, VA#14, VA#13) forming the virtual vertical linear array antenna VLA are such that ($y_1$, $y_2$, $y_3$, $y_4$, $y_5$, $y_6$)=[0, $4d_V$, $5d_V$, $6d_V$, $9d_V$, $11d_V$].

The inter-element spaces $|y_A-y_B|$ (where A and B are each one of integers from one to six, and A≠B) each between any two different elements included in the virtual vertical linear array antenna VLA are {1, 2, 3, 4, 5, 6, 7, 9, 11}×$d_V$. By using combinations of elements out of the six elements in the virtual vertical linear array antenna VLA whose inter-element spaces are {1, 2, 3, 4, 5, 6, 7}×$d_V$, the radar device 10 can be virtually assumed to have an uniform linear array including eight elements arranged with inter-element spaces of the basic unit $d_V$ in the vertical direction, and perform the direction-of-arrival estimation with high angular resolution.

Meanwhile, by using combinations whose inter-element spaces are {1, 2, 3, 4, 5, 6, 7, 9, 11}×$d_V$, the radar device 10 can be virtually assumed to have a linear array including 10 elements arranged with inter-element spaces $2d_V$ which are twice the basic unit $d_V$ in the vertical direction, and perform the direction-of-arrival estimation. In this case, in the radar device 10 assumed to have the linear array including 10 elements, the spatial side robe slightly increases but the aperture length is further increased compared to the radar device 10 assumed to have the uniform linear array including eight elements arranged with the inter-element spaces of the basic unit $d_V$. Accordingly, the angular resolution can be improved.

For example, in the case of $d_V=0.5\lambda$, the radar device 10 can perform the direction-of-arrival estimation with the generation of grating lobes being suppressed in a wide range from −90° to +90° in the vertical direction. Moreover, when the radar device 10 performs the direction-of-arrival estimation while being virtually assumed to have the uniform linear array including eight elements arranged with the inter-element spaces of the basic unit $d_V$, the array aperture length of the radar device 10 is $7d_V=3.5\lambda$ and the beam width BW thereof is thus about 11°. Meanwhile, when the radar device 10 performs the direction-of-arrival estimation while being virtually assumed to have the linear array including 10 elements arranged with the inter-element spaces $2d_V$, the array aperture length of the radar device 10 is $11d_V=5.5\lambda$. Accordingly, the beam width BW of the radar device 10 is about 7° and the radar device 10 can achieve high angular resolution of BW=10° or less.

As described above, in the case of $d_V=0.5\lambda$, in FIG. 17A, the radar device 10 satisfies the condition B-3 which is |(inter-element space $4d_V$ between Tx#2 and Tx#3 in vertical direction)−(inter-element space $5d_V$ between Rx#2 and Rx#4 in vertical direction)|$=d_V\approx0.5\lambda<1\lambda$. Thus, in FIG. 17B, the arrangement of the virtual reception array in the vertical direction includes one or more inter-element spaces which are 1λ or smaller (≈0.5λ) (inter-element space between VA#6 and VA#15 and inter-element space between VA#15 and VA#5 illustrated in FIG. 17B). The radar device 10 using the arrangement illustrated in FIG. 17A can be virtually assumed to have a linear array including multiple elements arranged with inter-element spaces of the basic unit $d_V$ in the vertical direction and perform the direction-of-arrival estimation with high angular resolution.

Accordingly, also in the radar device 10 which has the sub-array antenna configuration in both the vertical direction and the horizontal direction, the aperture lengths of the virtual reception array in the vertical direction and the horizontal direction can be increased as much as possible. Accordingly, it is possible to improve the angular resolution of the radar device 10 with few antennas by using this virtual reception array and thereby reduce the size and cost of the radar device 10.

(Variation 4 of Embodiment 2)

The antenna arrangement of the MIMO radar described in Variation 3 can be applied as long as the vertical and horizontal sizes of a sub-arrayed antenna element which is formed by stacking antenna elements in the vertical and horizontal directions are smaller than $2d_V$ and $2d_H$, respectively.

Figure 19:
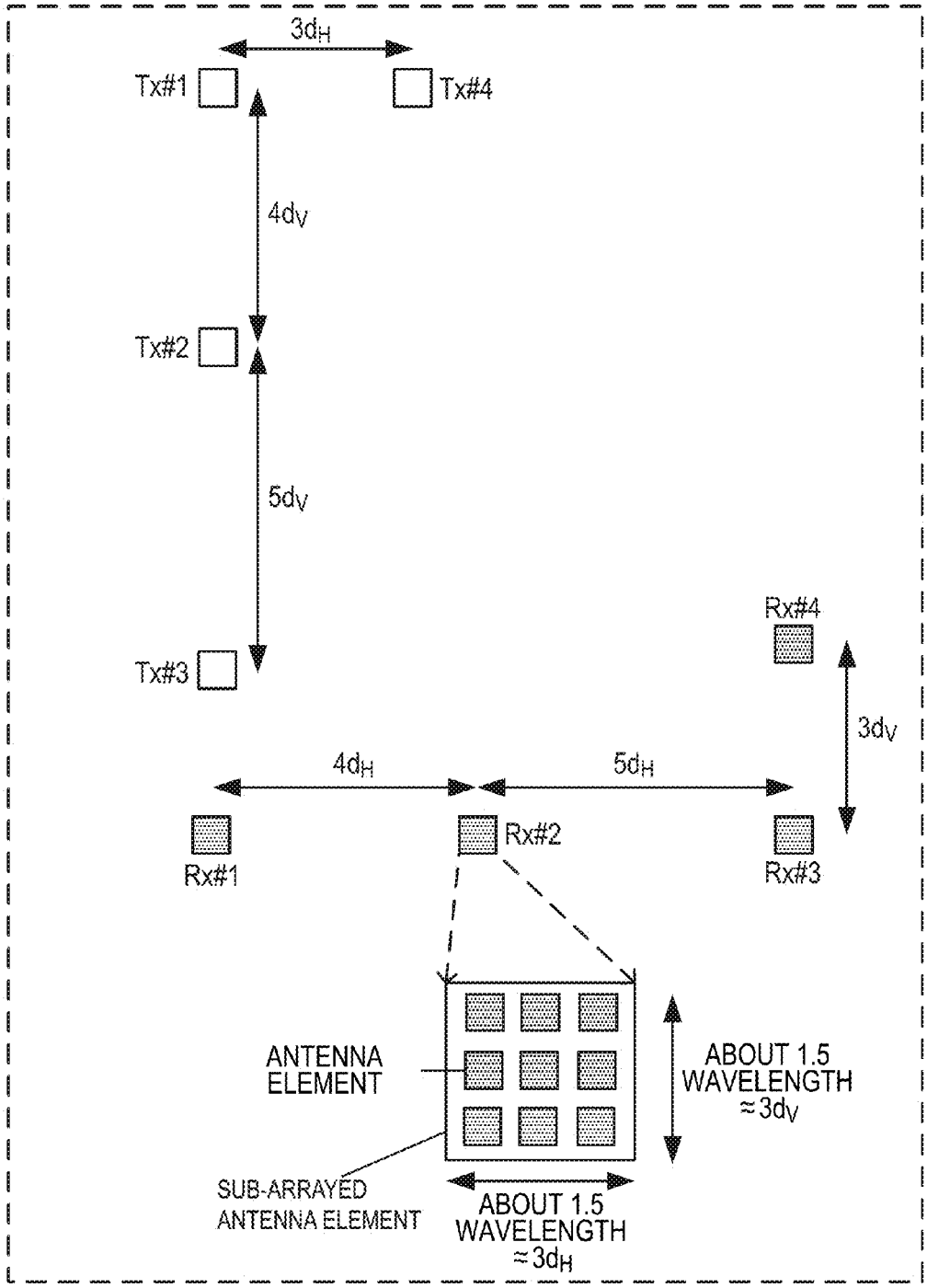
FIG. 19 is a view illustrating an arrangement example of the transmission antennas and the reception antennas which use sub-arrayed antenna elements in Variation 4 of Embodiment 2 of the present disclosure.

Meanwhile, in the radar device 10, when the vertical and horizontal sizes of a sub-arrayed antenna element which is formed by stacking antenna elements in the vertical and horizontal directions are larger than $2d_V$ and $2d_H$, respectively, for example, when a sub-arrayed antenna element is formed by stacking three antenna elements in each of the vertical direction and the horizontal direction as illustrated in FIG. 19 is used, the antenna arrangement to be described below can be used. Description is given below of an antenna arrangement example applicable as long as the vertical size of a sub-arrayed antenna element which is formed by stacking antenna elements in the vertical direction is smaller than $3d_V$ and the horizontal size of the sub-arrayed antenna element is formed by stacking the antenna elements in the horizontal direction is smaller than $3d_H$.

Figure 20A:
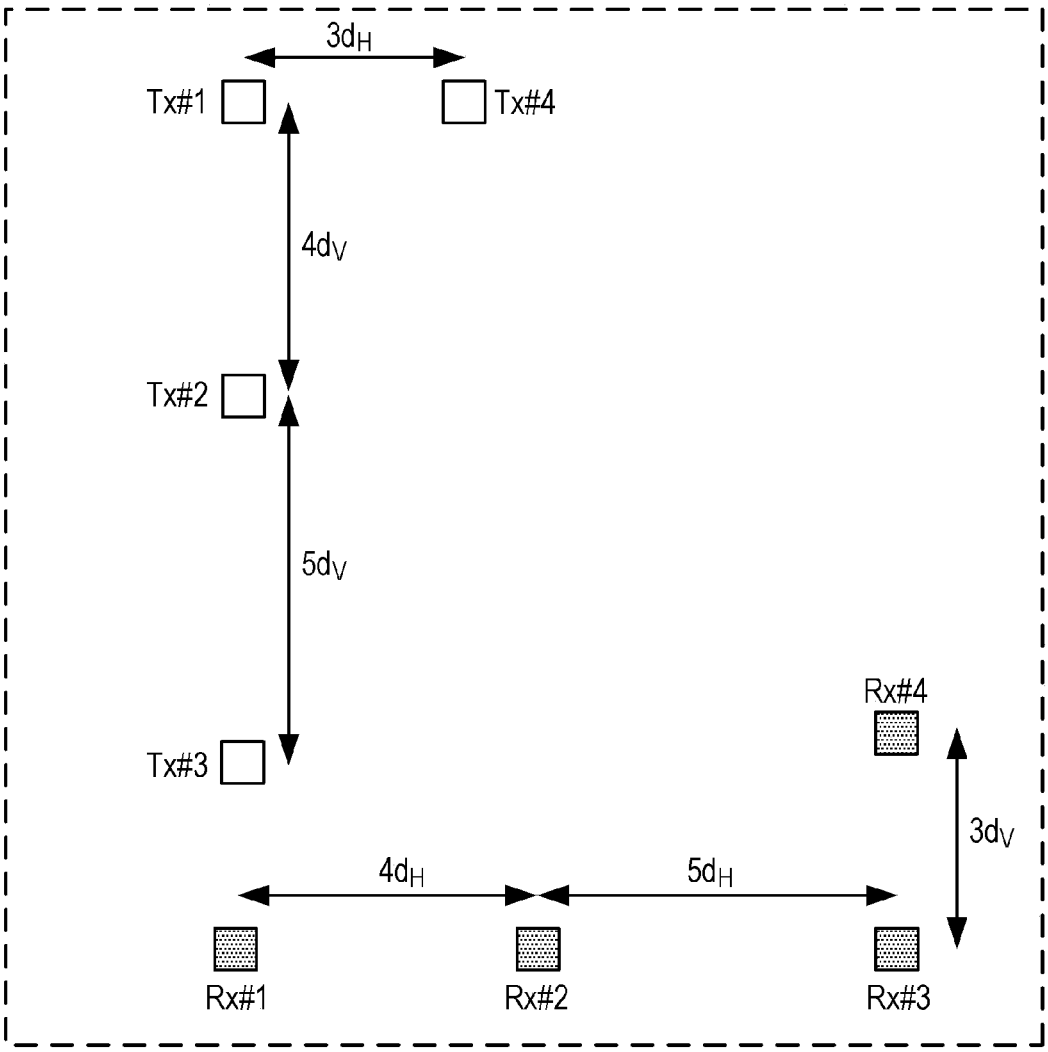
FIG. 20A is a view illustrating an arrangement example of the transmission antennas and the reception antennas in Variation 4 of Embodiment 2 of the present disclosure.
Figure 20B:
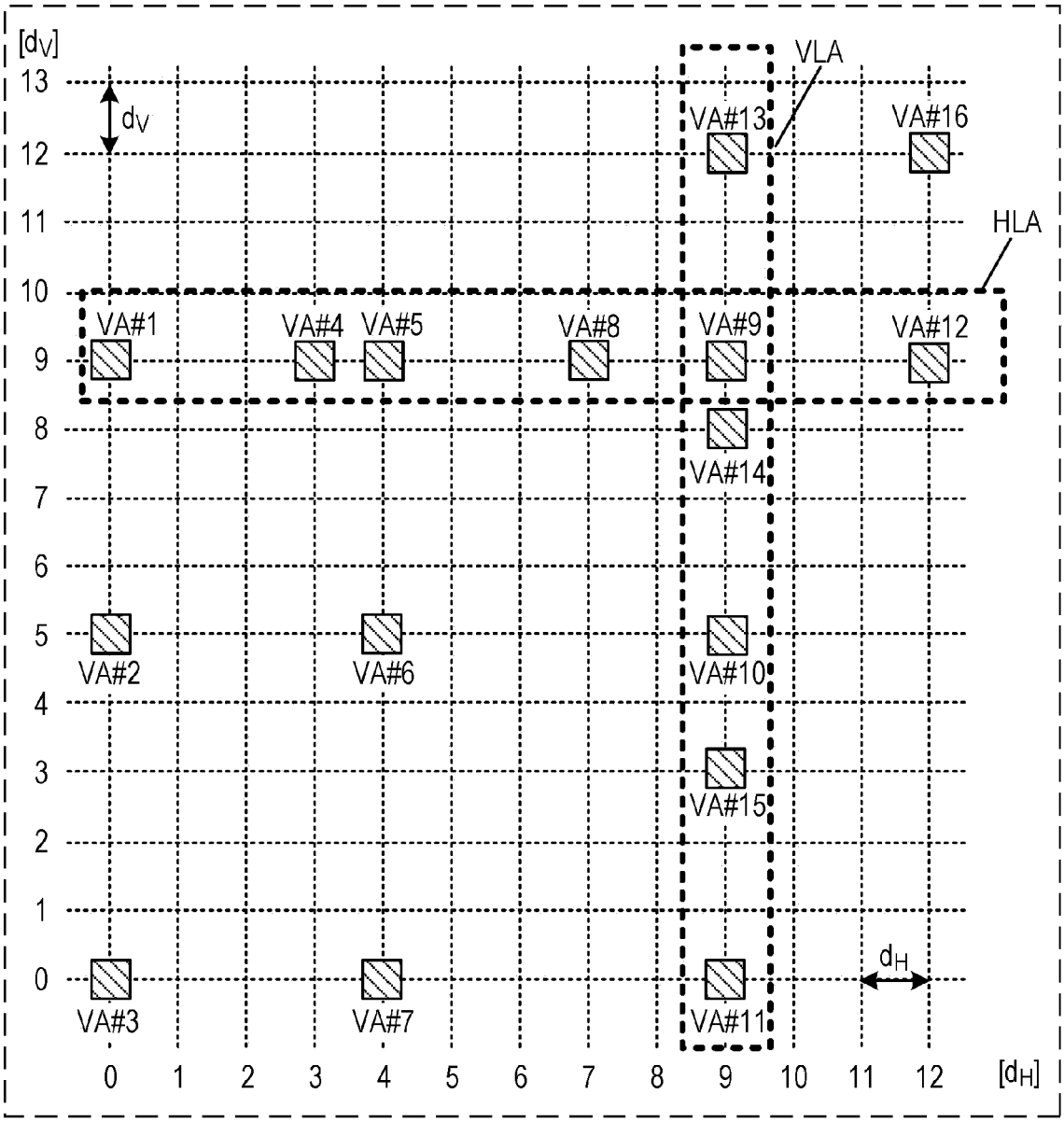
FIG. 20B is a view illustrating an arrangement example of the virtual reception array in Variation 4 of Embodiment 2 of the present disclosure.

FIG. 20A illustrates an arrangement example of the transmission antennas 106 and the reception antennas 202. FIG. 20B illustrates an arrangement of a virtual reception array obtained from the antenna arrangement illustrated in FIG. 20A.

In this example, the number Nt of the transmission antennas 106 is four and the number Na of the reception antennas 202 is four. Moreover, the four transmission antennas 106 are denoted respectively by Tx#1 to Tx#4, and the four reception antennas 202 are denoted respectively by Rx#1 to Rx#4.

In FIG. 20A, the transmission antennas Tx#1 to Tx#4 are arranged in a pattern in which one antenna is arranged on the right side of the transmission antenna Tx#1 in the horizontal direction with an inter-element space smaller than inter-element spaces in the vertical direction (L shape turned −180°), the transmission antenna Tx#1 being a base point and being the top antenna out of three antennas arranged in the vertical direction. Meanwhile, the reception antennas Rx#1 to Rx#4 are arranged such that one antenna is arranged above the reception antenna Rx#3 in the vertical direction with an inter-element space smaller than inter-element spaces in the horizontal direction (L shape turned −90°), the reception antenna Rx#3 being a base point and being the rightmost antenna out of three antennas arranged in the horizontal direction.

The arrangement of the virtual reception array illustrated in FIG. 20B and provided by the antenna arrangement illustrated in FIG. 20A has the following characteristics.

(1) Horizontal Direction

Horizontal positional relationships among the two transmission antennas Tx#1 and Tx#4 arranged with an inter-element space $3d_H$ in the horizontal direction and the three reception antennas Rx#1, Rx#2, and Rx#3 arranged with inter-element spaces $4d_H$ and $5d_H$ in the horizontal direction in FIG. 20A satisfy the condition A-3 and, due to this positional relationship, the virtual reception array illustrated in FIG. 20B includes a virtual horizontal linear array antenna HLA including six elements arranged on a straight line with inter-element spaces $3d_H$, $d_H$, $3d_H$, $2d_H$, and $3d_H$ in the horizontal direction (VA#1, VA#4, VA#5, VA#8, VA#9, and VA#12 surrounded by the broken line illustrated in FIG. 20B).

When the horizontal position of VA#1 is a reference, the horizontal coordinates ($x_1$, $x_2$, $x_3$, $x_4$, $x_5$, $x_6$) of the six elements (VA#1, VA#4, VA#5, VA#8, VA#9, VA#12) forming the virtual horizontal linear array antenna HLA are such that $(x_1, x_2, x_3, x_4, x_5, x_6)=[0, 3d_H, 4d_H, 7d_H, 9d_H, 12d_H]$.

The inter-element spaces $|x_A-x_B|$ (where A and B are each one of integers from one to six, and A≠B) each between any two different elements included in the virtual horizontal linear array antenna HLA are $\{1, 2, 3, 4, 5, 6, 7, 8, 9, 12\}\times d_H$. By using combinations of elements out of the six elements in the virtual horizontal linear array antenna HLA whose inter-element spaces are $\{1, 2, 3, 4, 5, 6, 7, 8, 9\}\times d_H$, the radar device 10 can be virtually assumed to have an uniform linear array including 10 elements arranged with the inter-element spaces of the basic unit $d_H$ in the horizontal direction, and perform the direction-of-arrival estimation with high angular resolution.

Meanwhile, by using combinations whose inter-element spaces are $\{1, 2, 3, 4, 5, 6, 7, 8, 9, 12\}\times d_H$, the radar device 10 can be virtually assumed to have a linear array including 11 elements arranged with an inter-element space $3d_H$ which is three times the basic unit $d_H$ in the horizontal direction, and perform the direction-of-arrival estimation. In this case, in the radar device 10 assumed to have the linear array including 11 elements, the spatial side robe slightly increases but the aperture length is further increased compared to the radar device 10 assumed to have the uniform linear array including 10 elements arranged with the inter-element spaces of the basic unit $d_H$. Accordingly, the angular resolution can be improved.

For example, in the case of $d_H=0.5\lambda$, the radar device 10 can perform the direction-of-arrival estimation with the generation of grating lobes being suppressed in a wide range from −90° to +90° in the horizontal direction. Moreover, when the radar device 10 performs the direction-of-arrival estimation while being virtually assumed to have the uniform linear array including 10 elements arranged with the inter-element spaces of the basic unit $d_H$, the array aperture length of the radar device 10 is $9d_H=4.5\lambda$. Accordingly, the beam width BW of the radar device 10 is about 9° and the radar device 10 can achieve high angular resolution of BW=10° or less. Meanwhile, when the radar device 10 performs the direction-of-arrival estimation while being virtually assumed to have the linear array including 11 elements arranged with the inter-element space $3d_H$, the array aperture length of the radar device 10 is $12d_H=6\lambda$. Accordingly, the beam width BW of the radar device 10 is about 7° and the radar device 10 can achieve high angular resolution of BW=10° or less.

(2) Vertical Direction

Vertical positional relationships among the three transmission antennas Tx#1, Tx#2, and Tx#3 arranged with inter-element spaces $4d_V$ and $5d_V$ in the vertical direction and the two reception antennas Rx#3 and Rx#4 arranged with an inter-element space $3d_V$ in the vertical direction in FIG. 20A satisfy the condition B-3 and, due to this positional relationship, the virtual reception array illustrated in FIG. 20B includes a virtual vertical linear array antenna VLA including six elements arranged on a straight line with inter-element spaces $3d_V$, $2d_V$, $3d_V$, $d_V$, and $3d_V$ in the vertical direction (VA#11, VA#15, VA#10, VA#14, VA#9, and VA#13 surrounded by the broken line illustrated in FIG. 20B).

When the vertical position of VA#11 is a reference, the vertical coordinates ($y_1$, $y_2$, $y_3$, $y_4$, $y_5$, $y_6$) of the six elements (VA#11, VA#15, VA#10, VA#14, VA#9, VA#13) forming the virtual vertical linear array antenna VLA are such that $(y_1, y_2, y_3, y_4, y_5, y_6)=[0, 3d_V, 5d_V, 8d_V, 9d_V, 12d_V]$.

The inter-element spaces $|y_A-y_B|$ (where A and B are each one of integers from one to six, and A≠B) each between any two different elements included in the virtual vertical linear array antenna VLA are $\{1, 2, 3, 4, 5, 6, 7, 8, 9, 12\}\times d_V$. By using combinations of elements out of the six elements in the virtual vertical linear array antenna VLA whose inter-element spaces are $\{1, 2, 3, 4, 5, 6, 7, 8, 9\}\times d_V$, the radar device 10 can be virtually assumed to have an uniform linear array including 10 elements arranged with inter-element spaces of the basic unit $d_V$ in the vertical direction, and perform the direction-of-arrival estimation with high angular resolution.

Meanwhile, by using combinations whose inter-element spaces are $\{1, 2, 3, 4, 5, 6, 7, 8, 9, 12\}\times d_V$, the radar device 10 can be virtually assumed to have a linear array including 11 elements arranged with an inter-element space $3d_V$ which is three times the basic unit $d_V$ in the vertical direction, and perform the direction-of-arrival estimation. In this case, in the radar device 10 assumed to have the linear array including 11 elements, the spatial side robe slightly increases but the aperture length is further increased compared the radar device 10 assumed to have to the uniform linear array including 10 elements arranged with the inter-element spaces of the basic unit $d_V$. Accordingly, the angular resolution can be improved.

For example, in the case of $d_V$=0.5λ, the radar device 10 can perform the direction-of-arrival estimation with the generation of grating lobes being suppressed in a wide range from −90° to +90° in the vertical direction. Moreover, when the radar device 10 performs the direction-of-arrival estimation while being virtually assumed to have the uniform linear array including 10 elements arranged with the inter-element spaces of the basic unit $d_V$, the array aperture length of the radar device 10 is $9d_V$=4.5λ. Accordingly, the beam width BW of the radar device 10 is about 9° and the radar device 10 can achieve high angular resolution of BW=10° or less. Meanwhile, when the radar device 10 performs the direction-of-arrival estimation while being virtually assumed to have the linear array including 11 elements arranged with the inter-element space $3d_V$, the array aperture length of the radar device 10 is $12d_V$=6λ. Accordingly, the beam width BW of the radar device 10 is about 7° and the radar device 10 can achieve high angular resolution of BW=10° or less.

(Variation 5 of Embodiment 2)

When high angular resolution of about 10° is unnecessary in Embodiment 2 as the angular resolution in the horizontal direction or the vertical direction, the radar device 10 may include three transmission antennas 106 or three reception antennas 202.

Description is given below of an example in which no high angular resolution is required as the angular resolution in the vertical direction and the radar device 10 includes three transmission antennas 106 and four reception antennas 202.

Moreover, there is used a MIMO array arrangement in which the size of the array element is one wavelength (1λ) or more in the vertical and horizontal directions due to stacking of the antenna elements in the vertical and horizontal directions.

Figure 21A:
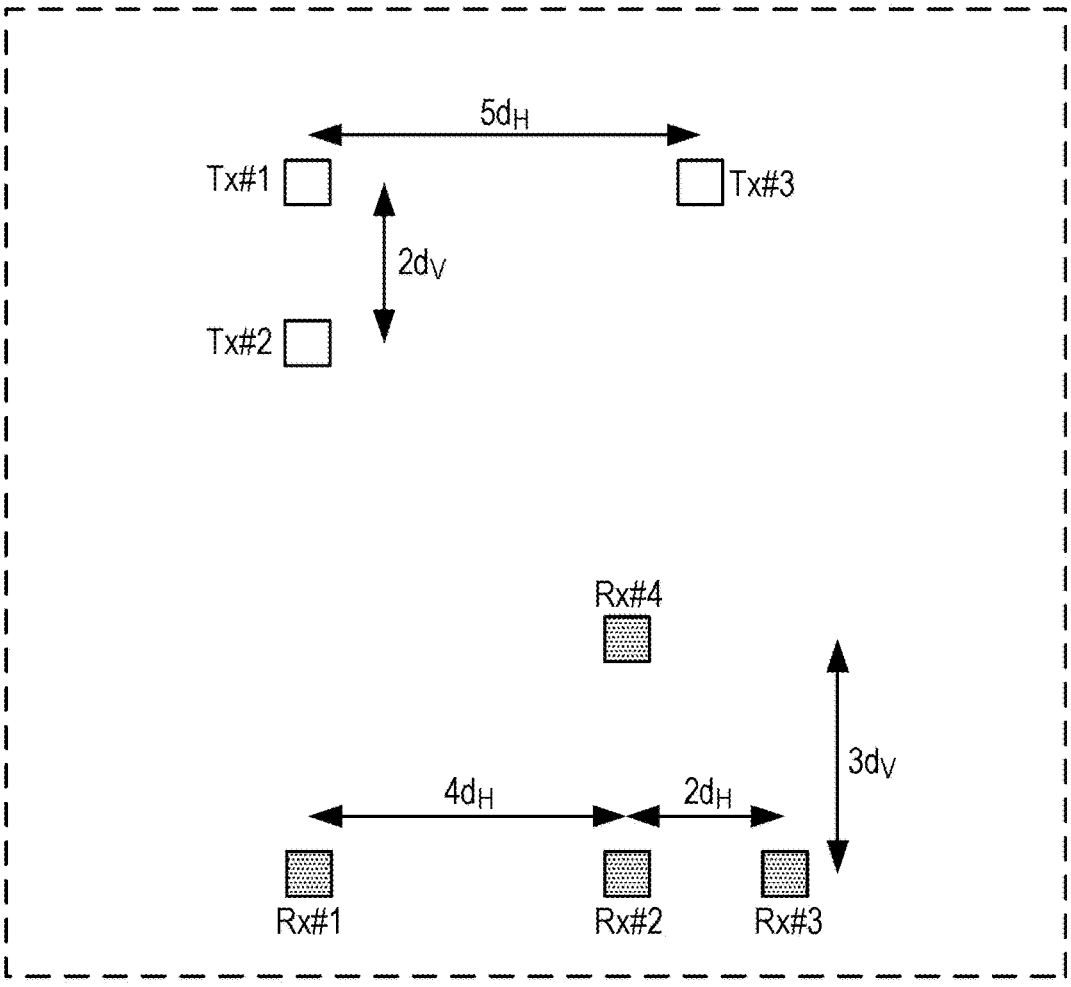
FIG. 21A is a view illustrating an arrangement example of the transmission antennas and the reception antennas in Variation 5 of Embodiment 2 of the present disclosure.
Figure 21B:
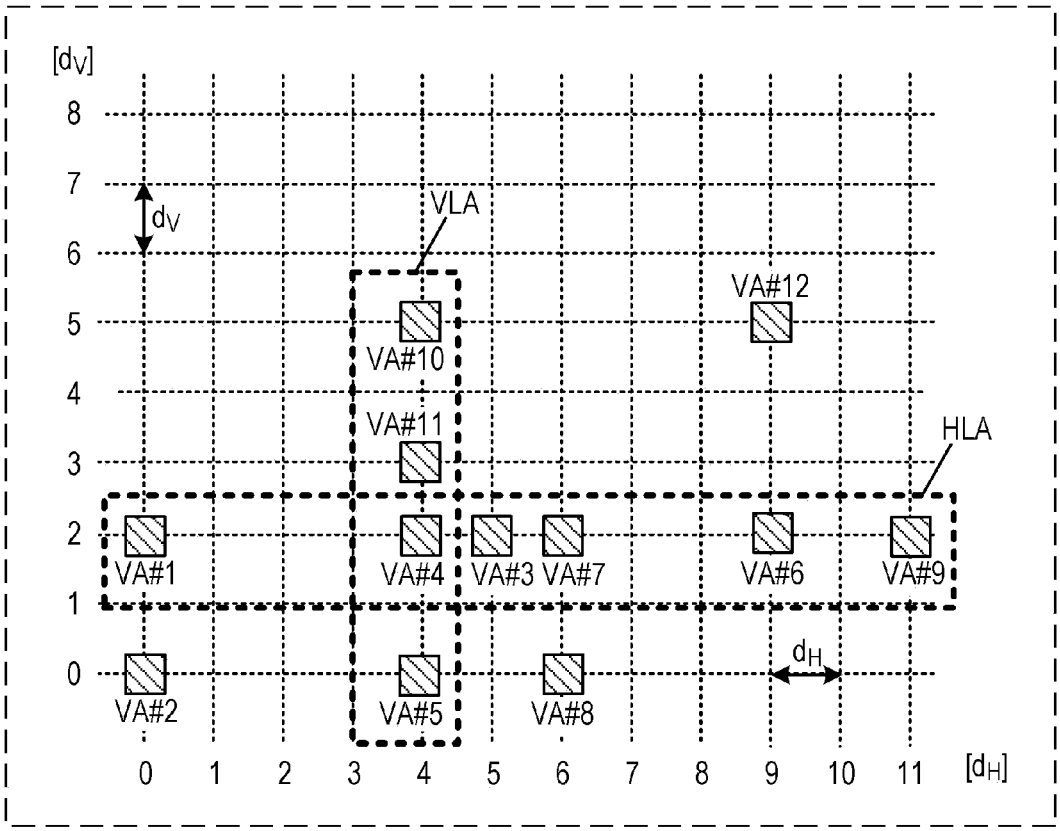
FIG. 21B is a view illustrating an arrangement example of the virtual reception array in Variation 5 of Embodiment 2 of the present disclosure.

FIG. 21A illustrates an arrangement example of the transmission antennas 106 and the reception antennas 202. FIG. 21B illustrates an arrangement of a virtual reception array obtained from the antenna arrangement illustrated in FIG. 21A.

In FIG. 21A, the three transmission antennas 106 are denoted respectively by Tx#1 to Tx#3, and the four reception antennas 202 are denoted respectively by Rx#1 to Rx#4. In FIG. 21A, the transmission antennas Tx#1 to Tx#3 are arranged in a pattern in which one antenna is arranged on the right side of the transmission antenna Tx#1 in the horizontal direction with an inter-element space larger than an inter-element space in the vertical direction (L shape turned +90°), the transmission antenna Tx#1 being a base point and being the top antenna out of two antennas arranged in the vertical direction. Meanwhile, the reception antennas Rx#1 to Rx#4 are arranged such that one antenna is arranged above the reception antenna Rx#2 in the vertical direction with an inter-element space smaller than inter-element spaces in the horizontal direction (T-shape turned 180°), the reception antenna Rx#2 being a base point and being the middle antenna out of three antennas arranged in the horizontal direction.

Moreover, the arrangement of the transmission antennas 106 and the reception antennas 202 in this variation satisfies the restriction conditions described in Embodiment 1 except for A-1 and B-1, that is A-2 and B-2.

The arrangement of the virtual reception array illustrated in FIG. 21B and provided by the antenna arrangement illustrated in FIG. 21A has the following characteristics.

(1) Horizontal Direction

Horizontal positional relationships among the two transmission antennas Tx#1 and Tx#3 arranged with an inter-element space $5d_H$ in the horizontal direction and the three reception antennas Rx#1, Rx#2, and Rx#3 arranged with inter-element spaces $4d_H$ and $2d_H$ in the horizontal direction in FIG. 21A satisfy the condition A-3 and, due to this positional relationship, the virtual reception array illustrated in FIG. 21B includes a virtual horizontal linear array antenna HLA including six elements arranged on a straight line with inter-element spaces $4d_H$, $d_H$, $d_H$, $3d_H$, and $2d_H$ in the horizontal direction (VA#1, VA#4, VA#3, VA#7, VA#6, and VA#9 surrounded by the broken line illustrated in FIG. 21B).

When the horizontal position of VA#1 is a reference, the horizontal coordinates ($x_1$, $x_2$, $x_3$, $x_4$, $x_5$, $x_6$) of the six elements (VA#1, VA#4, VA#3, VA#7, VA#6, VA#9) forming the virtual horizontal linear array antenna HLA are such that $(x_1, x_2, x_3, x_4, x_5, x_6)=[0, 4d_H, 5d_H, 6d_H, 9d_H, 11d_H]$.

The inter-element spaces $|x_A-x_B|$ (where A and B are each one of integers from one to six, and A≠B) each between any two different elements included in the virtual horizontal linear array antenna HLA are $\{1, 2, 3, 4, 5, 6, 7, 9, 11\}\times d_H$. By using combinations of elements out of the six elements in the virtual horizontal linear array antenna HLA whose inter-element spaces are $\{1, 2, 3, 4, 5, 6, 7\}\times d_H$, the radar device 10 can be virtually assumed to have an uniform linear array including eight elements arranged with the inter-element spaces of the basic unit $d_H$ in the horizontal direction, and perform the direction-of-arrival estimation with high angular resolution.

Meanwhile, by using combinations whose inter-element spaces are $\{1, 2, 3, 4, 5, 6, 7, 9, 11\}\times d_H$, the radar device 10 can be virtually assumed to have a linear array including 10 elements arranged with inter-element spaces $2d_H$ which are twice the basic unit $d_H$ in the horizontal direction, and perform the direction-of-arrival estimation. In this case, in the radar device 10 assumed to have the linear array including 10 elements, the spatial side robe slightly increases but the aperture length is further increased compared to the radar device 10 assumed to have the uniform linear array including eight elements arranged with the inter-element spaces of the basic unit $d_H$. Accordingly, the angular resolution can be improved.

For example, in the case of $d_H$=0.5λ, the radar device 10 can perform the direction-of-arrival estimation with the generation of grating lobes being suppressed in a wide range from −90° to +90° in the horizontal direction. Moreover, when the radar device 10 performs the direction-of-arrival estimation while being virtually assumed to have the uniform linear array including eight elements arranged with the inter-element spaces of the basic unit $d_H$, the array aperture length of the radar device 10 is $7d_H$=3.5λ, and the beam width BW thereof is thus about 11°. Meanwhile, when the radar device 10 performs the direction-of-arrival estimation while being virtually assumed to have the linear array including 10 elements arranged with the inter-element spaces $2d_H$, the array aperture length of the radar device 10 is $11d_H$=5.5λ. Accordingly, the beam width BW of the radar device 10 is about 7° and the radar device 10 can achieve high angular resolution of BW=10° or less.

(2) Vertical Direction

Vertical positional relationships among the two transmission antennas Tx#1 and Tx#2 arranged with an inter-element space $2d_V$ in the vertical direction and the two reception antennas Rx#2 and Rx#4 arranged with an inter-element space $3d_V$ in the vertical direction in FIG. 21A satisfy the condition B-3 and, due to this positional relationship, the virtual reception array illustrated in FIG. 21B includes a virtual vertical linear array antenna VLA including four elements arranged on a straight line with inter-element spaces $2d_V$, $d_V$, and $2d_V$ in the vertical direction (VA#5, VA#4, VA#11, and VA#10 surrounded by the broken line illustrated in FIG. 21B).

When the vertical position of VA#5 is a reference, the vertical coordinates ($y_1$, $y_2$, $y_3$, $y_4$) of the four elements (VA#5, VA#4, VA#11, VA#10) forming the virtual vertical linear array antenna VLA are such that $(y_1, y_2, y_3, y_4)=[0, 2d_V, 3d_V, 5d_V]$.

The inter-element spaces $|y_A-y_B|$ (where A and B are each one of integers from one to four, and $A\neq B$) each between any two different elements included in the virtual vertical linear array antenna VLA are $\{1, 2, 3, 5\}\times d_V$. By using combinations of elements out of the four elements in the virtual vertical linear array antenna VLA whose inter-element spaces are $\{1, 2, 3\}\times d_V$, the radar device 10 can be virtually assumed to have an uniform linear array including four elements arranged with inter-element spaces of the basic unit $d_V$ in the vertical direction, and perform the direction-of-arrival estimation with high angular resolution.

Meanwhile, by using combinations whose inter-element spaces are $\{1, 2, 3, 5\}\times d_V$, the radar device 10 can be virtually assumed to have a linear array including five elements arranged with an inter-element space $2d_V$ which is twice the basic unit $d_V$ in the vertical direction, and perform the direction-of-arrival estimation. In this case, in the radar device 10 assumed to have the linear array including five elements, the spatial side robe slightly increases but the aperture length is further increased compared to the radar device 10 assumed to have the uniform linear array including four elements arranged with the inter-element spaces of the basic unit $d_V$. Accordingly, the angular resolution can be improved.

For example, in the case of $d_V=0.5\lambda$, the radar device 10 can perform the direction-of-arrival estimation with the generation of grating lobes being suppressed in a wide range from −90° to +90° in the vertical direction. Moreover, when the radar device 10 performs the direction-of-arrival estimation while being virtually assumed to have the linear array including five elements arranged with the inter-element space $2d_V$, the array aperture length of the radar device 10 is $5d_V=2.5\lambda$, and the beam width BW thereof is thus about 16°.

(Variation 6 of Embodiment 2)

In Embodiment 2, a radar device 10 using five or more reception antennas 202 may include three transmission antennas 106. Alternatively, a radar device 10 using five or more transmission antennas 106 may include three reception antennas 202.

Description is given below of an example of the radar device 10 which includes three transmission antennas 106 and five reception antennas 202.

Moreover, there is used a MIMO array arrangement in which the size of the array element is about one wavelength (1λ) in the vertical and horizontal directions due to stacking of the antenna elements in the vertical and horizontal directions.

Figure 22A:
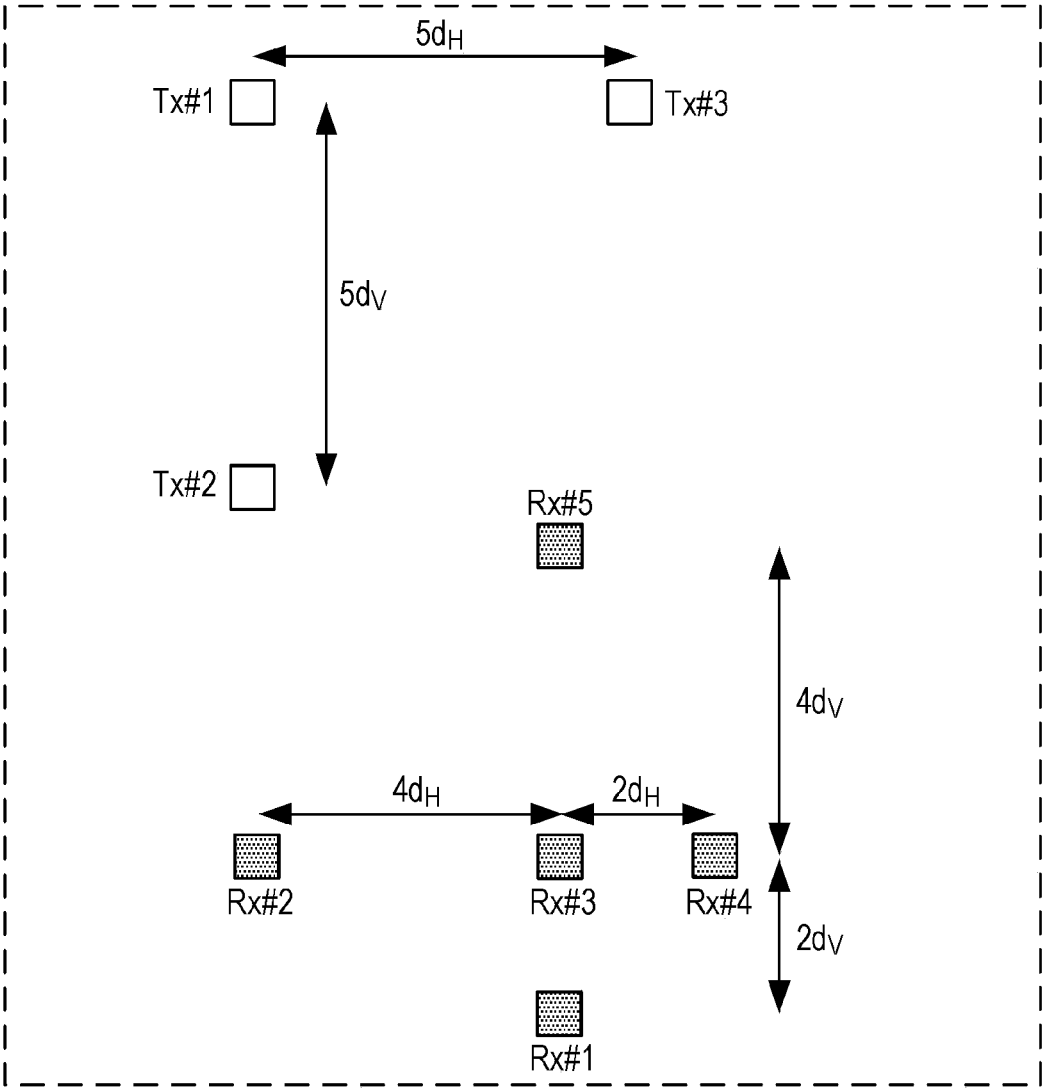
FIG. 22A is a view illustrating an arrangement example of the transmission antennas and the reception antennas in Variation 6 of Embodiment 2 of the present disclosure.
Figure 22B:
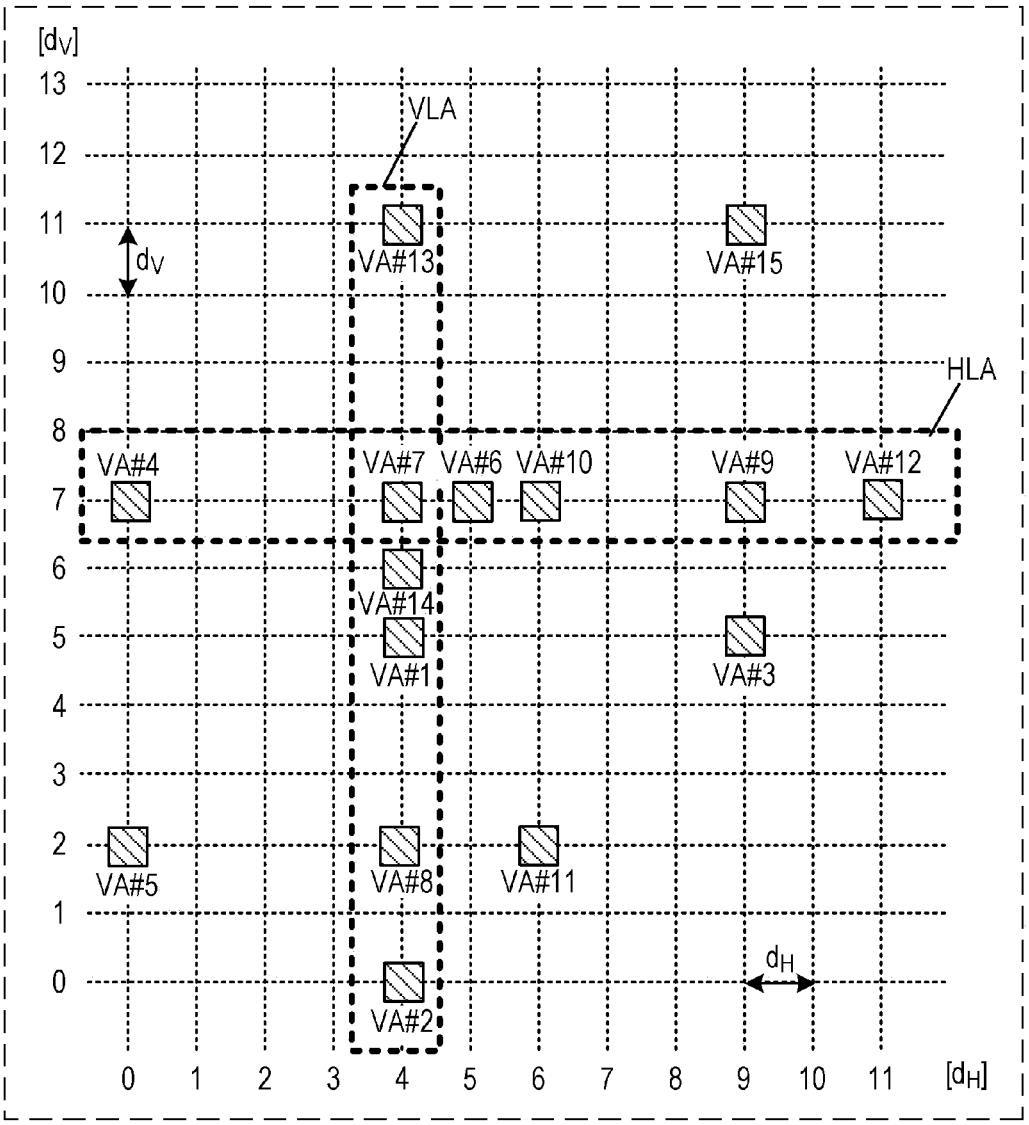
FIG. 22B is a view illustrating an arrangement example of the virtual reception array in Variation 6 of Embodiment 2 of the present disclosure.

FIG. 22A illustrates an arrangement example of the transmission antennas 106 and the reception antennas 202. FIG. 22B illustrates an arrangement of a virtual reception array obtained from the antenna arrangement illustrated in FIG. 22A.

In FIG. 22A, the three transmission antennas 106 are denoted respectively by Tx#1 to Tx#3, and the five reception antennas 202 are denoted respectively by Rx#1 to Rx#5. In FIG. 22A, the transmission antennas Tx#1 to Tx#3 are arranged in a pattern in which one antenna is arranged on the right side of the transmission antenna Tx#1 in the horizontal direction (L shape turned +90°), the transmission antenna Tx#1 being the base point and being the top antenna out of two antennas arranged in the vertical direction. Meanwhile, the reception antennas Rx#1 to Rx#5 are arranged such that one antenna is arranged on each of the upper and lower sides of the reception antenna Rx#3 in the vertical direction, the reception antenna Rx#3 being a base point and being the middle antenna out of three antennas arranged in the horizontal direction (cross shape). Note that the arrangement of the reception antennas Rx#1 to Rx#5 are not limited to the cross arrangement, and may be a L-shaped arrangement or a T-shaped arrangement (see, for example, FIGS. 24A to 24F to be described later).

Moreover, the arrangement of the transmission antennas 106 and the reception antennas 202 in this variation satisfies the restriction conditions described in Embodiment 1 except for A-1 and B-1, that is A-2 and B-2.

The arrangement of the virtual reception array illustrated in FIG. 22B and provided by the antenna arrangement illustrated in FIG. 22A has the following characteristics.

(1) Horizontal Direction

Horizontal positional relationships among the two transmission antennas Tx#1 and Tx#3 arranged with an inter-element space $5d_H$ in the horizontal direction and the three reception antennas Rx#2, Rx#3, and Rx#4 arranged with inter-element spaces $4d_H$ and $2d_H$ in the horizontal direction in FIG. 22A satisfy the condition A-3 and, due to this positional relationship, the virtual reception array illustrated in FIG. 22B includes a virtual horizontal linear array antenna HLA including six elements arranged on a straight line with inter-element spaces $4d_H$, $d_H$, $d_H$, $3d_H$, and $2d_H$ in the horizontal direction (VA#4, VA#7, VA#6, VA#10, VA#9, and VA#12 surrounded by the broken line illustrated in FIG. 22B).

When the horizontal position of VA#4 is a reference, the horizontal coordinates ($x_1$, $x_2$, $x_3$, $x_4$, $x_5$, $x_6$) of the six elements (VA#4, VA#7, VA#6, VA#10, VA#9, VA#12) forming the virtual horizontal linear array antenna HLA are such that $(x_1, x_2, x_3, x_4, x_5, x_6)=[0, 4d_H, 5d_H, 6d_H, 9d_H, 11d_H]$.

The inter-element spaces $|x_A-x_B|$ (where A and B are each one of integers from one to six, and $A\neq B$) each between any two different elements included in the virtual horizontal linear array antenna HLA are $\{1, 2, 3, 4, 5, 6, 7, 9, 11\}\times d_H$. By using combinations of elements out of the six elements in the virtual horizontal linear array antenna HLA whose inter-element spaces are $\{1, 2, 3, 4, 5, 6, 7\}\times d_H$, the radar device 10 can be virtually assumed to have an uniform linear array including eight elements arranged with the inter-element spaces of the basic unit $d_H$ in the horizontal direction, and perform the direction-of-arrival estimation with high angular resolution.

Meanwhile, by using combinations whose inter-element spaces are $\{1, 2, 3, 4, 5, 6, 7, 9, 11\}\times d_H$, the radar device 10 can be virtually assumed to have a linear array including 10 elements arranged with inter-element spaces $2d_H$ which are twice the basic unit $d_H$ in the horizontal direction, and perform the direction-of-arrival estimation. In this case, in the radar device 10 assumed to have the linear array including 10 elements, the spatial side robe slightly increases but the aperture length is further increased compared to the radar device 10 assumed to have the uniform linear array including eight elements arranged with the inter-element spaces of the basic unit $d_H$. Accordingly, the angular resolution can be improved.

For example, in the case of $d_H$=0.5λ, the radar device 10 can perform the direction-of-arrival estimation with the generation of grating lobes being suppressed in a wide range from −90° to +90° in the horizontal direction. Moreover, when the radar device 10 performs the direction-of-arrival estimation while being virtually assumed to have the uniform linear array including eight elements arranged with the inter-element spaces of the basic unit $d_H$, the array aperture length of the radar device 10 is $7d_H$=3.5λ, and the beam width BW thereof is thus about 11°. Meanwhile, when the radar device 10 performs the direction-of-arrival estimation while being virtually assumed to have the linear array including 10 elements arranged with the inter-element spaces $2d_H$, the array aperture length of the radar device 10 is $11d_H$=5.5λ. Accordingly, the beam width BW thereof is about 7° and the radar device 10 can achieve high angular resolution of BW=10° or less.

(2) Vertical Direction

Vertical positional relationships among the two transmission antennas Tx#1 and Tx#2 arranged with an inter-element space $5d_V$ in the vertical direction and the three reception antennas Rx#1, Rx#3, and Rx#5 arranged with inter-element spaces $2d_V$ and $4d_V$ in the vertical direction in FIG. 22A satisfy the condition B-3 and, due to this positional relationship, the virtual reception array illustrated in FIG. 22B includes a virtual vertical linear array antenna VLA including six elements arranged on a straight line with inter-element spaces $2d_V$, $3d_V$, $d_V$, $d_V$, and $4d_V$ in the vertical direction (VA#2, VA#8, VA#1, VA#14, VA#7, and VA#13 surrounded by the broken line illustrated in FIG. 22B).

When the vertical position of VA#2 is a reference, the vertical coordinates $(y_1, y_2, y_3, y_4, y_5, y_6)$ of the six elements (VA#2, VA#8, VA#1, VA#14, VA#7, VA#13) forming the virtual vertical linear array antenna VLA are such that $(y_1, y_2, y_3, y_4, y_5, y_6)=[0, 2d_V, 5d_V, 6d_V, 7d_V, 11d_V]$.

The inter-element spaces $|y_A-y_B|$ (where A and B are each one of integers from one to six, and A≠B) each between any two different elements included in the virtual vertical linear array antenna VLA are $\{1, 2, 3, 4, 5, 6, 7, 9, 11\}\times d_V$. By using combinations of elements out of the six elements in the virtual vertical linear array antenna VLA whose inter-element spaces are $\{1, 2, 3, 4, 5, 6, 7\}\times d_V$, the radar device 10 can be virtually assumed to have an uniform linear array including eight elements arranged with inter-element spaces of the basic unit $d_V$ in the vertical direction, and perform the direction-of-arrival estimation with high angular resolution.

Meanwhile, by using combinations whose inter-element spaces are $\{1, 2, 3, 4, 5, 6, 7, 9, 11\}\times d_V$, the radar device 10 can be virtually assumed to have a linear array including 10 elements arranged with inter-element spaces of the basic unit $d_V$ and inter-element spaces $2d_V$ which are twice the basic unit $d_V$ in the vertical direction, and perform the direction-of-arrival estimation. In this case, in the radar device 10 assumed to have the linear array including 10 elements, the spatial side robe slightly increases but the aperture length is further increased compared to the radar device 10 assumed to have the uniform linear array including eight elements arranged with the inter-element spaces of the basic unit $d_V$. Accordingly, the main beam becomes sharper and the angular resolution can be improved.

For example, in the case of $d_V$=0.5λ, the radar device 10 can perform the direction-of-arrival estimation with the generation of grating lobes being suppressed in a wide range from −90° to +90° in the vertical direction. Moreover, when the radar device 10 performs the direction-of-arrival estimation while being virtually assumed to have the uniform linear array including eight elements arranged with the inter-element spaces of the basic unit $d_V$, the array aperture length of the radar device 10 is $7d_V$=3.5λ, and the beam width BW thereof is thus about 11°. Meanwhile, when the radar device 10 performs the direction-of-arrival estimation while being virtually assumed to have the linear array including 10 elements arranged with the inter-element spaces $2d_V$, the array aperture length of the radar device 10 is $11d_V$=5.5λ. Accordingly, the beam width BW of the radar device 10 is about 7° and the radar device 10 can achieve high angular resolution of BW=10° or less.

The embodiments of one aspect of the present disclosure have been described above.

Operations in the embodiments and variations described above can be carried out while being combined with one another as appropriate.

Other Embodiments (1) The antenna arrangements of the radar device 10 including four transmission antennas 106 and four reception antennas 202 are not limited to the antenna arrangements illustrated in FIGS. 7A, 9A, 13A, and 15A to 20A.

For example, the antenna arrangement may be a combination of the arrangement of the transmission antennas 106 and the arrangement of the reception antennas 202 which are each any of L-shaped and T-shaped arrangements. This can maximize the aperture surface formed by the virtual reception array extending in the vertical direction and the horizontal direction, as in the embodiments described above. Moreover, the arrangement of the transmission antennas 106 and the arrangement of the reception antennas 202 may each be an arrangement of an L-shape or a T-shape flipped vertically or horizontally.

Figure 23A:
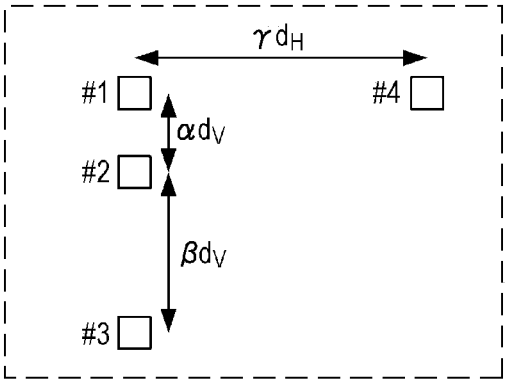
FIG. 23A is a view illustrating an arrangement example of the transmission antennas in the present disclosure.
Figure 23B:
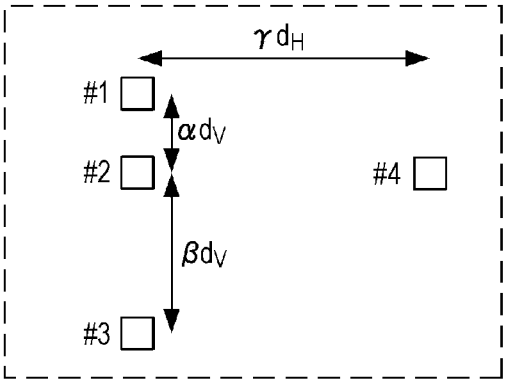
FIG. 23B is a view illustrating an arrangement example of the transmission antennas in the present disclosure.
Figure 23C:
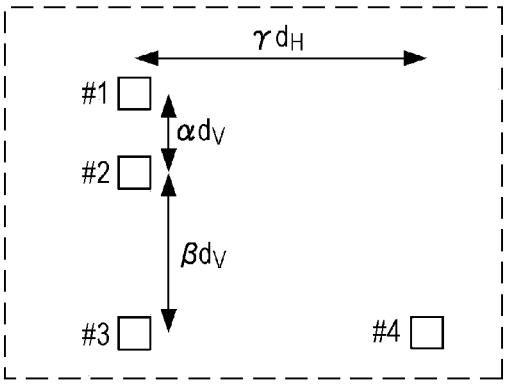
FIG. 23C is a view illustrating an arrangement example of the transmission antennas in the present disclosure.
Figure 23D:
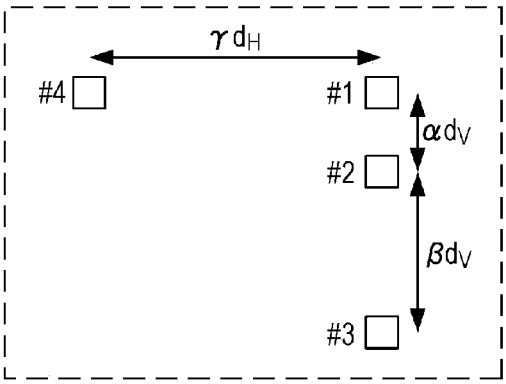
FIG. 23D is a view illustrating an arrangement example of the transmission antennas in the present disclosure.
Figure 23E:
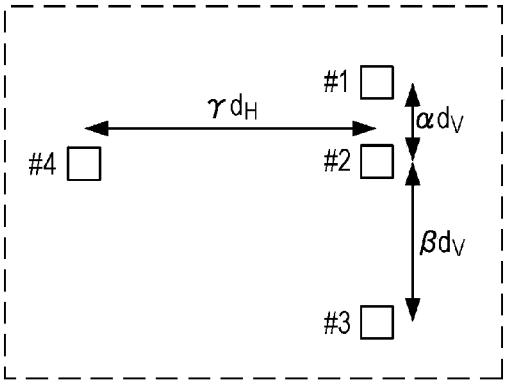
FIG. 23E is a view illustrating an arrangement example of the transmission antennas in the present disclosure.
Figure 23F:
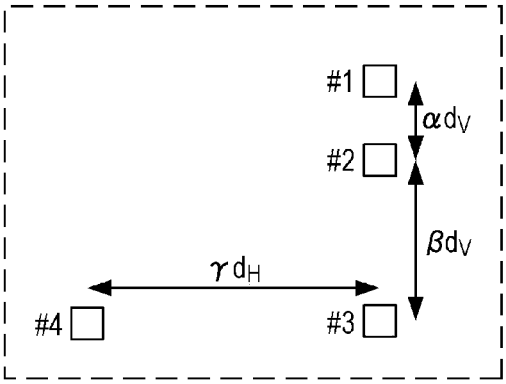
FIG. 23F is a view illustrating an arrangement example of the transmission antennas in the present disclosure.

FIGS. 23A to 23F illustrate examples of the antenna arrangements for four transmission antennas 106 in each of which two transmission antennas 106 are arranged in the horizontal direction and three transmission antennas 106 are arranged in the vertical direction and from which the equivalent effects can be obtained. As illustrated in FIGS. 23A and 23F, the arrangement may be an L-shaped arrangement (FIG. 23C), an arrangement of an L-shape flipped vertically (FIG. 23A), an arrangement of an L-shape turned 180° (FIG. 23D), an arrangement of an L-shape flipped horizontally (FIG. 23F), an arrangement of a T-shape turn +90° (FIG. 23E), or an arrangement of a T-shape turned −90° (FIG. 23B).

Moreover, the number of the transmission antennas 106 is not limited to four. Similar effects can be obtained when inter-element spaces α and β among three of the transmission antennas 106 which are illustrated in each of FIGS. 23A to 23F and which are arranged on a straight line in the vertical direction are replaced with each other. Specifically, similar effects can be obtained when the inter-element space $\alpha d_V$ between the element #1 and the element #2 and the inter-element space $\beta d_V$ between the element #2 and the element #3 are replaced such that the inter-element space between the element #1 and the element #2 is $\beta d_V$ and the inter-element space between the element #2 and the element #3 is $\alpha d_V$.

Figure 24A:
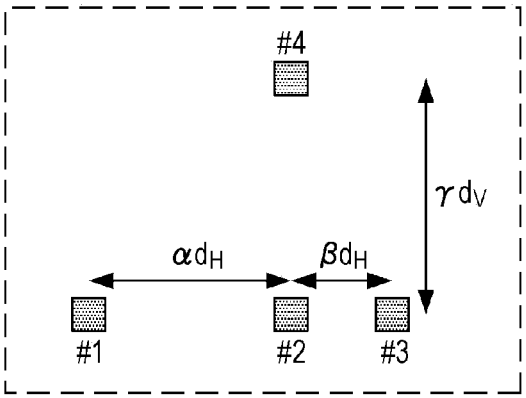
FIG. 24A is a view illustrating an arrangement example of the reception antennas in the present disclosure.
Figure 24B:
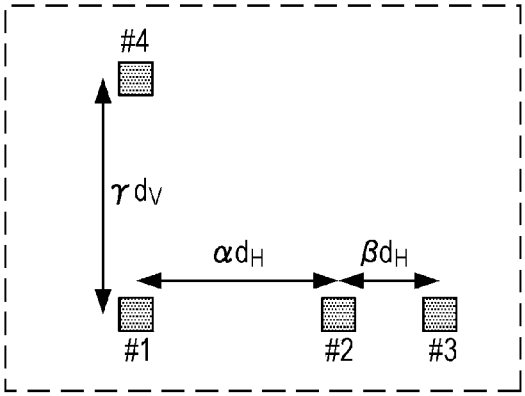
FIG. 24B is a view illustrating an arrangement example of the reception antennas in the present disclosure.
Figure 24C:
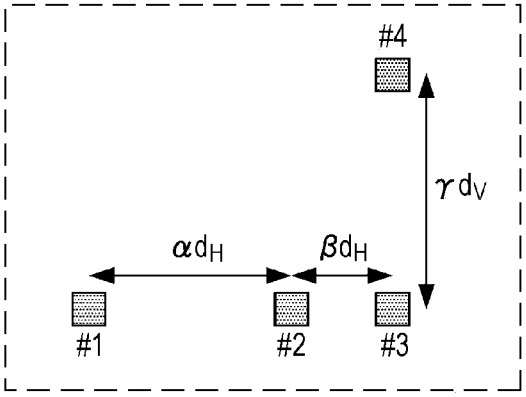
FIG. 24C is a view illustrating an arrangement example of the reception antennas in the present disclosure.
Figure 24D:
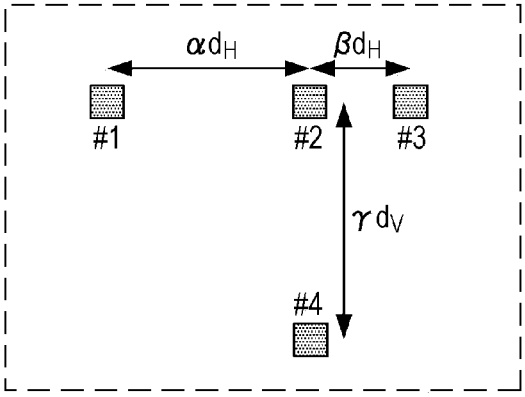
FIG. 24D is a view illustrating an arrangement example of the reception antennas in the present disclosure.
Figure 24E:
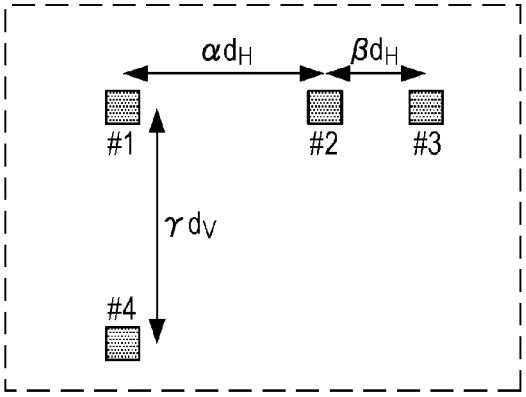
FIG. 24E is a view illustrating an arrangement example of the reception antennas in the present disclosure.
Figure 24F:
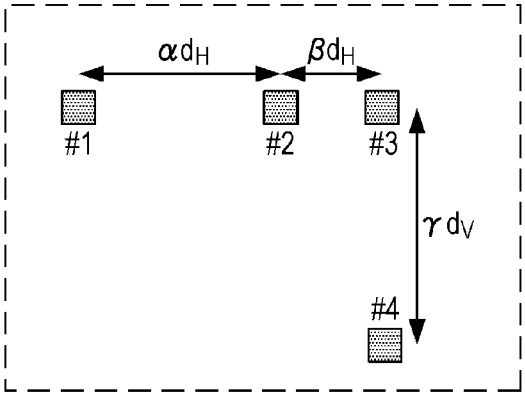
FIG. 24F is a view illustrating an arrangement example of the reception antennas in the present disclosure.

FIGS. 24A to 24F illustrate examples of the antenna arrangements for four reception antennas 202 in each of which three reception antennas 202 are arranged in the horizontal direction and two reception antennas 202 are arranged in the vertical direction and from which the equivalent effects can be obtained. As illustrated in FIGS. 24A and 24F, the arrangement may be an L-shaped arrangement (FIG. 24B), an arrangement of an L-shape flipped horizontally (FIG. 24C), an arrangement of an L-shape flipped vertically (FIG. 24E), an arrangement of an L-shape turned 180° (FIG. 24F), a T-shaped arrangement (FIG. 24D), or an arrangement of a T-shape flipped vertically (FIG. 24A).

Moreover, the number of the reception antennas 202 is not limited to four. Similar effects can be obtained when inter-element spaces $\alpha$ and $\beta$ among three of the reception antennas 202 which are illustrated in each of FIGS. 24A to 24F and which are arranged on a straight line in the horizontal direction are replaced with each other. Specifically, similar effects can be obtained when the inter-element space $\alpha d_H$ between the element #1 and the element #2 and the inter-element space $\beta d_H$ between the element #2 and the element #3 are replaced such that the inter-element space between the element #1 and the element #2 is $\beta d_H$ and the inter-element space between the element #2 and the element #3 is $\alpha d_H$.

In the radar device 10 in which the arrangement of the transmission antennas 106 is set to any of the arrangements of FIGS. 23A to 23F and the arrangement of the reception antennas 202 is set to any of the arrangements of the FIGS. 24A to 24F, the effects similar to those in the embodiments described above can be obtained. Moreover, also in the radar device 10 in which the arrangement of the transmission antennas 106 is set to any of the arrangements of the reception antennas 202 of FIGS. 24A to 24F and the arrangement of the reception antennas 202 is set to any of the arrangements of the transmission antennas 106 of the FIGS. 23A to 23F, the effects similar to those in the embodiments described above can be obtained.

(2) In the embodiments described above, description is given of the case where a coded pulse radar is used. However, the present disclosure can be applied also to a radar method using pulse waves subjected to frequency modulation such as in a chirp pulse radar.

(3) In the radar device 10 illustrated in FIG. 3, the radar transmitter 100 and the radar receiver 200 can be arranged at separate positions physically located away from each other.

(4) For example, the radar device 10 includes, although not illustrated, a central processing unit (CPU), a storage medium such as a read only memory (ROM) storing control programs, and a work memory such as a random access memory (RAM). In this case the functions of the units described above are implemented by the CPU executing the control programs. Note that the hardware configuration of the radar device 10 is not limited to the example described above. For example, the function units of the radar device 10 can be implemented as an integrated circuit (IC). The function units can be each separately implemented on one chip. Alternatively, some or all of the function units can be implemented on one chip.

(5) In the embodiments described above, the direction estimator 214 performs the direction estimation processing in the horizontal direction by forming the virtual horizontal linear array antenna HLA based on the inter-element spaces each between any two different elements in the horizontal direction. Moreover, the direction estimator 214 performs the direction estimation processing in the vertical direction by forming the virtual vertical linear array antenna VLA based on the inter-element spaces each between any two different elements in the vertical direction.

However, the direction estimation processing is not limited to that described above. The two-dimensional direction estimation processing can be performed by forming an array antenna (hereafter, referred to as virtual surface-arranged array antenna) virtually surface-arranged based on the inter-element spaces in the horizontal and vertical directions.

Figure 25:
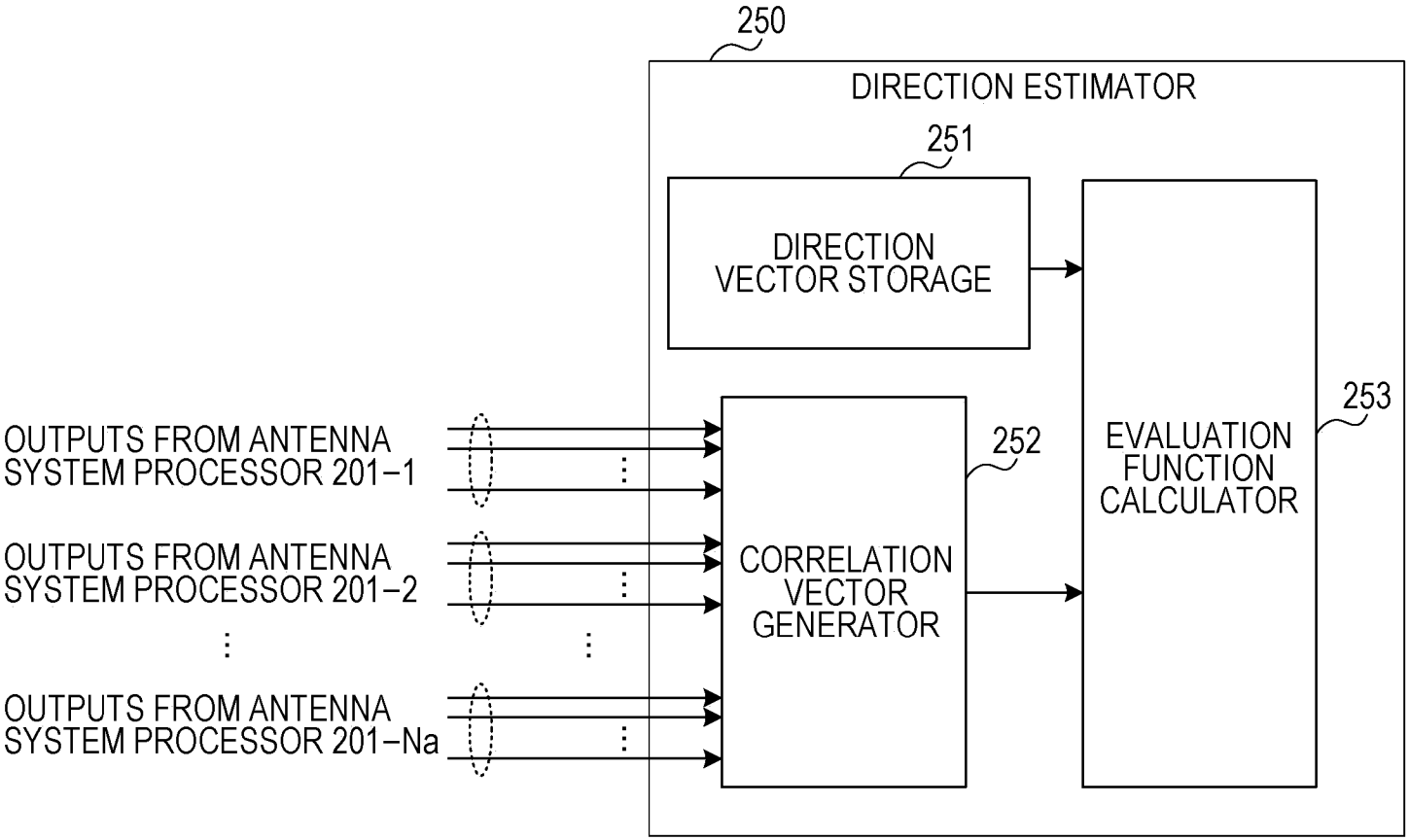
FIG. 25 is a view illustrating another configuration of a direction estimator.

FIG. 25 is a diagram illustrating another configuration of the direction estimator.

Description is given below of operations of a direction estimator 250 illustrated in FIG. 25.

As in the embodiments described above, the direction estimator 250 illustrated in FIG. 25 receives the virtual reception array correlation vector h(k, fs, w) obtained by performing processing in the Na antenna system processors 201, and includes a direction vector storage 251, a correlation vector generator 252, and an evaluation function calculator 253.

Figure 26:
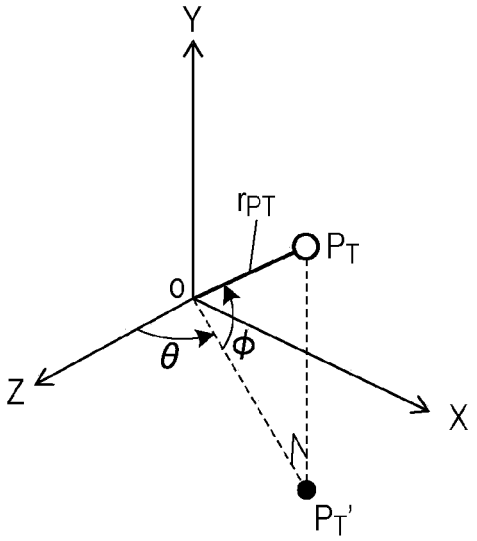
FIG. 26 is a view illustrating a three-dimensional coordinate system used to describe operations of the direction estimator.

FIG. 26 is a view illustrating a three-dimensional coordinate system used for the description of the operations of the direction estimator 250. First, in FIG. 26, the position vector of a physical target $P_T$ based on the original point O is defined as $r_{PT}$.

The azimuth angle $\theta$ is defined as an angle between a straight line O-$P_T'$ and the Z-axis, where PT is a projection point at which a position vector $r_{PT}$ of the physical target $P_T'$ is projected on an XZ plane (when the X coordinate of the physical target $P_T$ is a positive value, $\theta>0$). The elevation angle $\varphi$ is defined as an angle of a line connecting the physical target $P_T$, the original point O, and the projection point $P_T'$ on a plane including the physical target $P_T$, the original point O, and the projection point $P_T'$ (when the Y coordinate of the physical target $P_T$ is a positive value, $\varphi>0$). Note that description is given below of an example in which the transmission antennas 106 and the reception antennas 202 are arranged on a XY plane.

The position vector of the $n_{va}$-th element in the virtual reception array based on the original point O is referred to as $Sn_{va}$. In this case, $n_{va}=1$, Nt×Na.

In this case, the position vector $S_1$ of the first element in the virtual reception array is determined based on a positional relationship between the physical position of the first reception antenna 202-1 and the original point O. The other position vectors $S_2, \ldots, Sn_{va}$ are determined based on the position vector $S_1$ of the first element in the virtual reception array while maintaining the relative arrangement of the virtual reception array determined from the inter-element spaces among the transmission antennas 106 and the reception antennas 202 existing in the XY plane. Note that the original point O may match the physical position of the first reception antenna 202-1.

When the radar receiver 200 receives a reflected wave from the physical target $P_T$ existing in a far field, a phase difference d ($r_{PT}$, 2, 1) of a reception signal at the second element of the virtual reception array from a reception signal at the first element is expressed by the formula (15). In this case, <x, y> is an inner product operator of a vector x and a vector y:

$$d(r_{PT}2, 1) = -\frac{2\pi}{\lambda}\frac{\langle -r_{PT}, (s_2 - s_1)\rangle}{|r_{PT}|} = \frac{2f}{\lambda}\left\{\frac{r_{PT}}{|r_{PT}|}, (s_2 - s_1)\right\} = \frac{2\pi}{\lambda}\left\langle\frac{r_{PT}}{|r_{PT}|}, D(2, 1)\right\rangle. \quad (15)$$

Moreover, the position vector of the second element of the virtual reception array based on the position vector of the first element is expressed as an inter-element vector D(2, 1) in the formula (16):

$$D(2,1)=S_2-S_1 \quad (16).$$

Similarly, when the radar receiver 200 receives the reflected wave from the physical target $P_T$ existing in the far field, a phase difference $d(r_{PT}, n_{va}^{(t)}, n_{va}^{(r)})$ of a reception signal at the $n_{va}^{(t)}$-th element of the virtual reception array from a reception signal at the $n_{va}^{(r)}$-th element is expressed by the formula (17). In this case, $n_{va}^{(r)}=1, \ldots, Nt\times Na$, $n_{va}^{(t)}=Nt\times Na$:

$$d\left(r_{PT}, n_{va}^{(t)}, n_{va}^{(r)}\right) = \frac{2\pi}{\lambda}\left\{\frac{r_{PT}}{|r_{PT}|}, D\left(n_{va}^{(t)}, n_{va}^{(r)}\right)\right\} \tag{17}$$

Moreover, the position vector of the $n_{va}^{(t)}$-th element of the virtual reception array based on the position vector of the $n_{va}^{(r)}$-th element is expressed as an inter-element vector $D(n_{va}^{(t)}, n_{va}^{(r)})$ in the formula (18).

$$D\left(n_{va}^{(t)}, n_{va}^{(r)}\right) = S_{n_{va}^{(t)}} - S_{n_{va}^{(r)}} \tag{18}$$

As depicted in formulae (17) and (18), the phase difference $d(r_{PT}, n_{va}^{(t)}, n_{va}^{(r)})$ of the reception signal at the $n_{va}^{(t)}$-th element of the virtual reception array from the reception signal at the $n_{va}^{(r)}$-th element depends on the inter-element vector $D(n_{va}^{(t)}, n_{va}^{(r)})$ and an unit vector $(r_{PT}/|r_{PT}|)$ indicating the direction in which the physical target $P_T$ exists in the far field.

Moreover, when the elements of the virtual reception array exist on the same plane, the inter-element vector $D(n_{va}^{(t)}, n_{va}^{(r)})$ exists on the same plane. The direction estimator 250 forms the virtual surface-arranged array antenna by using all or some of such inter-element vectors while assuming that elements virtually exist at positions indicated by the inter-element vectors, and performs the two-dimensional direction estimation processing.

Note that, when virtual elements are arranged to overlap one another, one of the overlapping elements is fixedly selected in advance. Alternatively, averaging processing can be performed by using reception signals at all or some of the virtual elements overlapping one another.

Description is given below of two-dimensional direction estimation processing using the beamformer method in the case where the virtual surface-arranged array antenna is formed by using Nq inter-element vector groups.

In this case, the nq-th inter-element vector forming the virtual surface-arranged array antenna is expressed as $D(n_{va(nq)}^{(t)}, n_{va(nq)}^{(r)})$. In this case, $nq=1, \ldots, N_q$.

The correlation vector generator 252 generates a virtual surface-arranged array antenna correlation vector $h_{VA}(k, fs, w)$ depicted in the formula (19) by using $h_1(k, fs, w), \ldots, h_{Na\times Nr}(k, fs, w)$ which are elements of the virtual reception array correlation vector $h_{_after_cal}(k, fs, w)$:

$$h_{VA}(k, fs, w) = \begin{pmatrix} h_{n_{va(1)}^{(t)}}(k, fs, w)h^{*}_{n_{va(1)}^{(r)}}(k, fs, w) \\ h_{n_{va(2)}^{(t)}}(k, fs, w)h^{*}_{n_{va(2)}^{(r)}}(k, fs, w) \\ \vdots \\ h_{n_{va(Nq)}^{(t)}}(k, fs, w)h^{*}_{n_{va(Nq)}^{(r)}}(k, fs, w) \end{pmatrix} \tag{19}$$

The direction vector storage 251 stores a virtual surface-arranged array direction vector $a_{VA}(\theta u, \varphi v)$ depicted by the formula (20).

$$a_{VA}(\theta_u, \phi_v) = \begin{bmatrix} \exp\left\{j\frac{2\pi}{\lambda}\left\{\frac{r_{PT}(\theta_u, \phi_v)}{|r_{PT}(\theta_u, \phi_v)|}, D\left(n_{va(1)}^{(t)}, n_{va(1)}^{(r)}\right)\right\}\right\} \\ \exp\left\{j\frac{2\pi}{\lambda}\left\{\frac{r_{PT}(\theta_u, \phi_v)}{|r_{PT}(\theta_u, \phi_v)|}, D\left(n_{va(2)}^{(t)}, n_{va(2)}^{(r)}\right)\right\}\right\} \\ \vdots \\ \exp\left\{j\frac{2\pi}{\lambda}\left\{\frac{r_{PT}(\theta_u, \phi_v)}{|r_{PT}(\theta_u, \phi_v)|}, D\left(n_{va(Nq)}^{(t)}, n_{va(Nq)}^{(r)}\right)\right\}\right\} \end{bmatrix} \tag{20}$$

Relationships among the azimuth angle θ, the elevation angle φ, and the unit vector $(r_{PT}/|r_{PT}|)$ indicating the direction of the physical target $P_T$ in the case where the virtual reception array exists in the XY plane are expressed by the formula (21). The evaluation function calculator 253 thus calculates $r_{PT}/|r_{PT}|$ by using the formula (21) for each of the angular directions θu and φv used to calculate a two-dimensional spatial profile in the vertical and horizontal directions.

$$\frac{r_{PT}(\theta_u, \phi_v)}{|r_{PT}(\theta_u, \phi_v)|} = \begin{pmatrix} \sin\theta_u\cos\phi_v \\ \sin\phi \\ \cos\theta_u\cos\phi_v \end{pmatrix} \tag{21}$$

The evaluation function calculator 253 performs the two-dimensional direction estimation processing in the horizontal and vertical directions by using the virtual surface-arranged array antenna correlation vector and the virtual surface-arranged array direction vector.

In the two-dimensional direction estimation processing using the beamformer method, the two-dimensional spatial profile in the vertical and horizontal directions are calculated from the virtual surface-arranged array antenna correlation vector $h_{VA}(k, fs, w)$ and the virtual surface-arranged array direction vector $a_{VA}(\theta u, \varphi v)$, by using the two-dimensional direction estimation evaluation function depicted in the formula (22), and the azimuth angle and the elevation angle at which the two-dimensional spatial profile takes the largest value are set as a direction-of-arrival estimation value.

$$P_{VA}(\theta_u, \phi_v, k, fs, w) = |a_{VA}(\theta_u, \phi_v)^H h_{VA}(k, fs, w)|^2 \tag{22}$$

Note that the radar receiver 200 can use methods other than the beamformer method. For example, a high-resolution direction-of-arrival estimation algorithm such as the Capon method and the MUSIC method can be applied while using the virtual surface-arranged array antenna correlation vector $h_{VA}(k, fs, w)$ and the virtual surface-arranged array direction vector $a_{VA}(\theta u, \varphi v)$. This increases the computation amount but can further improve the angular resolution.

Figure 27:
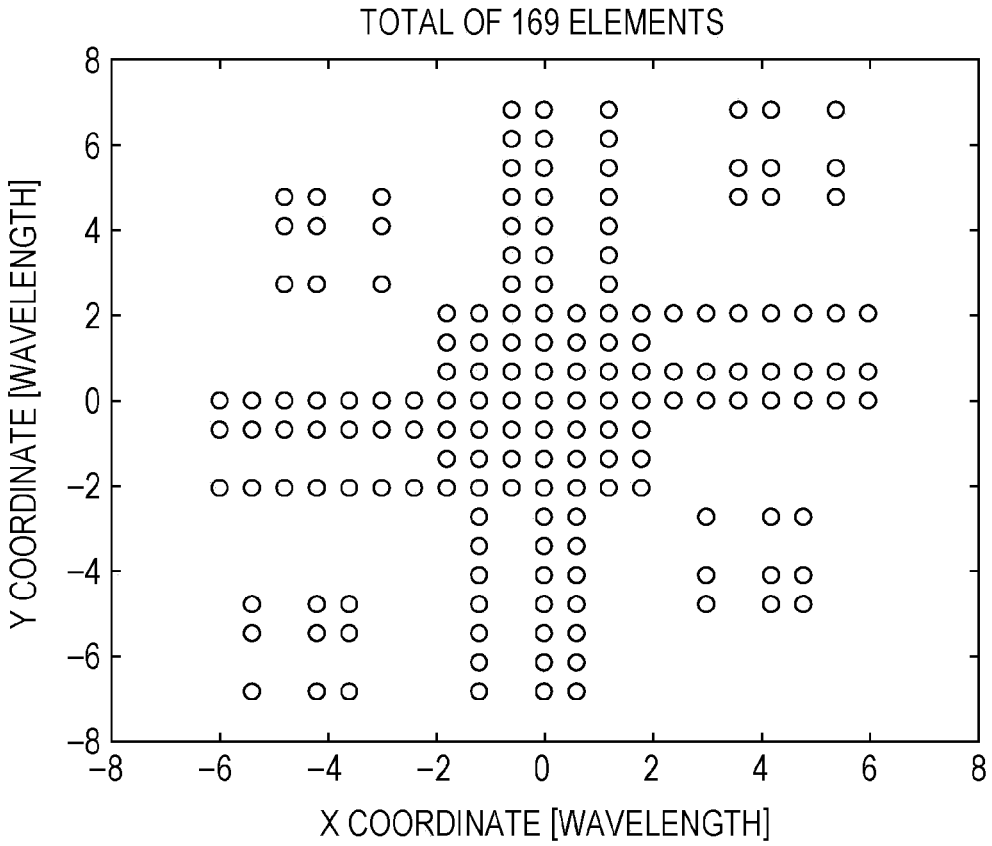
FIG. 27 is a view illustrating a virtual surface-arranged array antenna formed by using the antenna arrangement of FIG. 9A and the arrangement of the virtual reception array of FIG. 9B.

FIG. 27 is a view illustrating a virtual surface-arranged array antenna formed by using the antenna arrangement of FIG. 9A and the arrangement of the virtual reception array of FIG. 9B. Specifically, FIG. 27 illustrates a virtual surface-arranged array antenna formed based on the virtual reception array including 16 (=Nt×Na) elements illustrated in FIG. 9B, under the assumption that elements virtually exist at positions indicated by 16 types of inter-element vectors $D(n_{va}^{(t)}, 1), D(n_{va}^{(t)}, 2), \ldots, D(n_{va}^{(t)}, 16)$. Since $n_{va}^{(t)}=1, \ldots, 16$ (=Nt×Na), the number of virtual elements is 256 (=16×16) if there is no overlapping of the positions indicated by the 16 types of inter-element vectors $D(n_{va}^{(t)}, 1), D(n_{va}^{(t)}, 2), \ldots, D(n_{va}^{(t)}, 16)$. However, in FIG. 27, since there is overlapping of the positions, the virtual surface-arranged array antenna is formed of 169 elements. Accordingly, the virtual surface-arranged array antenna is formed by using $N_q=169$ inter-element vector groups. Note that setting of $D_H=0.6$ wavelength and $D_V=0.68$ wavelength is used.

Figure 28A:
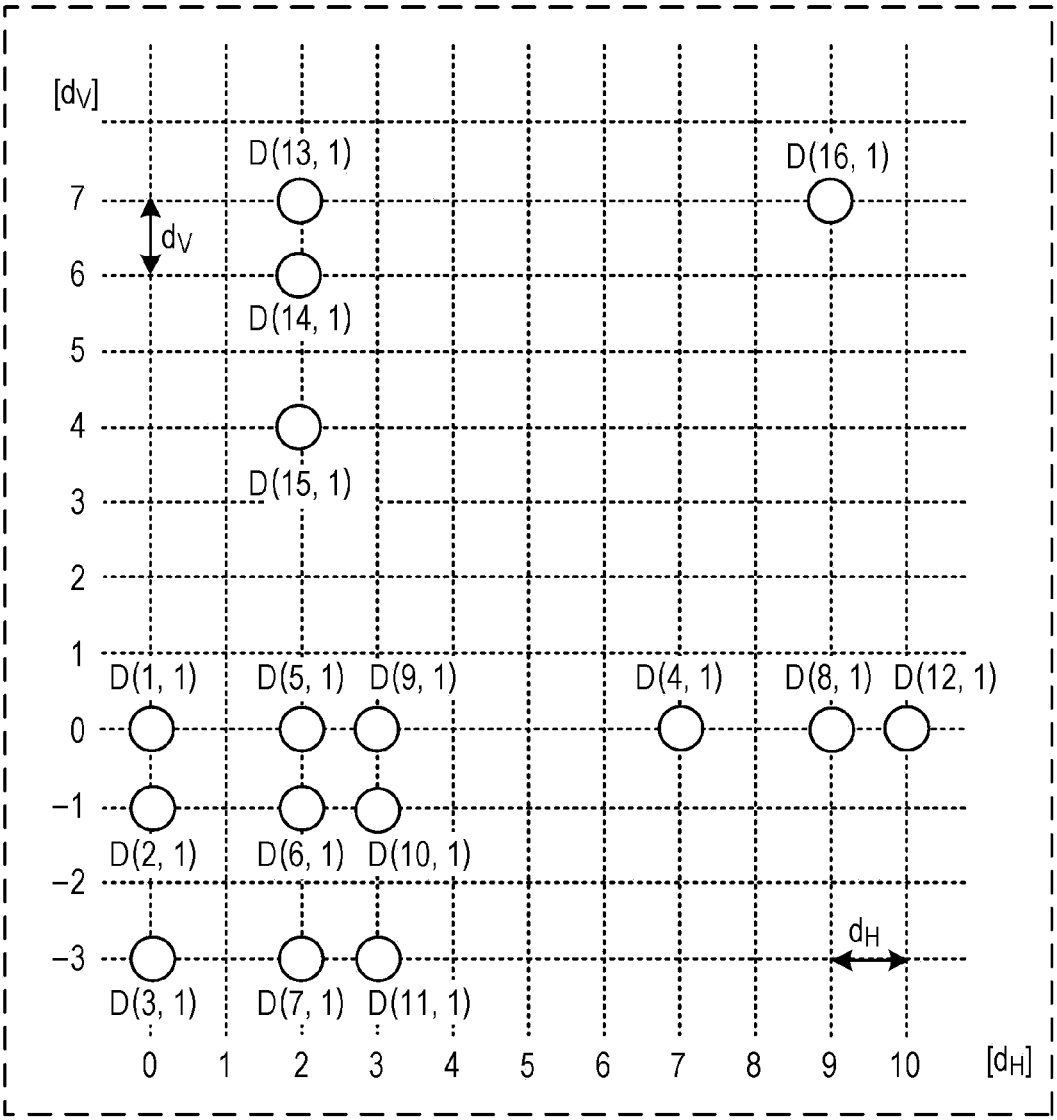
FIG. 28A is a view illustrating elements virtually arranged at positions indicated by inter-element vectors $D(n_{va}^{(t)}, 1)$.
Figure 28B:
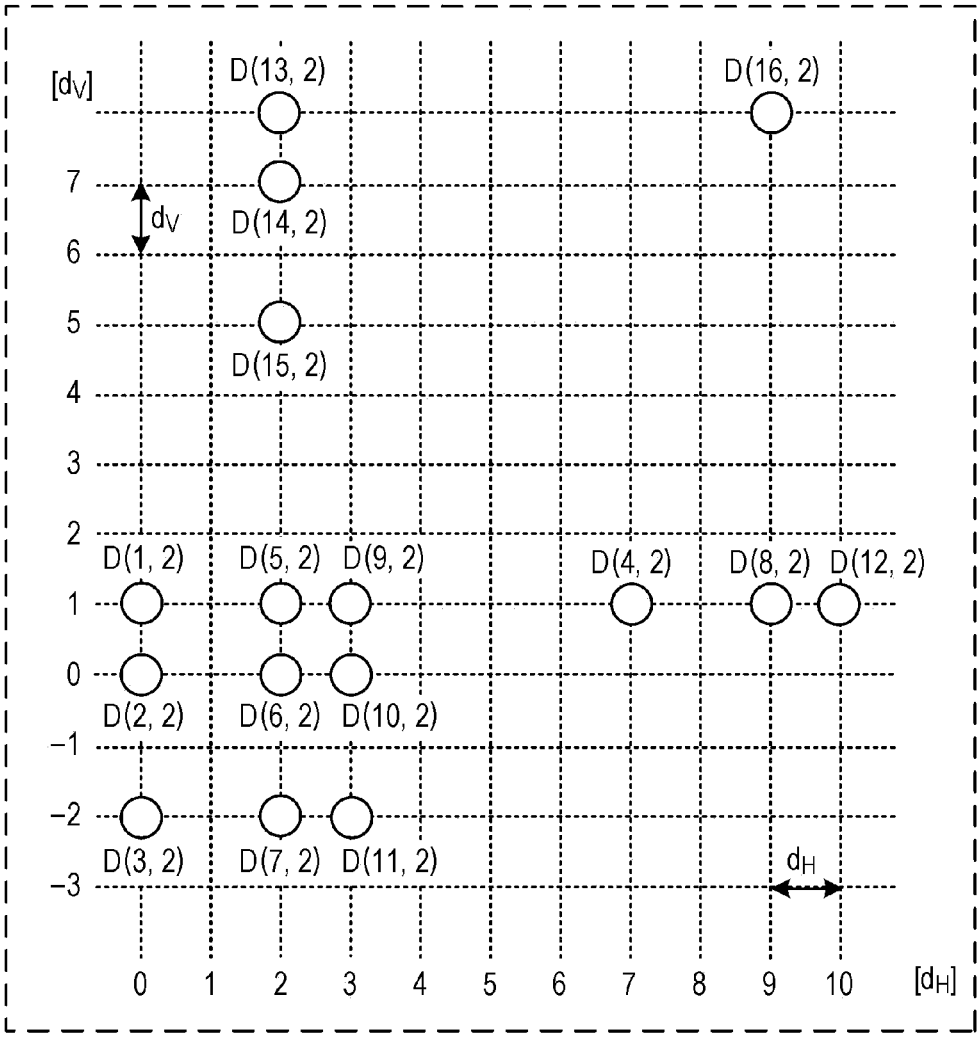
FIG. 28B is a view illustrating elements virtually arranged at positions indicated by inter-element vectors $D(n_{va}^{(t)}, 2)$.

FIG. 28A is a view illustrating elements virtually arranged at positions indicated by the inter-element vectors $D(n_{va}^{(t)}, 1)$. Meanwhile, FIG. 28B is a view illustrating elements virtually arranged at positions indicated by the inter-element vectors $D(n_{va}^{(t)}, 2)$. In this case, $n_{va}^{(t)}=1, \ldots, 16$ (=Nt×Na). Specifically, in FIG. 28A, elements are virtually arranged at positions each indicated by an inter-element vector between the element VA#1 in FIG. 9B and a corresponding one of the element VA#1, . . . , the element VA#16. In FIG. 28B, elements are virtually arranged at positions each indicated by an inter-element vector between the element VA#2 in FIG. 9B and a corresponding one of the element VA#1, . . . , the element VA#16.

Furthermore, elements are virtually arranged at positions indicated by the inter-element vectors $D(n_{va}^{(t)}, 3), \ldots, D(n_{va}^{(t)}, 16)$ as in FIGS. 28A and 28B. FIG. 27 illustrates all elements virtually arranged at positions indicated by all inter-element vectors $D(n_{va}^{(t)}, 1), D(n_{va}^{(t)}, 2), \ldots, D(n_{va}^{(t)}, 16)$ as the virtual surface-arranged array antenna. In this case, the virtual elements include those overlapping one another. The processing is performed with one of the overlapping elements being fixedly selected in advance.

Using the virtual surface-arranged array antenna illustrated in FIG. 27 can virtually increase the number of elements in the radar receiver 200. It is thus possible to obtain an effect of reducing the grating lobe and side lobe levels in the two-dimensional spatial profile calculated in the two-dimensional direction estimation processing.

Figure 29A:
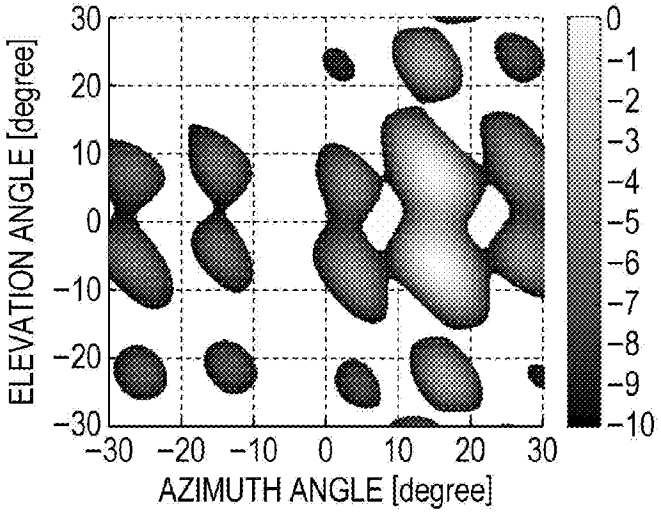
FIG. 29A is a view illustrating a result of calculator simulation of two-dimensional direction estimation processing performed under a condition A by using the virtual reception array illustrated in FIG. 9B.
Figure 29B:
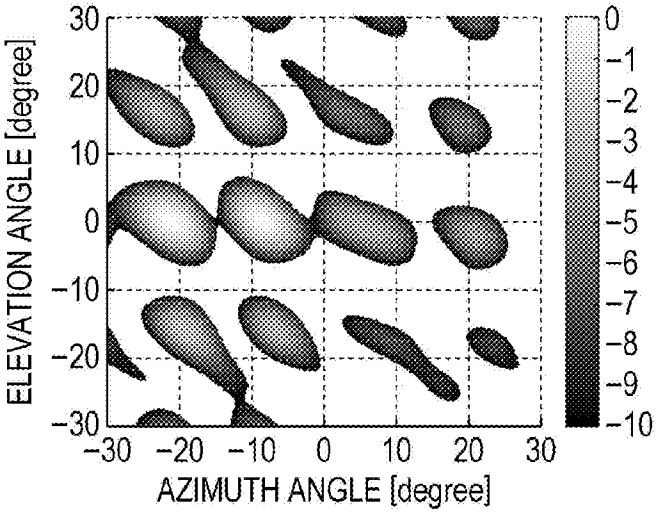
FIG. 29B is a view illustrating a result of calculator simulation of the two-dimensional direction estimation processing performed under a condition B by using the virtual reception array illustrated in FIG. 9B.
Figure 29C:
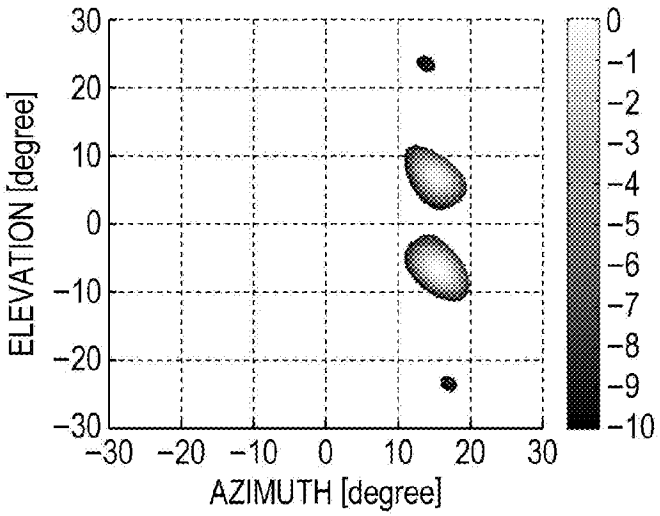
FIG. 29C is a view illustrating a result of calculator simulation of the two-dimensional direction estimation processing performed under the condition A by using the virtual surface-arranged array antenna illustrated in FIG. 27.
Figure 29D:
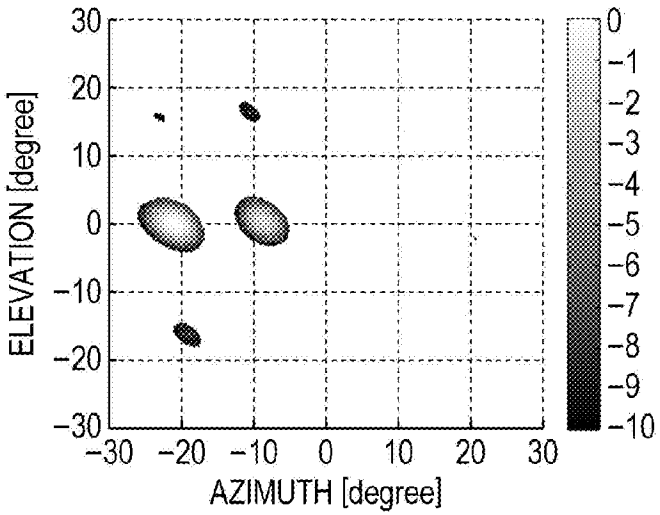
FIG. 29D is a view illustrating a result of calculator simulation of the two-dimensional direction estimation processing performed under the condition B by using the virtual surface-arranged array antenna illustrated in FIG. 27.

FIG. 29A is a view illustrating a result of calculator simulation of the two-dimensional direction estimation processing performed under a condition A by using the virtual reception array illustrated in FIG. 9B. FIG. 29B is a view illustrating a result of calculator simulation of the two-dimensional direction estimation processing performed under a condition B by using the virtual reception array illustrated in FIG. 9B. FIG. 29C is a view illustrating a result of calculator simulation of the two-dimensional direction estimation processing performed under the condition A by using the virtual surface-arranged array antenna illustrated in FIG. 27. FIG. 29D is a view illustrating a result of calculator simulation of the two-dimensional direction estimation processing performed under the condition B by using the virtual surface-arranged array antenna illustrated in FIG. 27.

FIGS. 29A and 29C display heat maps of the two-dimensional spatial profile in the beamformer method under the condition A which is the case where waves from the physical target arrive from two different directions (θ, φ)=(15°, 5°), (15°, −5°) at the same reception power level. The numerical values at the right ends of the heat maps indicate decibel (dB) values.

FIGS. 29B and 29D display heat maps of the two-dimensional spatial profile in the beamformer method under the condition B which is the case where waves from the physical target arrives from two different directions (θ, φ)=(−20°, 0°), (−10°, 0°) at the same reception power level. The numerical values at the right ends of the heat maps indicate decibel (dB) values.

From the calculator simulation results, it is found that regions of heat map display in FIGS. 29C and 29D are smaller than those in FIGS. 29A and 29B, that is, in FIGS. 29C and 29D, it is possible to virtually increase the number of elements by using the virtual surface-arranged array antenna and obtain the effect of reducing the grating lobe and side lobe levels in the two-dimensional spatial profile calculated in the two-dimensional direction estimation processing.

Note that, since the direction estimator 250 calculates the two-dimensional spatial profile by using the virtual surface-arranged array antenna, the computation processing amount of the direction estimator 250 is greater than that of the direction estimator 214. However, in the case of using the beamformer method, the computation amount can be reduced by using two-dimensional FFT processing.

Although various embodiments have been described above with reference to the drawings, the present disclosure is not limited to the examples described above as a matter of course. It is apparent that those skilled in the art can come up with various changes and modifications within the scope described in the claims. Such changes and modifications are understood to belong to the technical scope of the present disclosure. Moreover, the components in the embodiments described above can be arbitrary combined within the scope not departing from the spirit of the disclosure.

In the embodiments described above, description is given of the examples in which the present disclosure is achieved by using hardware. However, the present disclosure can be achieved by software in collaboration with hardware.

Moreover, the functional blocks used in the description of the aforementioned embodiments are achieved typically as a LSI which is an integrated circuit. The integrated circuit may control the functional blocks used in the description of the aforementioned embodiments and include an input terminal and an output terminal. These functional blocks can be each separately implemented on one chip. Alternatively, some or all of the functional blocks may be implemented on one chip. Although the integrated circuit is described as LSI in this case, the integrated circuit may also be referred to as IC, system LSI, super LSI, or ultra LSI depending on the degree of integration.

The circuit integration method is not limited to a LSI and can be achieved by using a dedicated circuit or a general-purpose processor. It is possible to use a field programmable gate array (FPGA) which is programmable after the manufacturing of the LSI, or a reconfigurable processor in which connection or settings of a circuit cell inside the LSI is reconfigurable.

When a circuit integration technique replacing the LSI appears due to progress in semiconductor technology or advent of another deriving technique, the functional blocks can be integrated by using such a technique as a matter of course. Application of bio-technology and the like is probable.

<Outline of Present Disclosure>

The radar device of the present disclosure includes: a radar transmitter which, in operation, transmits a plurality of radar signals at predetermined transmission cycles from a plurality of transmission antennas; and a radar receiver which, in operation, receives a plurality of reflected wave signals being the plurality of radar signals reflected on a target, by using a plurality of reception antennas, wherein the plurality of transmission antennas include Nt1 transmission antennas arranged in a first direction and Nt2 transmission antennas arranged in a second direction orthogonal to the first direction, the plurality of reception antennas include Na1 reception antennas arranged in the first direction and Na2 reception antennas arranged in the second direction, in the first direction, an inter-element space between any two of the Nt1 transmission antennas and an inter-element space between any two of the Na1 reception antennas equal to a product of the first space and an integer and are different from each other, and in the second direction, an inter-element space between any two of the Nt2 transmission antennas and an inter-element space between any two of the Na2 reception antennas equal to a product of a second space and an integer and are different from each other.

In the radar device of the present disclosure, a sum of the inter-element space between any two of the transmission antennas in the first direction is smaller than a smallest value of the inter-element space between any two of the reception antennas in the first direction, or a sum of the inter-element space between any two of the reception antennas in the first direction is smaller than a smallest value of the inter-element space between any two of the transmission antennas in the first direction.

In the radar device of the present disclosure, in the first direction, a largest value of the inter-element space between any two of the antennas fewer in number out of the Nt1 transmission antennas and the Na1 reception antennas is larger than a largest value of the inter-element space between any two of the antennas more in number, and in the second direction, a largest value of the inter-element space between any two of the antennas fewer in number out of the Nt2 transmission antennas and the Na2 reception antennas is larger than a largest value of the inter-element space between any two of the antennas more in number.

In the radar device of the present disclosure, the radar receiver receives the plurality of reflected wave signals as signals received by using a virtual reception array formed by the plurality of transmission antennas and the plurality of reception antennas and, in the virtual reception array, a plurality of inter-element spaces each between any two virtual antenna elements out of the Nt1×Na1 virtual antenna elements arranged in the first direction are each a product of the first space and an integer of 1 or more, and include products of the first space and all integers from 1 to a first predetermined value.

In the radar device of the present disclosure, the radar receiver receives the plurality of reflected wave signals as signals received by using a virtual reception array formed by the plurality of transmission antennas and the plurality of reception antennas and, in the virtual reception array, a plurality of inter-element spaces each between any two virtual antenna elements out of the Nt2×Na2 virtual antenna elements arranged in the second direction are each a product of the second space and an integer of 1 or more, and include products of the second space and all integers from 1 to a second predetermined value.

In the radar device of the present disclosure, at least the plurality of transmission antennas and the plurality of reception antennas are each formed of a plurality of sub-arrayed antenna elements, there is at least one combination of the inter-element space between any two of the Nt1 transmission antennas and the inter-element space between any two of the Na1 reception antennas in which a difference between any two of the inter-element spaces is smaller than one wavelength, where a size of each of the sub-arrayed antenna elements in the first direction is one wavelength or more, and there is at least one combination of the inter-element space between any two of the Nt2 transmission antennas and the inter-element space between any two of the Na2 reception antennas in which a difference between any two of the inter-element spaces is smaller than one wavelength, where a size of each of the sub-arrayed antenna elements in the second direction is one wavelength or more.

In the radar device of the present disclosure, the radar receiver receives the plurality of reflected wave signals as signals received by using a virtual surface-arranged array antenna in which elements are virtually arranged at positions indicated by inter-element vectors at all of elements in the virtual reception array formed by the plurality of transmission antennas and the plurality of reception antennas and, in the virtual reception array, a plurality of inter-element spaces each between any two of the Nt1×Na1 virtual antenna elements arranged in the first direction are each a product of the first space and an integer of 1 or more, and include products of the first space and all integers from 1 to a first predetermined value.

In the radar device of the present disclosure, the radar receiver receives the plurality of reflected wave signals as signals received by using the virtual surface-arranged array antenna in which elements are virtually arranged at positions indicated by the inter-element vectors at all of elements in the virtual reception array formed by the plurality of transmission antennas and the plurality of reception antennas and, in the virtual reception array, a plurality of inter-element spaces each between any two of the Nt2×Na2 virtual antenna elements arranged in the second direction are each a product of the second space and an integer of 1 or more, and include products of the second space and all integers from 1 to a second predetermined value.

In the radar device of the present disclosure, the plurality of transmission antennas are arranged such that Nt1×Nt2 takes the largest value, and the plurality of reception antennas are arranged such that Na1×Na2 takes the largest value.

In the radar device of the present disclosure, a set of the plurality of transmission antennas and a set of the plurality of reception antennas are each arranged in a L-shape, a T-shape, or a cross shape.

The present disclosure is suitable for a radar device which detects a wide range.

What is claimed is:

[1. A radar device comprising:

a radar transmitter which, in operation, transmits a plurality of radar signals at predetermined transmission cycles from a plurality of transmission antennas; and a radar receiver which, in operation, receives a plurality of reflected wave signals being the plurality of radar signals reflected on a target, by using a plurality of reception antennas, wherein the plurality of transmission antennas include Nt1 transmission antennas arranged in a first direction and Nt2 transmission antennas arranged in a second direction orthogonal to the first direction, the plurality of reception antennas include Na1 reception antennas arranged in the first direction and Na2 reception antennas arranged in the second direction, in the first direction, each of distances between adjacent two of the Nt1 transmission antennas and adjacent two of the Na1 reception antennas is an integer multiple of a first distance, and all of the distances between the adjacent two of the Nt1 transmission antennas and the adjacent two of the Na1 reception antennas are different from each other, and in the second direction, each of distances between adjacent two of the Nt2 transmission antennas and adjacent two of the Na2 reception antennas is an integer multiple of a second distance, and all of the distances between the adjacent two of the Nt2 transmission antennas and the adjacent two of the Na2 reception antennas are different from each other.]

[2. The radar device according to claim 1, wherein a sum of all of distances between the adjacent two of the transmission antennas in the first direction is smaller than a smallest value of all of distances between the adjacent two of the reception antennas in the first direction, Nt1 being three or more, or a sum of all of distances between the adjacent two of the reception antennas in the first direction is smaller than a smallest value of all of distances between the adjacent two of the transmission antennas in the first direction, Na1 being three or more.]

[3. The radar device according to claim 1, wherein the radar receiver receives the plurality of reflected wave signals as signals received by using a virtual reception array formed by the plurality of transmission antennas and the plurality of reception antennas, the virtual reception array includes Nt1×Na1 virtual antenna elements arranged in the first direction, and in the virtual reception array, each of distances between adjacent two of the Nt1×Na1 virtual antenna elements arranged in the first direction is a first integer multiple of the first distance, the first integer being one or more, and distances between adjacent two of the Nt1×Na1 virtual antenna elements arranged in the first direction include second integer multiples of the first distance, the second integers including all integers from 1 to a first predetermined value.]

[4. The radar device according to claim 1, wherein the radar receiver receives the plurality of reflected wave signals as signals received by using a virtual reception array formed by the plurality of transmission antennas and the plurality of reception antennas, the virtual reception array includes Nt2×Na2 virtual antenna elements arranged in the second direction, and in the virtual reception array, each of distances between adjacent inter element spaces each between any two of the Nt2×Na2 virtual antenna elements arranged in the second direction is a first integer multiple of the first distance, the first integer being one or more, and distances between adjacent two of the Nt2×Na2 virtual antenna elements arranged in the second direction include second integer multiples of the first distance, the second integers including all integers from 1 to a second predetermined value.]

[5. The radar device according to claim 1, wherein at least one of the plurality of transmission antennas and the plurality of reception antennas is formed of a plurality of sub-arrayed antenna elements, a width of each of the plurality of sub-arrayed antenna elements in the first direction is one wavelength or more, and a difference between at least one of distances between the adjacent two of the Nt1 transmission antennas and at least one of distances between the adjacent two of the Na1 reception antennas is smaller than one wavelength, and a width of each of the plurality of sub-arrayed antenna elements in the second direction is one wavelength or more, and a difference between at least one of distances between the adjacent two of the Nt2 transmission antennas and at least one of distances between the adjacent two of the Na1 reception antennas is smaller than one wavelength.]

[6. The radar device according to claim 1, wherein the radar receiver receives the plurality of reflected wave signals as signals received by using a virtual surface-arranged array antenna in which elements are virtually arranged at positions indicated by inter-element vectors at all of elements in a virtual reception array formed by the plurality of transmission antennas and the plurality of reception antennas, the virtual reception array includes Nt1×Na1 virtual antenna elements arranged in the first direction, and in the virtual reception array, each of distances between adjacent two of the Nt1×Na1 virtual antenna elements arranged in the first direction is a first integer multiple of the first distance, the first integer being one or more, and distances between adjacent two of the Nt1×Na1 virtual antenna elements arranged in the first direction include second integer multiples of the first distance, the second integers including all integers from 1 to a first predetermined value.]

[7. The radar device according to claim 1, wherein the radar receiver receives the plurality of reflected wave signals as signals received by using a virtual surface-arranged array antenna in which elements are virtually arranged at positions indicated by inter-element vectors at all of elements in a virtual reception array formed by the plurality of transmission antennas and the plurality of reception antennas, the virtual reception array includes Nt2×Na2 virtual antenna elements arranged in the second direction, and in the virtual reception array, each of distances between adjacent two of the Nt2×Na2 virtual antenna elements arranged in the second direction is a first integer multiple of the first distance, the first integer being one or more, and distances between adjacent two of the Nt2×Na2 virtual antenna elements arranged in the second direction include second integer multiples of the first distance, the second integers including all integers from 1 to a second predetermined value.]

[8. The radar device according to claim 1, wherein the plurality of transmission antennas includes a total of Nt transmission antennas, Nt being a natural number and being three or more, the plurality of transmission antennas are arranged such that the Nt1 transmission antennas are arranged in the first direction and the Nt2 transmission antennas are arranged in the second direction, wherein Nt1 and Nt2 satisfy a first condition that Nt equals Nt1+Nt2−1 and that Nt1×Nt2 has a takes the largest value under the first condition, the plurality of reception antennas includes a total of Na reception antennas, Na being a natural number and being three or more, and the plurality of reception antennas are arranged such that the Na1 reception antennas are arranged in the first direction and the Na2 reception antennas are arranged in the second direction, wherein Na1 and Na2 satisfy a second condition that Na equals Na1+Na2-1 and that Na1×Na2 has a largest value under the second condition.]

[9. The radar device according to claim 1, wherein a set of the plurality of transmission antennas and a set of the plurality of reception antennas are each arranged in a L-shape, a T-shape, or a cross shape.]

[10. The radar device according to claim 1, wherein

Nt1 is smaller than Na1, and in the first direction, a largest value of all of distances between the adjacent two of the Nt1 transmission antennas is larger than a largest value of all of distances between the adjacent two of the Na1 reception antennas.]

[11. The radar device according to claim 1, wherein

Na1 is smaller than Nt1, and in the first direction, a largest value of all of distances between the adjacent two of the Na1 reception antennas is larger than a largest value of all of distances between the adjacent two of the Nt1 transmission antennas.]

[12. The radar device according to claim 1, wherein Nt2 is smaller than Na2, and in the second direction, a largest value of all of distances between the adjacent two of the Nt2 transmission antennas is larger than a largest value of all of distances between the adjacent two of the Na2 reception antennas.]

[13. The radar device according to claim 1, wherein Na2 is smaller than Nt2, and in the second direction, a largest value of all of distances between the adjacent two of the Na2 reception antennas is larger than a largest value of all of distances between the adjacent two of the Nt2 transmission antennas.]

*14. A radar device comprising:*

*a radar transmitter which, in operation, transmits radar signals at a predetermined transmission cycle from a first transmission antenna, a second transmission antenna, and a third transmission antenna; and*

*a radar receiver which, in operation, receives reflected wave signals being the radar signals reflected on a target, by using a first reception antenna, a second reception antenna, a third reception antenna, and a fourth reception antenna,*

*wherein:*

*the first transmission antenna is separated from the second transmission antenna in a first direction at a first distance,*

*the third transmission antenna is separated from the first and the second transmission antennas in a second direction at a second distance different from the first distance,*

*the first and the second reception antennas are separated in the first direction at a third distance,*

*the second and the third reception antennas are separated in the first direction at a fourth distance different from the third distance,*

*the fourth reception antenna is separated from the first, the second and the third reception antennas in the second direction at a fifth distance different from the fourth distance,*

*in the first direction, the first distance, the third distance, the fourth distance, and the fifth distance are different from each other,*

*in the first direction, each of distances between adjacent two of the first transmission antenna, the second transmission antenna, and the third transmission antenna and adjacent two of the first reception antenna, the second reception antenna, the third reception antenna, and the fourth reception antenna is an integer multiple of a first distance, and all of the distances between the adjacent two of the first transmission antenna, the second transmission antenna, and the third transmission antenna and the adjacent two of the first reception antenna, the second reception antenna, the third reception antenna, and the fourth reception antenna are different from each other,*

*in the second direction, each of distances between adjacent two of the first transmission antenna, the second transmission antenna, and the third transmission antenna and adjacent two of the first reception antenna, the second reception antenna, the third reception antenna, and the fourth reception antenna is an integer multiple of a second distance, and all of the distances between the adjacent two of the first transmission antenna, the second transmission antenna, and the third transmission antenna and the adjacent two of the first reception antenna, the second reception antenna, the third reception antenna, and the fourth reception antenna are different from each other,*

*the first distance is an aperture length in the first direction of the radar transmitter,*

*the first distance differs from a sum of the third and fourth distances,*

*the third and fourth distances are an aperture lengths in the first direction of the radar receiver,*

*the second distance is an aperture length in the second direction of the radar transmitter,*

*in the second direction, the second distance is different from the fifth distance, and*

*the fifth distance is an aperture length in the second direction of the radar receiver.*

*15. A radar device comprising:*

*a radar transmitter which, in operation, transmits radar signals at a predetermined transmission cycle from Nt transmission antennas, Nt being an integer greater than or equal to 3; and*

*a radar receiver which, in operation, receives reflected wave signals being the radar signals reflected on a target, by using Na reception antennas, Na being an integer greater than or equal to 3,*

*wherein:*

*the Nt transmission antennas include a first transmission antenna group and a second transmission antenna group,*

*all antennas of the first transmission antenna group are separated in a first direction,*

*all antennas of the second transmission antenna group are separated in a second direction,*

*the Na reception antennas include a first reception antenna group and a second reception antenna group,*

*all antennas of the first reception antenna group are separated in the first direction,*

*all antennas of the second reception antenna group are separated in a second direction,*

*in the first direction, all of distances between adjacent two of the antennas in the first transmission antenna group and all of distances between adjacent two of the antennas in the first reception antenna group are different from each other,*

*in the second direction, all of distances between adjacent two of the antennas in the second transmission antenna group and all of distances between adjacent two of the antennas in the second reception antenna group are different from each other,*

*in the radar transmitter, all of the distances between adjacent two of the antennas in the first transmission antenna group is different from all of the distances between adjacent two of the antennas in the second transmission antenna group, and*

*in the radar receiver, all of the distances between adjacent two of the antennas in the first reception antenna group is different from all of the distances between adjacent two of the antennas in the second reception antenna group.*

*16. A radar device comprising:*

*a radar transmitter which, in operation, transmits radar signals at predetermined transmission cycles from transmission antennas; and*

*a radar receiver which, in operation, receives reflected wave signals being the radar signals reflected on a target, by using reception antennas, wherein*

*the transmission antennas include Nt1 transmission antennas arranged in a first direction and Nt2 transmission antennas arranged in a second direction orthogonal to the first direction, Nt1 being an integer greater than or equal to 1, and Nt2 being an integer greater than or equal to 1,*

*the reception antennas include Na1 reception antennas arranged in the first direction and Na2 reception antennas arranged in the second direction, Na1 being an integer greater than or equal to 1, and Na2 being an integer greater than or equal to 1,*

*in the first direction, each of distances between adjacent two of the Nt1 transmission antennas and distances between adjacent two of the Na1 reception antennas is an integer multiple of a first distance, and all of the distances between the adjacent two of the Nt1 transmission antennas and all of the distances between the adjacent two of the Na1 reception antennas are different from each other,*

*in the second direction, each of distances between adjacent two of the Nt2 transmission antennas and distances between adjacent two of the Na2 reception antennas is an integer multiple of a second distance, and*

*all of the distances between the adjacent two of the Nt2 transmission antennas and all of the distances between the adjacent two of the Na2 reception antennas are different from each other.*

*17. The radar device according to claim 16, wherein*

*a sum of all of distances between the adjacent two of the Nt1 transmission antennas in the first direction is larger than a smallest value of all of distances between the adjacent two of the Na1 reception antennas in the first direction, Nt1 being two or more, or*

*a sum of all of distances between the adjacent two of the Na1 reception antennas in the first direction is larger than a smallest value of all of distances between the adjacent two of the Nt1 transmission antennas in the first direction, Na1 two or more.*

*18. The radar device according to claim 16, wherein*

*the radar receiver receives the reflected wave signals as signals received by using a virtual reception array formed by the transmission antennas and the reception antennas,*

*the virtual reception array includes Nt1×Na1 virtual antenna elements arranged in the first direction, and*

*in the virtual reception array, each of distances between adjacent two of the Nt1×Na1 virtual antenna elements arranged in the first direction is a first integer multiple of the first distance, the first integer multiple being one or more, and*

*each of distances between two virtual antenna elements selected from the Nt1×Na1 virtual antenna elements arranged in the first direction is equal to second integer multiples of the first distance, the second integer multiples including all integers from 1 to a first value.*

*19. The radar device according to claim 16, wherein*

*the radar receiver receives the reflected wave signals as signals received by using a virtual reception array formed by the transmission antennas and the reception antennas,*

*the virtual reception array includes Nt2×Na2 virtual antenna elements arranged in the second direction, and*

*in the virtual reception array, each of distances between adjacent two of the Nt2×Na2 virtual antenna elements arranged in the second direction is a first integer multiple of the first distance, the first integer multiple being one or more, and*

*each of distances between two virtual antenna elements selected from the Nt2×Na2 virtual antenna elements arranged in the second direction is equal to second integer multiples of the first distance, the second integer multiples including all integers from 1 to a second value.*

*20. The radar device according to claim 16, wherein*

*at least one of the transmission antennas and the reception antennas is formed of a sub-arrayed antenna elements,*

*a width of each of the sub-arrayed antenna elements in the first direction is one wavelength or more, and a difference between at least one of distances between the adjacent two of the Nt1 transmission antennas and at least one of distances between the adjacent two of the Na1 reception antennas is smaller than one wavelength, and*

*a width of each of the sub-arrayed antenna elements in the second direction is one wavelength or more, and a difference between at least one of distances between the adjacent two of the Nt2 transmission antennas and at least one of distances between the adjacent two of the Na2 reception antennas is smaller than one wavelength.*

*21. The radar device according to claim 16, wherein*

*the radar receiver receives the reflected wave signals as signals received by using a virtual surface-arranged array antenna in which elements are virtually arranged at positions indicated by inter-element vectors at all of elements in a virtual reception array formed by the transmission antennas and the reception antennas,*

*the virtual reception array includes Nt1×Na1 virtual antenna elements arranged in the first direction, and*

*in the virtual reception array, each of distances between adjacent two of the Nt1×Na1 virtual antenna elements arranged in the first direction is a first integer multiple of the first distance, the first integer multiple being one or more, and is equal to distances between two virtual antenna elements selected from two of the Nt1×Na1 virtual antenna elements arranged in the first direction is equal to second integer multiples of the first distance, the second integer multiples including all integers from 1 to a first value.*

*22. The radar device according to claim 16, wherein*

*the radar receiver receives the reflected wave signals as signals received by using a virtual surface-arranged array antenna in which elements are virtually arranged at positions indicated by inter-element vectors at all of elements in a virtual reception array formed by the transmission antennas and the reception antennas,*

*the virtual reception array includes Nt2×Na2 virtual antenna elements arranged in the second direction, and*

*in the virtual reception array, each of distances between adjacent two of the Nt2×Na2 virtual antenna elements arranged in the second direction is a first integer multiple of the first distance, the first integer multiple being one or more, and each of distances between two virtual antenna elements selected from the Nt2×Na2 virtual antenna elements arranged in the second direction is equal to second integer multiples of the first distance, the second integer multiples including all integers from 1 to a second value.*

*23. The radar device according to claim 16, wherein*

*the transmission antennas includes a total of Nt transmission antennas, Nt being a natural number and being three or more,*

*the transmission antennas are arranged such that the Nt1 transmission antennas are arranged in the first direction and the Nt2 transmission antennas are arranged in the second direction, wherein Nt1 and Nt2 satisfy a first condition that Nt equals Nt1+Nt2-l and that Nt1×Nt2 has a largest value under the first condition,*

*the reception antennas includes a total of Na reception antennas, Na being a natural number and being three or more, and*

*the reception antennas are arranged such that the Na1 reception antennas are arranged in the first direction and the Na2 reception antennas are arranged in the second direction, wherein Na1 and Na2 satisfy a second condition that Na equals Nal+Na2-l and that Nal×Na2 has a largest value under the second condition.*

*24. The radar device according to claim 16, wherein:*

*a set of the transmission antennas is arranged in a L-shape, a T-shape, or a cross shape, and*

*wherein a set of the reception antennas is arranged in a L-shape, a T-shape, or a cross shape.*

*25. The radar device according to claim 16, wherein*

*Nt1 is smaller than Nal, and*

*in the first direction, a largest value of all of distances between the adjacent two of the Nt1 transmission antennas is larger than a largest value of all of distances between the adjacent two of the Na1 reception antennas.*

*26. The radar device according to claim 16, wherein*

*Na1 is smaller than Nt1, and*

*in the first direction, a largest value of all of distances between the adjacent two of the Na1 reception antennas is larger than a largest value of all of distances between the adjacent two of the Nt1 transmission antennas.*

*27. The radar device according to claim 16, wherein*

*Nt2 is smaller than Na2, and*

*in the second direction, a largest value of all of distances between the adjacent two of the Nt2 transmission antennas is larger than a largest value of all of distances between the adjacent two of the Na2 reception antennas.*

*28. The radar device according to claim 16, wherein*

*Na2 is smaller than Nt2, and*

*in the second direction, a largest value of all of distances between the adjacent two of the Na2 reception antennas is larger than a largest value of all of distances between the adjacent two of the Nt2 transmission antennas.*

* * * * *